United States Patent
Zakotnik et al.

(10) Patent No.: US 10,395,823 B2
(45) Date of Patent: Aug. 27, 2019

(54) GRAIN BOUNDARY ENGINEERING

(71) Applicant: URBAN MINING COMPANY, Austin, TX (US)

(72) Inventors: Miha Zakotnik, Austin, TX (US); Walter Del Pozzo, Smethwick (GB)

(73) Assignee: Urban Mining Company, Perryville, MD (US)

( * ) Notice: Subject to any disclaimer, the term of this patent is extended or adjusted under 35 U.S.C. 154(b) by 552 days.

(21) Appl. No.: 15/093,971

(22) Filed: Apr. 8, 2016

(65) Prior Publication Data

US 2016/0225522 A1 Aug. 4, 2016

Related U.S. Application Data

(63) Continuation of application No. 14/742,080, filed on Jun. 17, 2015, now Pat. No. 9,336,932.

(Continued)

(51) Int. Cl.
*H01F 41/02* (2006.01)
*B22F 3/12* (2006.01)
(Continued)

(52) U.S. Cl.
CPC ............ *H01F 41/0266* (2013.01); *B22F 3/16* (2013.01); *B22F 3/24* (2013.01); *B22F 9/023* (2013.01);
(Continued)

(58) Field of Classification Search
None
See application file for complete search history.

(56) References Cited

U.S. PATENT DOCUMENTS

| | | |
|---|---|---|
| 3,802,935 A | 4/1974 | Martin et al. |
| 4,043,019 A | 8/1977 | Schroder |

(Continued)

FOREIGN PATENT DOCUMENTS

| | | |
|---|---|---|
| CN | 1360316 | 7/2002 |
| CN | 101026034 | 8/2007 |

(Continued)

OTHER PUBLICATIONS

"ASM Alloy Phase Diagram Database—How to Use Explore, Search and Tools", ASM International, http://www.1.asminternational.org/asmenterprise/apd/help/HowToSearch.aspx (accessed on Nov. 10, 2014), 2 pages.

(Continued)

*Primary Examiner* — Xiaowei Su
(74) *Attorney, Agent, or Firm* — BakerHostetler

(57) ABSTRACT

This disclosure is directed to methods for creating recycled Nd—Fe—B type permanent magnets, the methods comprising homogenizing a first population of particles of a rare earth transitional elemental additive with a second population of particles of a magnetic material, wherein the nature of the rare earth transitional elemental additive and the magnetic material are described herein. Additional steps may include compressing the population of homogenized particles together to form a green body, and heating the green body at a temperature and for a time sufficient to sinter the green body into a sintered body. Compositions resulting from these methods are also within the scope of the disclosure.

37 Claims, 22 Drawing Sheets

Related U.S. Application Data

(60) Provisional application No. 62/037,754, filed on Aug. 15, 2014.

(51) Int. Cl.

| | | |
|---|---|---|
| *H01F 1/057* | (2006.01) | |
| *C22C 1/04* | (2006.01) | |
| *B22F 9/08* | (2006.01) | |
| *C22C 33/02* | (2006.01) | |
| *B22F 3/16* | (2006.01) | |
| *B22F 3/24* | (2006.01) | |
| *B22F 9/02* | (2006.01) | |
| *B22F 9/04* | (2006.01) | |
| *C22C 38/00* | (2006.01) | |
| *C22C 38/06* | (2006.01) | |
| *C22C 38/10* | (2006.01) | |
| *C22C 38/14* | (2006.01) | |
| *C22C 38/16* | (2006.01) | |
| *H01F 1/03* | (2006.01) | |
| *H01F 7/02* | (2006.01) | |
| *C22C 28/00* | (2006.01) | |
| *B22F 1/00* | (2006.01) | |

(52) U.S. Cl.
CPC ............... *B22F 9/04* (2013.01); *B22F 9/08* (2013.01); *C22C 1/0441* (2013.01); *C22C 28/00* (2013.01); *C22C 33/0278* (2013.01); *C22C 38/002* (2013.01); *C22C 38/005* (2013.01); *C22C 38/06* (2013.01); *C22C 38/10* (2013.01); *C22C 38/14* (2013.01); *C22C 38/16* (2013.01); *H01F 1/0306* (2013.01); *H01F 1/0577* (2013.01); *H01F 7/021* (2013.01); *H01F 41/0293* (2013.01); *B22F 1/0055* (2013.01); *B22F 2009/048* (2013.01); *B22F 2998/10* (2013.01); *C22C 2202/02* (2013.01)

(56) References Cited

U.S. PATENT DOCUMENTS

| | | |
|---|---|---|
| 4,333,219 A | 6/1982 | Ginatta |
| 4,585,473 A | 4/1986 | Narasimhan et al. |
| 4,597,938 A | 7/1986 | Matsuura et al. |
| 4,601,875 A | 7/1986 | Yamamoto et al. |
| 4,770,723 A | 9/1988 | Sagawa et al. |
| 4,792,368 A | 12/1988 | Sagawa et al. |
| 4,826,546 A | 5/1989 | Yamamoto et al. |
| 4,859,255 A | 8/1989 | Fujimura et al. |
| 4,900,374 A | 2/1990 | Panchanathan |
| 4,981,532 A | 1/1991 | Takeshita et al. |
| 5,000,800 A | 3/1991 | Sagawa |
| 5,009,706 A | 4/1991 | Sakamoto et al. |
| 5,049,208 A | 9/1991 | Yajima et al. |
| 5,143,560 A | 9/1992 | Doser |
| 5,183,516 A | 2/1993 | Sagawa et al. |
| 5,192,372 A | 3/1993 | Fujimura et al. |
| 5,194,098 A | 3/1993 | Sagawa et al. |
| 5,200,001 A | 4/1993 | Hirosawa et al. |
| 5,209,789 A | 5/1993 | Yoneyama et al. |
| 5,217,543 A | 6/1993 | Inokoshi |
| 5,225,004 A | 7/1993 | O'Handley et al. |
| 5,228,930 A | 7/1993 | Nakayama et al. |
| 5,230,749 A | 7/1993 | Fujimura et al. |
| 5,242,508 A | 9/1993 | McCallum et al. |
| 5,281,250 A | 1/1994 | Hamamura et al. |
| 5,338,371 A | 8/1994 | Nakayama et al. |
| 5,338,372 A | 8/1994 | Tabaru |
| 5,377,920 A | 1/1995 | Alavi et al. |
| 5,387,291 A | 2/1995 | Kaneko et al. |
| 5,417,773 A | 5/1995 | Nakayama et al. |
| 5,431,747 A | 7/1995 | Takebuchi et al. |
| 5,437,709 A | 8/1995 | Ellis et al. |
| 5,454,998 A | 10/1995 | Bogatin et al. |
| 5,466,308 A | 11/1995 | Fujimura et al. |
| 5,472,525 A | 12/1995 | Tokunaga et al. |
| 5,486,224 A | 1/1996 | Kishimoto et al. |
| 5,486,239 A | 1/1996 | Nakayama et al. |
| 5,505,794 A | 4/1996 | Nakayama et al. |
| 5,527,504 A | 6/1996 | Kishimoto et al. |
| 5,565,043 A | 10/1996 | Akioka et al. |
| 5,666,635 A | 9/1997 | Kaneko et al. |
| 5,788,782 A | 8/1998 | Kaneko et al. |
| 5,851,312 A | 12/1998 | Honkura et al. |
| 5,858,123 A | 1/1999 | Uchida et al. |
| 5,997,804 A | 12/1999 | Uchida et al. |
| 6,080,245 A | 6/2000 | Uchida et al. |
| 6,113,846 A | 9/2000 | Honkura et al. |
| 6,149,861 A | 11/2000 | Kaneko et al. |
| 6,159,308 A | 12/2000 | Uchida et al. |
| 6,247,660 B1 | 6/2001 | Imai et al. |
| 6,399,150 B1 | 6/2002 | Yoshimura et al. |
| 6,403,024 B1 | 6/2002 | Oota et al. |
| 6,444,052 B1 | 9/2002 | Honkura et al. |
| 6,447,621 B1 | 9/2002 | Tokoro et al. |
| 6,461,565 B2 | 10/2002 | Tokuhara et al. |
| 6,468,365 B1 | 10/2002 | Uchida et al. |
| 6,474,576 B1 | 11/2002 | Oota et al. |
| 6,491,765 B2 | 12/2002 | Okayama et al. |
| 6,511,552 B1 | 1/2003 | Makita et al. |
| 6,527,874 B2 | 3/2003 | Li |
| 6,533,837 B1 | 3/2003 | Yamagata et al. |
| 6,537,345 B1 | 3/2003 | Terada et al. |
| 6,537,385 B2 | 3/2003 | Okayama et al. |
| 6,599,450 B1 | 7/2003 | Terada et al. |
| 6,602,352 B2 | 8/2003 | Okumura et al. |
| 6,635,120 B2 | 10/2003 | Tokoro et al. |
| 6,648,984 B2 | 11/2003 | Takaki et al. |
| 6,676,773 B2 | 1/2004 | Kaneko et al. |
| 6,695,929 B2 | 2/2004 | Kanekiyo et al. |
| 6,736,343 B2 | 5/2004 | Oota et al. |
| 6,752,879 B2 | 6/2004 | Takaki et al. |
| 6,756,010 B2 | 6/2004 | Harada et al. |
| 7,004,228 B2 | 2/2006 | Murakami et al. |
| 7,014,440 B2 | 3/2006 | Okumura et al. |
| 7,018,485 B2 | 3/2006 | Tsujimoto et al. |
| 7,037,465 B2 | 5/2006 | Ogawa et al. |
| 7,040,969 B1 | 5/2006 | Chikuba et al. |
| 7,045,092 B2 | 5/2006 | Ogawa et al. |
| 7,045,093 B2 | 5/2006 | Tanaka et al. |
| 7,048,808 B2 | 5/2006 | Kaneko et al. |
| 7,056,393 B2 | 6/2006 | Tokuhara et al. |
| 7,086,934 B2 | 8/2006 | Tochishita et al. |
| 7,138,017 B2 | 11/2006 | Kaneko et al. |
| 7,138,018 B2 | 11/2006 | Honk:ura et al. |
| 7,163,591 B2 | 1/2007 | Kim et al. |
| 7,204,891 B2 | 4/2007 | Hirota et al. |
| 7,244,318 B2 | 7/2007 | Sekino et al. |
| 7,258,751 B2 | 8/2007 | Tomizawa et al. |
| 7,344,606 B2 | 3/2008 | Mino et al. |
| 7,390,369 B2 | 6/2008 | Odaka et al. |
| 7,507,302 B2 | 3/2009 | Miyoshi et al. |
| 7,534,311 B2 | 5/2009 | Tomizawa et al. |
| 7,578,892 B2 | 8/2009 | Hirosawa et al. |
| 7,585,378 B2 | 9/2009 | Odaka et al. |
| 7,670,443 B2 | 3/2010 | Kogure et al. |
| 7,740,715 B2 | 6/2010 | Tomizawa |
| 7,789,933 B2 | 9/2010 | Tomizawa |
| 7,842,140 B2 | 11/2010 | Kanekiyo et al. |
| 7,922,832 B2 | 4/2011 | Nakamura et al. |
| 7,955,443 B2 | 6/2011 | Nakamura et al. |
| 7,972,448 B2 | 7/2011 | Reppel |
| 8,075,707 B2 | 12/2011 | Nakamura et al. |
| 8,128,758 B2 | 3/2012 | Nozawa et al. |
| 8,231,740 B2 | 7/2012 | Nakamura et al. |
| 8,287,661 B2 | 10/2012 | Ishii et al. |
| 8,317,941 B2 | 11/2012 | Kuniyoshi et al. |
| 8,361,242 B2 | 1/2013 | Blank et al. |
| 2002/0112783 A1 | 8/2002 | Tomizawa et al. |
| 2002/0112785 A1 | 8/2002 | Sekine et al. |
| 2002/0129874 A1 | 9/2002 | Kaneko et al. |
| 2002/0197180 A1 | 12/2002 | Tokuhara et al. |

(56) References Cited

U.S. PATENT DOCUMENTS

| | | | |
|---|---|---|---|
| 2003/0084964 | A1 | 5/2003 | Okayama et al. |
| 2004/0031543 | A1 | 2/2004 | Hirosawa et al. |
| 2004/0206423 | A1 | 10/2004 | Harada et al. |
| 2004/0231751 | A1 | 11/2004 | Kuniyoshi et al. |
| 2005/0268989 | A1 | 12/2005 | Tomizawa et al. |
| 2006/0016515 | A1 | 1/2006 | Tomizawa et al. |
| 2006/0162821 | A1 | 7/2006 | Reppel |
| 2007/0034299 | A1 | 2/2007 | Machida et al. |
| 2007/0240790 | A1 | 10/2007 | Kita et al. |
| 2009/0019969 | A1 | 1/2009 | Kato et al. |
| 2010/0040501 | A1* | 2/2010 | Kato ............... C22C 38/005 419/38 |
| 2010/0247367 | A1 | 9/2010 | Nakamura et al. |
| 2011/0052799 | A1 | 3/2011 | Nagata et al. |
| 2011/0076128 | A1 | 3/2011 | Johnsen et al. |
| 2012/0021221 | A1 | 1/2012 | Miyoshi |
| 2012/0125155 | A1 | 5/2012 | Nakayama et al. |
| 2012/0137829 | A1 | 6/2012 | Harris et al. |
| 2012/0138539 | A1 | 6/2012 | Cogliandro |
| 2013/0011293 | A1 | 1/2013 | Mochizuki |
| 2013/0039797 | A1 | 2/2013 | Yuan |
| 2013/0263699 | A1 | 10/2013 | Harris et al. |
| 2013/0320565 | A1 | 12/2013 | Yu et al. |

FOREIGN PATENT DOCUMENTS

| | | |
|---|---|---|
| CN | 101051544 | 10/2007 |
| CN | 101246771 | 8/2008 |
| CN | 101266855 | 9/2008 |
| CN | 101429030 | 5/2009 |
| CN | 101877265 | 11/2010 |
| CN | 101952915 | 1/2011 |
| CN | 102211192 | 10/2011 |
| CN | 103117143 | 5/2013 |
| CN | 103779035 | 5/2014 |
| CN | 102453804 | 5/2015 |
| DE | 19843883 | 10/1999 |
| EP | 0 270 934 | 6/1988 |
| EP | 2 133 891 | 12/2009 |
| EP | 2 623 235 | 8/2013 |
| EP | 2 722 856 | 4/2014 |
| GB | 1554384 | 10/1979 |
| GB | 2487656 | 8/2012 |
| JP | 2001-319821 | 11/2001 |
| JP | 2004296973 | 10/2004 |
| WO | WO 2003-056582 | 7/2003 |
| WO | WO 2004-101202 | 11/2004 |
| WO | WO 2010-111933 | 10/2010 |
| WO | WO 2012-002774 | 1/2012 |
| WO | WO 2012-017574 | 2/2012 |

OTHER PUBLICATIONS

Adler, "A Contribution to the Understanding of Coercivity and Its Temperature Dependence in Sintered SmCo5 and Nd2Fe14B Magnets", 4th International Symposium on Magnetic Anisotropy and Coercivity in Rare Earth—Transition Metal Alloys, Dayton, Ohio, May 9, 1985, 14 pages.

Asabe et al., "Recycling of Rare Earth Magnet Scraps: Part I Carbon Removal by High Temperature Oxidation ," Materials Transactions, 2001, 42(12), 2487-2491.

Binnemans et al., "Recycling of Rare Earths: A Critical Review", Journal of Cleaner Production, Jun. 2013, 51,1-22.

Blank, "What Determines the Demagnetization in Nd—Fe—B Magnets?", Journal of Magnetism and Magnetic Materials, Oct. 1991, 101(1-3), 317-322.

Burns et al., "Production of Anisotropic Powder from Hot Deformed Re—Fe—B—Cu Alloys," Proceedings of the 16th International Workshop on Rare-Earth Magnets and Their Applications, Japan, 2000, pp. 355-363.

Blaine, et al., "Master Sintering Curve Concepts as Applied to the Sintering of Molybdenum," Metallurgical and Materials Transactions A, Mar. 2006, vol. 37a, 715-720.

Evans et al., "The Hydrogenation Behaviour of the Phases Sm2Co17 and Pr2Co17," Journal of Materials Science, Mar. 1985, 20(3), 817-820.

Harris et al., "Nd—Fe—B Permanent Magnets: Hydrogen Absorption/Desorption Studies (HADS) on Nd16Fe16Bs and Nd2Fe14B," Physica Scripta., 1987, TI9B:435-440.

Horikawa et al., "Magnetic properties of the Nd—Fe—B Sintered Magnet Powders Recovered by Yb Metal Vapor Sorption," Journal Magnetism and Magnetic Materials, May 2004, 271(2-3), 369-380.

International Patent Application No. PCT/US2014/042805: International Search Report and the Written Opinion dated Dec. 23, 2014, 10 pages.

International Patent Application No. PCT/US2015/045202: International Search Report and the Written Opinion dated Nov. 10, 2015, 14 pages.

International Patent Application No. PCT/US2015/045206: International Search Report and the Written Opinion dated Nov. 5, 2015, 16 pages.

Kawasaki et al., "Reproduction of Nd—Fe—B Sintered Magnet Scraps Using a Binary Alloy Blending Technique," Materials Transactions, 2003, 44(9),1682-1685.

Kianvash, A. and Haris, IR., "Metallographic Studies of a 2-17-Type Sm(Co, Cu, Fe, Zr)s.92 Magnetic Alloy," Journal of the Less Common Metals, Mar. 1984, 98(1), 93-108.

Kianvash, A. and Harris, IR., "Hydrogen Decrepitation as a Method of Powder Preparation of A 2: 17-type, Sm(Co,Cu,Fe,Zr)$_{8.92}$ Magnetic Alloy," Journal of Materials Science., Feb. 1985, 20(2), 682-688.

Kwon et al., "Coercivity Enhancement in Nd—Fe—B Powder Obtained from Crushed Sintered Magnets," Proceedings of the 18th International Workshop on HPMA (France), 2004, 8 pages.

Larsen and Liversay, "Hydriding kinetics of SmCo5," Journal of the Less Common Metals, Sep. 1, 1980, 73(1), 79-88.

Li et al., "Waste Nd—Fe—B Sintered Magnet Recycling by Doping With Rare Earth Rich Alloys", IEEE Transactions on Magnetics, 50(12), Dec. 2014, 3 pages.

Machida et al., "Effective Recovery of Nd—Fe—B Sintered Magnet Scrap Powders as Microwave Absorbing Materials," Chemistry Letters, 2003, 32(7), 658-659.

Merrow, E.W., "Estimating Startup Times for Solids-Processing Plants", Chemical Engineering, Oct. 24, 1988, 24, pp. 89-92.

Namkung et al., "Coercivity of Anisotropic Magnet Powder Obtained from the Nd—Fe—B Sintered Magnet Scrap," Proceedings of the 18th International Workshop on HPMA (France), 2004, 5 pages.

Raichlen and Doremus, "Kinetics of Hydriding and Allotropic Transformation in SmCos," Journal of Applied Physics, 1971, 42, 3166-3170, Published online: Dec. 15, 2003.

Rivoirard et al., "Anisotropic and Coercive MdFeB Powder for Bonded Magnets," Proceedings of the 16th International Workshop on Rare-Earth Magnets and Their Applications (Sendai Japan), 2000, pp. 347-354.

Sagawa and Hirosawa, "Coercivity and Microstructure of R—Fe—B Sintered Permanent Magnets", Journal de Physique Colloques, Dec. 1988, 49(C8), DD. C8-617-C8-622.

Sagawa et al., "Dependence of Coercivity on the Anisotropy Field in the Nd2FeI 4B-type Sintered Magnets", Journal of Applied Physics, Apr. 1987, 61(8), 3559-3561.

Saguchi et al., "Recycling of Rare Earth Magnet Scraps Part III Carbon Removal from Nd Magnet Grinding Sludge under Vacuum Heating," Materials Transactions, 2002, 43(2), 256-260.

Saguchi et al., "Recycling of Rare Earth Magnet Scraps: Carbon and Oxygen Removal From Nd Magnet Scraps," Journal of Alloys and Compounds, Feb. 9, 2006, 408-412,1377-1381.

Saito et al., "The Extraction of Sm from Sm—Co alloys by the Glass Slag Method," Materials Transactions, 2003, 44(4), 637-640.

Schuler et al., "Study on Rare Earths and Their Recycling", Final Report for the Greens/EFA Group in the European Parliament, Jan. 2011, 162 pages.

Sheridan et al., "Anisotropic Powder From Sintered NdFeB Magnets by the HDDR Processing Route", Journal of Magnetism and Magnetic Materials, 324(1), Jan. 2012, pp. 63-67.

(56) References Cited

OTHER PUBLICATIONS

Sheridan et al., "Improved HDDR Processing Route for Production of Anisotropic Powder From Sintered NdFeB Type Magnets", Journal of Magnetism and Magnetic Materials, 350, Jan. 2014, 114-118.

Sprecher et al., "Life Cycle Inventory of the Production of Rare Earths and the Subsequent Production of NdFeB Rare Earth Permanent Magnets", Environmental Science & Technology, Feb. 27, 2014, 48, 3951-3958.

Sugimoto et al., "GHz microwave absorption of a fine a-Fe structure produced by the disproportionation of $Sm_2Fe_{17}$ in hydrogen ," J Alloy Compounds, 2000, 330-332:301-306.

Suk-Joong L. Kang, "Sintering: Densification, Grain Growth, & Microstructure," Elsevier, 2005, 19 pages.

Suzuki et al., "Recycling of Rare Earth Magnet Scraps: Part II Oxygen Removal by Calcium," Materials Transactions, 2001, 42(12), 2492-2498.

U.S. Appl. No. 14/307,267: Final Office Action dated Jan. 12, 2015, 19 pages.

U.S. Appl. No. 14/307,267: Non-final Office Action dated Aug. 25, 2014, 17 pages.

U.S. Appl. No. 14/448,823: Final Office Action dated Mar. 19, 2015, 27 pages.

U.S. Appl. No. 14/448,823: Non-final Office Action dated Nov. 6, 2014, 18 pages.

U.S. Appl. No. 14/543,210: Non-final Office Action dated Jan. 23, 2015 from, 20 pages.

U.S. Appl. No. 14/543,296: Non-final Office Action dated Feb. 25, 2015, 27 pages.

Uda, "Recovery of Rare Earths from Magnet Sludge by $FeCl_2$," Materials Transactions, 2002, 43(1), 55-62.

Uestuener et al., "Dependence of the Mean Grain Size and Coercivity of Sintered Nd—Fe—B Magnets on the Initial Powder Particle Size," IEEE Transactions on Magnetics, 42(10), Oct. 2006, 2897-2899.

Walton and Williams, "Harnessing Hydrogen to Recycle Rare Earth Metals", Recycling Technology, Materials World Journal, 2011, 19, 24-26.

Walton et al., "Recycling of Rare Earth Magnets", Proceedings of 23rd International Workshop on Rare Earth and Future Permanent Magnets & Their Applications, 2014, 26-30.

Walton et al., "The use of Hydrogen to Separate and Recycle NdFeB Magnets from Electronic Waste", REPM'12—Proceedings of the 22nd International Workshop on Rare-Earth Permanent Magnets and their Applications, Sep. 2-5, 2012, 4 pages.

Walton et al., "The Use of Hydrogen to Separate and Recycle Neodymium-Iron-Boron-Type Magnets From Electronic Waste", Journal of Cleaner Production, May 2015, 104, 236-241.

Walton, "Rare Earth Recovery", Materials World, Aug. 2011, 19(8), 4 pages.

Yamashita et al., "Characteristics of Epoxy Resin Bonded Magnets Prepared from Recycled Nd—Fe—B Based Melt-Spun Powder," Proceedings of the 16th International Workshop on Rare-Earth Magnets and Their Applications (Sendai Japan), 2000, pp. 695-703.

Zakotnik et al., "Hydrogen Decrepitation and Recycling of Sintered NdFeB-type Sintered Magnets," Proceedings of 19th International Workshop on Rare Earth Permanent Magnets & Their Applications, Sep. 2004, pp. 289-295.

Zakotnik et al., "Hydrogen Decrepitation of a 2/17 Sintered Magnet at Room Temperature", Journal of Alloys and Compounds, 450(1-2), Feb. 14, 2008, LI-L3.

Zakotnik et al., "Kinetic Studies of Hydrogen Desorption in SmCo 2/17-Type Sintered Magnets", Thermochimica Acta, 486(1-2), Mar. 20, 2009, pp. 41-45.

Zakotnik et al., "Multiple Recycling of NdFeB-type Sintered Magnets," J Alloys and Compounds, Feb. 5, 2009, 469(1-2), 314-321.

Zakotnik et al., "Possible Methods of Recycling NdFeB-type Sintered Magnets Using the HD/degassing Process," J. Alloys and Compounds, Feb. 14, 2008, 450(1-2),525-531.

Zakotnik et al., "Possible Methods of Recycling NdFeB-Type Sintered Magnets Using the HD/Degassing or HDDR Processes," Proceedings of the 18th International Workshop on HPMA (Grenoble, France), 2004, 8 pages.

Zakotnik et al., "The Hydrogen Decrepitation and Recycling of NdFeB-type Sintered Magnets", Proceedings of the 19th International Workshop on Rare Earth Permanent Magnets and Their Applications, 2006,13(1), 289-295.

\* cited by examiner

Decrepitation Process

Grain Boundary Engineering Process

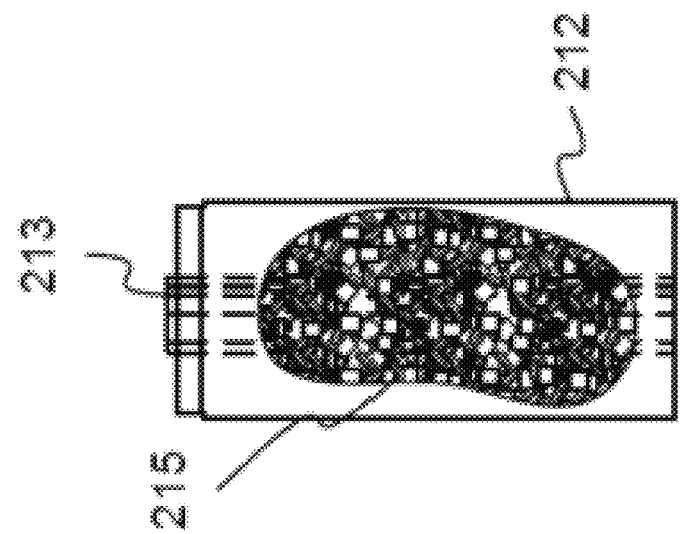
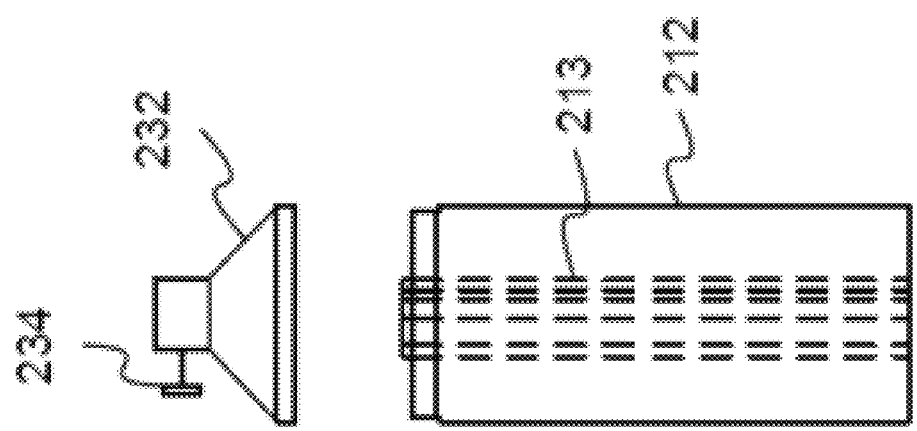
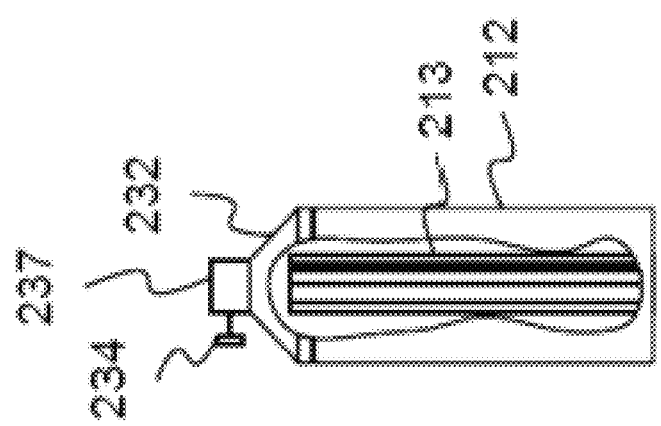

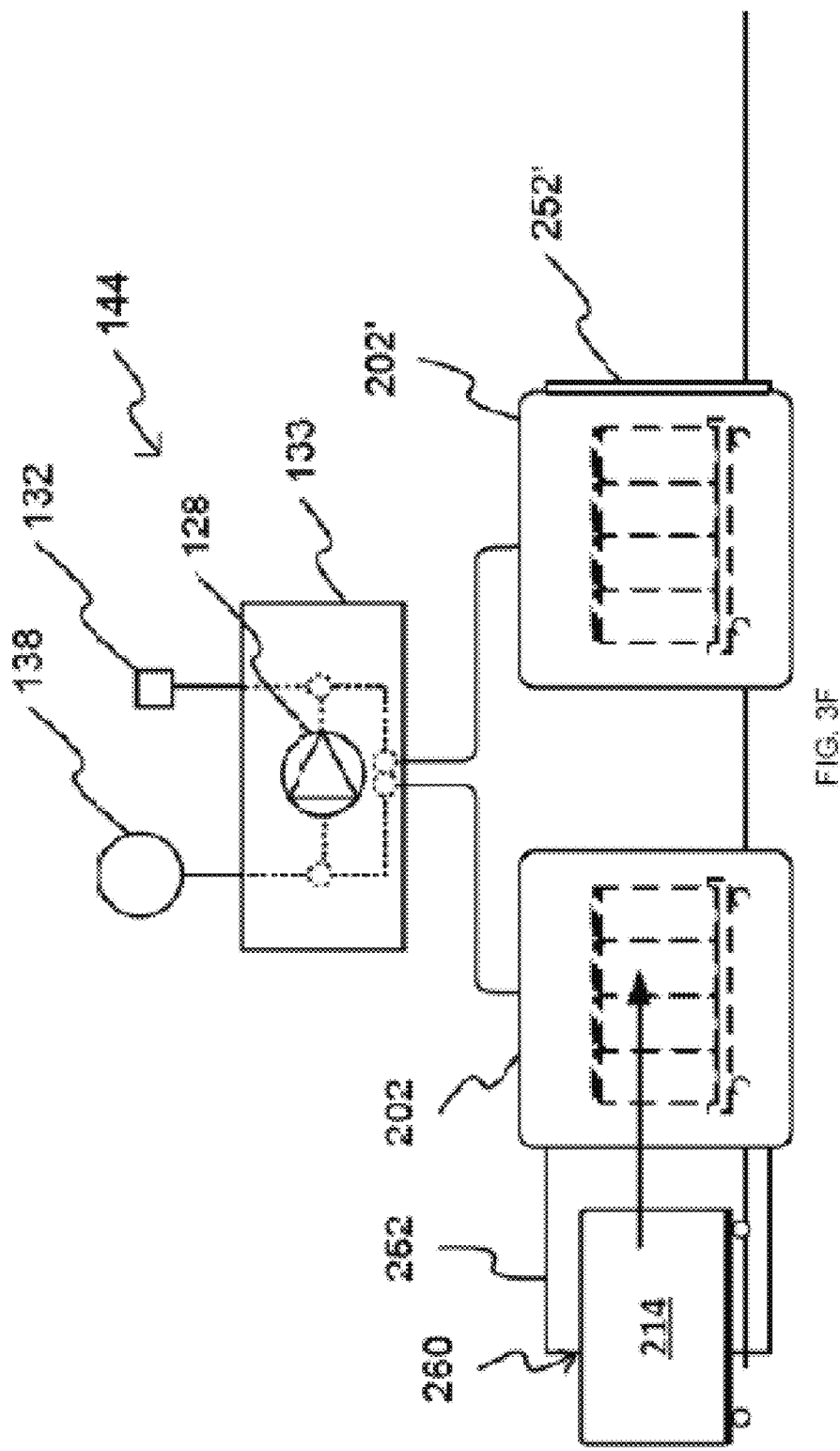

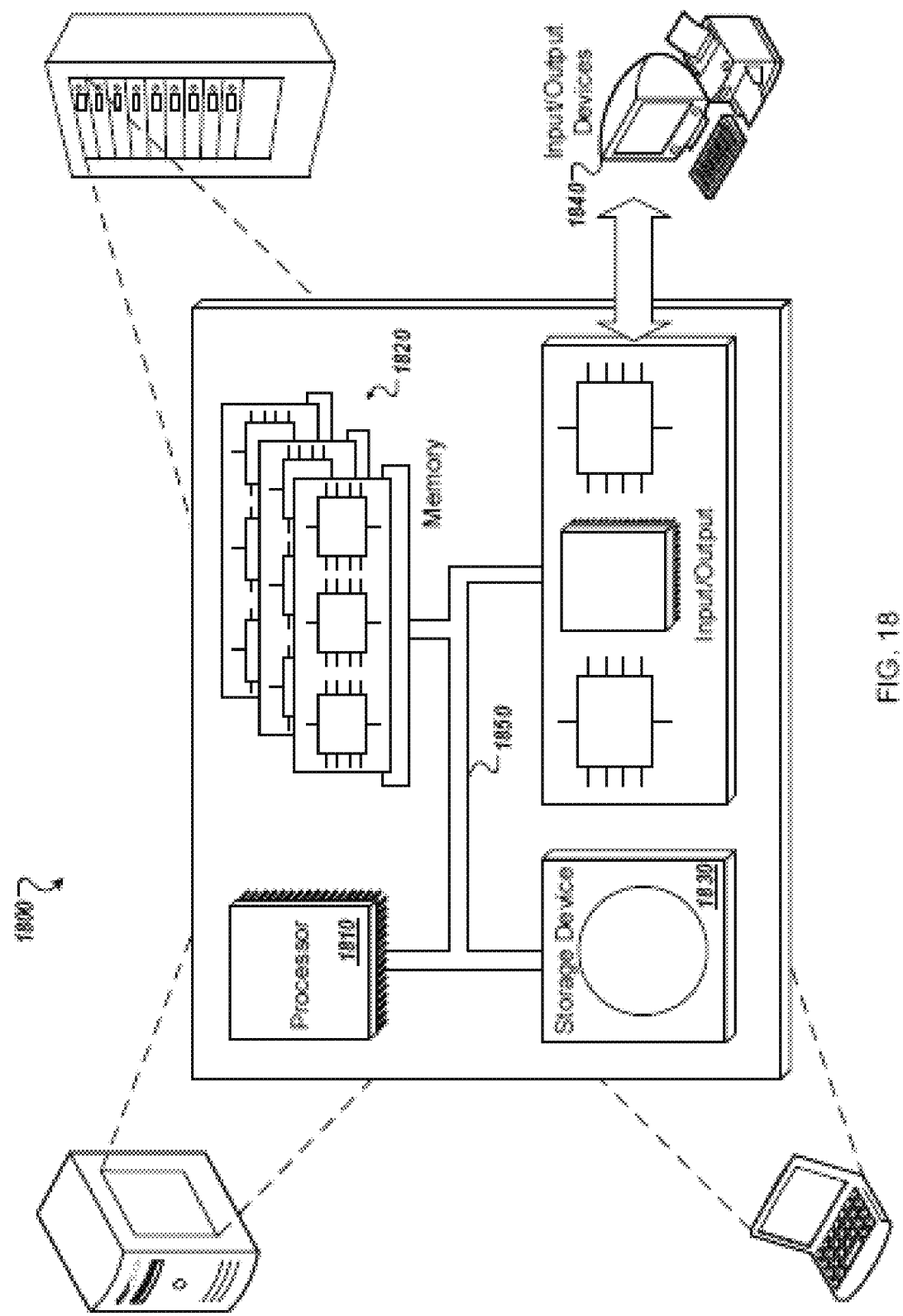

GRAIN BOUNDARY ENGINEERING

CROSS-REFERENCE TO RELATED APPLICATIONS

This application is a continuation of U.S. patent application Ser. No. 14/742,080, filed Jun. 17, 2015, which claims priority to U.S. Provisional Application No. 62/037,754, filed Aug. 15, 2014, the contents of both of which are incorporated herein by reference in their entireties for all purposes.

BACKGROUND

The present disclosure relates to the manufacture of a Neodymium-Iron-Boron (Nd—Fe—B) sintered magnet using Grain Boundary Engineering (GBE).

The global market for Rare Earth Permanent Magnets (REPM) is growing together with the range of REPM applications. REPM's exhibit high magnetic performance characteristics, and are used in the development of high-tech, high-efficiency applications in many industries including electronics, energy, transportation, aerospace, defense, medical devices, and information and communication technology.

For example, applications using the Nd—Fe—B permanent magnets include: starter motors, anti-lock braking systems (ABS), fuel-pumps, fans, loudspeakers, microphones, telephone ringers, switches, relays, hard-disk drives (HDD), stepper motors, servo-motors, magnetic resonance imaging (MRI), windmill generators, robotics, sensors, magnetic separators, guidance systems, satellites, cruise missiles, and so on.

The Nd—Fe—B type sintered magnet has a very fine tuned elemental composition, which includes, besides Nd, elements like Dy, Tb, Ga, Co, Cu, Al and other minor transitional metal elemental additions.

The use of heavy rare earth Dysprosium (Dy) may help to improve the temperature resistance of Nd—Fe—B magnets. Despite its performance-boosting characteristics, Dy resources are limited. Dy supply risk and scarcity cause a shortage of high temperature performance Nd—Fe—B magnets which can be used in energy-saving motor applications.

The present disclosure for Grain Boundary Engineering reduces the Dy content in the Nd—Fe—B product while maintaining high performance, increasing temperature resistance, and lowering production cost.

SUMMARY

A process may include creation of an Nd2Fe14B permanent magnet with specific performance characteristics, such as desired combinations of particle size, alignment, density, energy product (BHmax), remanence (Br), and coercivity (iHc). For instance, a Grain Boundary Engineering (GBE) process may include the production of Nd—Fe—B permanent magnets with a grain boundary modified rich phase. A GBE process may create new magnets from new magnetic material, e.g., that has not previously been used in a consumer product, from recycled magnetic material, e.g., that was previously used in a consumer product, or both.

The GBE process maintains an original grain phase of starting magnetic material, while modifying a grain boundary phase of the starting magnetic material. For instance, when creating a new Nd2Fe14B magnet, a GBE system keeps, from the starting material, at least 90 vol. % of the Nd—Fe—B 2:14:1 phase grains in a final magnetic product.

A GBE system may replace all or substantially all of an Nd-rich grain boundary phase with a new grain boundary phase made from additive material. In some examples, a GBE system maintains between about 90 to about 97 vol. % of the starting grains in a final magnetic product. In some examples, a GBE system replaces between about 3 to about 12 vol. % of the Nd-rich grain boundary phase with the new grain boundary phase.

In general, one innovative aspect of the subject matter described in this specification can be embodied in methods that include the actions of melting magnetic elements to create a molten alloy, forming, from the molten alloy, cast alloy flakes that include a plurality of 2:14:1 phase grains, pulverizing the cast alloy flakes to create a first powder while maintaining at least some of the 2:14:1 phase grains from the cast alloy flakes, pressing and aligning particles in the first powder to create a first compact, sintering the first compact to create a sintered compact, fragmenting the sintered compact to form a second powder while maintaining at least some of the 2:14:1 phase grains from the sintered compact, mixing the second powder with a) a rare earth material R and b) an elemental additive A to produce a homogeneous powder while maintaining at least some of the 2:14:1 phase grains from the second powder, wherein the rare earth material R includes at least one, at least two, or all three of: i) Nd, ii) Pr, or iii) Dy, and the elemental additive A includes at least one, at least two, or all three of: i) Co, ii) Cu, or iii) Fe, and sintering and magnetizing the homogeneous powder to form an Nd—Fe—B magnetic product. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Forming, from the molten alloy, the cast alloy flakes that include the plurality of 2:14:1 phase grains may include forming, from the molten alloy, cast alloy flakes that each include a plurality of 2:14:1 phase grains. The rare earth Material R and the elemental additive A, together, may be $Nd_{11.92}Dy_{42.32}Co_{38.39}Cu_{5.34}Fe_{2.03}$ at. %.

In some implementations, fragmenting the sintered compact includes fragmenting the sintered compact to an average particle size between 1 to 4 microns. Fragmenting the sintered compact to form the second powder may include removing, from the second powder, particles with a particle fraction size bigger than an average size of particles in the second powder to obtain an oxygen concentration of less than 1.98 at. % in the Nd—Fe—B magnetic product. Fragmenting the sintered compact to form the second powder may include fragmenting the sintered compact to form the second powder with an average particle size between about 1 micron to about 2 millimeters, the method including further fragmenting the second powder to an average particle size between about 1 to about 4 microns, and homogenizing the second powder. Homogenizing the second powder may include homogenizing the second powder that includes an average particle size between about 1 micron to about 2 millimeters, and mixing the second powder with a) the rare earth material R and b) the elemental additive A to produce the homogeneous powder may include mixing the second powder with an average particle size between about 1 to about 4 microns with a) the rare earth material R and b) the elemental additive A to produce the homogeneous powder. Mixing the second powder with a) the rare earth material R and b) the elemental additive A to produce the homogeneous powder may include mixing the second powder with an average particle size between about 1 micron to about 2 millimeters with a) the rare earth material R and b) the elemental additive A to produce the homogeneous powder, and homogenizing the second powder may include homogenizing the second powder that includes an average particle size between about 1 to about 4 microns.

In some implementations, fragmenting the rare earth material R and the elemental additive A separately from fragmenting the sintered compact to form the second powder, wherein mixing the second powder with a) the rare earth material R and b) the elemental additive A to produce the homogeneous powder includes mixing the second powder with a) the fragmented rare earth material R and b) the fragmented elemental additive A to produce the homogeneous powder. An atomic percentage of Co in the Nd—Fe—B magnetic product may be less than or equal to 3.098 at. %. An atomic percentage of Cu in the Nd—Fe—B magnetic product may be less than or equal to 0.1849 at. %. A combined atomic percentage of Fe and Co in the Nd—Fe—B magnetic product may be between about 76.3928 and about 83.1267 at. %. A combined atomic percentage of Fe and Co in the Nd—Fe—B magnetic product may be less than or equal to 77 at. %. A combined atomic percentage of Nd, Pr, and Dy in the Nd—Fe—B magnetic product may be greater than or equal to a combined atomic percentage of Nd, Pr, and Dy in the sintered compact. A combined atomic percentage of Nd, Dy, and Pr in the Nd—Fe—B magnetic product may be less than or equal to 18 at. %.

In some implementations, mixing the second powder with a) the rare earth material R and b) the elemental additive A to produce the homogeneous powder includes homogeneously distributing the rare earth material R and the elemental additive A within the second powder, and sintering and magnetizing the homogeneous powder to form the Nd—Fe—B magnetic product includes forming the Nd—Fe—B magnetic product with a concentration of the rare earth material R and a concentration of the elemental additive A that increases, on average, surrounding the 2:14:1 phase grains within the Nd—Fe—B magnetic product. The method may include replacing an old Nd-rich grain boundary phase from the sintered compact and included in the second powder with a new grain boundary phase that includes the rare earth material R and the elemental additive A.

In some implementations, the Nd—Fe—B magnetic product includes an amount of Nd in a range of [7.3635, 11.1038] (at. %), inclusive, an amount of Fe in a range of [76.3928, 80.0287] (at. %), inclusive, and an amount of B in a range of [5.7493, 6.4244] (at. %), inclusive. The Nd—Fe—B magnetic product may include an amount of O in a range of [0.09, 4.0] (at. %), inclusive, and an amount of C in a range of [0.01, 1.0] (at. %), inclusive. The Nd—Fe—B magnetic product may include an amount of Dy in a range of [0.199, 4.0535] (at. %), inclusive. The Nd—Fe—B magnetic product may include an amount of Pr in a range of [1.445, 3.6323] (at. %), inclusive. The Nd—Fe—B magnetic product may include an amount of Co in a range of [0, 3.098] (at. %), inclusive. The Nd—Fe—B magnetic product may include an amount of Cu in a range of [0.0508, 0.1849] (at. %), inclusive. A total amount of the rare earth material R in the Nd—Fe—B magnetic product may be in a range of [12.66, 15.03] (at. %), inclusive.

In some implementations, the rare earth material R includes at least one of i) an amount of Nd in a range of [6.1717, 11.8917] (at. %), inclusive, ii) an amount of Pr in a range of [1.5495, 4.821] (at. %), inclusive, or iii) an amount of Dy in a range of [0.2132, 5.3753] (at. %), inclusive, and the elemental additive A includes at least one of i) an amount of Co in a range of [0, 4.0948] (at. %), inclusive, ii) an amount of Cu in a range of [0.0545, 0.2445] (at. %), inclusive, or iii) an amount of Fe in a range of [81.1749, 85.867] (at. %), inclusive. These ranges are with respect to only the rare earth material R and the elemental additive A, and not the starting magnetic material, whether unused or waste magnet material.

In some implementations, sintering and magnetizing the homogeneous powder to form an Nd—Fe—B magnetic product includes sintering and magnetizing the homogeneous powder to form the Nd—Fe—B magnetic product with a remanence and a coercivity at least the same as the sintered compact. The coercivity of the Nd—Fe—B magnetic product may be between about 0 to about 20% greater than the coercivity of the sintered compact. Sintering and magnetizing the homogeneous powder to form an Nd—Fe—B magnetic product may include sintering and magnetizing the homogeneous powder to form the Nd—Fe—B magnetic product with a final remanence and a final coercivity, wherein the final remanence is about 97% of another remanence of the sintered compact and the final coercivity is at least 30% greater than another coercivity of the sintered compact. Sintering and magnetizing the homogeneous powder to form an Nd—Fe—B magnetic product may include sintering and magnetizing the homogeneous powder to form the Nd—Fe—B magnetic product with a final remanence and a final coercivity, wherein the final remanence is about 95% of another remanence of the sintered compact and the final coercivity is at least 80% greater than another coercivity of the sintered compact. Sintering and magnetizing the homogeneous powder to form an Nd—Fe—B magnetic product may include sintering and magnetizing the homogeneous powder to form the Nd—Fe—B magnetic product with a final remanence and a final coercivity, wherein the final remanence is about 5% greater than another remanence of the sintered compact and the final coercivity is at least the same as another coercivity of the sintered compact.

In general, one innovative aspect of the subject matter described in this specification can be embodied in a compound including $Nd_{1-20}Dy_{1-60}Co_{1-60}Cu_{0.1-20}Fe_{0.5-90}$ at. %. The compound may be $Nd_{7-14}Dy_{30-50}Co_{28-45}Cu_{1-10}Fe_{1-10}$ at. %. The compound may be $Nd_{8.5-12.5}Dy_{35-45}Co_{32-41}Cu_{3-6.5}Fe_{1.5-5}$ at. %. The compound may be $Nd_{11.92}Dy_{42.32}Co_{38.39}Cu_{5.34}Fe_{2.03}$ at. % at. %. The compound may include less than 0.12 at. % oxygen, less than 0.0058 at. % carbon, or both. In some examples, the compound may include between 0.00009 to 0.18 at. % oxygen, or between 0.028 to 0.1 at. % oxygen. In some examples, the compound may include between 0.0001 to 0.09 at. % carbon, or between 0.0058 to 0.009 at. % carbon.

In some implementations, the compound may consist essentially of the recited formula. For example, the compound may consist essentially of $Nd_{1-20}Dy_{1-60}Co_{1-60}Cu_{0.1-20}Fe_{0.5-90}$ at. %, $Nd_{7-14}Dy_{30-50}Co_{28-45}Cu_{1-10}Fe_{1-10}$ at. %, $Nd_{8.5-12.5}Dy_{35-45}Co_{32-41}Cu_{3-6.5}Fe_{1.5-5}$ at. %, or $Nd_{11.92}Dy_{42.32}Co_{38.39}Cu_{5.34}Fe_{2.03}$ at. % at. %. The compound may include less than 0.12 at. % oxygen, less than 0.0058 at. % carbon, or both. In some examples, the compound may include between 0.00009 to 0.18 at. % oxygen, or between 0.028 to 0.1 at. % oxygen. In some examples, the compound may include between 0.0001 to 0.09 at. % carbon, or between 0.0058 to 0.009 at. % carbon.

In general, one innovative aspect of the subject matter described in this specification can be embodied in a compound including at least one of: i) an amount of Nd in a range of [6.1717, 11.8917] (at. %), inclusive, ii) an amount of Pr in a range of [1.5495, 4.821] (at. %), inclusive, or iii) an amount of Dy in a range of [0.2132, 5.3753] (at. %), inclusive, and an amount of Co in a range of [0, 4.0948] (at. %), inclusive, an amount of Cu in a range of [0.0545, 0.2445] (at. %), inclusive, and an amount of Fe in a range of [81.1749, 85.867] (at. %), inclusive. The compound may include a combination of Nd, Pr, and Dy in a range of [13.236, 16.407] at. %, inclusive. The compound may include at least both Nd and Dy. The compound may include at least both Nd and Pr. The compound may include Nd. The compound may include 0.00009 to 0.18 at. % oxygen (O). The compound may include 0.028 to 0.1 at. % oxygen (O). The compound may include 0.0001 to 0.09 at. % carbon (C). The compound may include 0.0058 to 0.009 at. % carbon (C).

In general, one innovative aspect of the subject matter described in this specification can be embodied in methods that include the actions of melting Cu, Co, and Fe and one or more of Nd, Pr, Dy, or Tb to create a molten alloy, and cooling the molten alloy to create cast alloy flakes. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of melting Cu, Co, and Fe and one or more of Nd, Pr, Dy, or Tb to create a molten alloy, and fragmenting, using a spray atomizing apparatus, the molten alloy with a high velocity gas jet to create compound droplets formed from the Cu, Co, Fe and the one or more of Nd, Pr, Dy, or Tb. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Melting Cu, Co, and Fe and one or more of Nd, Pr, Dy, or Tb to create the molten alloy may include induction melting Cu, Co, and Fe and one or more of Nd, Pr, Dy, or Tb to create the molten alloy. Melting Cu, Co, and Fe and one or more of Nd, Pr, Dy, or Tb to create the molten alloy may include arc melting Cu, Co, and Fe and one or more of Nd, Pr, Dy, or Tb to create the molten alloy. Cooling the molten alloy to create the cast alloy flakes may include cooling the molten alloy to create an ingot, re-melting the ingot to make a second molten alloy, and cooling the second molten alloy to create the cast alloy flakes.

In some implementations, the method includes agitating the molten alloy using argon purging to homogeneously distribute the Cu, the Co, and the Fe and the one or more of Nd, Pr, Dy, or Tb throughout the molten alloy. Melting Cu, Co, and Fe and one or more of Nd, Pr, Dy, or Tb to create the molten alloy may include melting, in an inert atmosphere, Cu, Co, and Fe and one or more of Nd, Pr, Dy, or Tb to create the molten alloy. Melting, in the inert atmosphere, Cu, Co, and Fe and one or more of Nd, Pr, Dy, or Tb to create the molten alloy may include melting Cu, Co, and Fe and one or more of Nd, Pr, Dy, or Tb in the inert atmosphere that includes a reducing agent. Melting Cu, Co, and Fe and one or more of Nd, Pr, Dy, or Tb to create the molten alloy may include melting, at a pressure between 1.5 to 1.8 bar, Cu, Co, and Fe and one or more of Nd, Pr, Dy, or Tb to create the molten alloy.

In some implementations, melting Cu, Co, and Fe and one or more of Nd, Pr, Dy, or Tb to create the molten alloy includes melting Cu, Co, and Fe and one or more of Nd, Pr, Dy, or Tb to create the molten alloy using vacuum induction. Melting Cu, Co, and Fe and one or more of Nd, Pr, Dy, or Tb to create the molten alloy may include melting Cu, Co, and Fe and one or more of Nd, Pr, Dy, or Tb to create the molten alloy at 1450° C. Melting Cu, Co, and Fe and one or more of Nd, Pr, Dy, or Tb to create the molten alloy may include melting, in an alumina crucible, Cu, Co, and Fe and one or more of Nd, Pr, Dy, or Tb to create the molten alloy. Melting Cu, Co, and Fe and one or more of Nd, Pr, Dy, or Tb to create the molten alloy may include melting, in a zirconium crucible, Cu, Co, and Fe and one or more of Nd, Pr, Dy, or Tb to create the molten alloy. Melting Cu, Co, and Fe and one or more of Nd, Pr, Dy, or Tb to create the molten alloy may include melting, in a copper crucible, Cu, Co, and Fe and one or more of Nd, Pr, Dy, or Tb to create the molten alloy.

In some implementations, melting Cu, Co, and Fe and one or more of Nd, Pr, Dy, or Tb to create the molten alloy may include melting, in a high density crucible, Cu, Co, and Fe and one or more of Nd, Pr, Dy, or Tb to create the molten alloy. Melting Cu, Co, and Fe and one or more of Nd, Pr, Dy, or Tb to create the molten alloy may include melting, in a high purity crucible, Cu, Co, and Fe and one or more of Nd, Pr, Dy, or Tb to create the molten alloy.

In some implementations, melting Cu, Co, and Fe and one or more of Nd, Pr, Dy, or Tb to create the molten alloy includes melting Nd. Melting Cu, Co, and Fe and one or more of Nd, Pr, Dy, or Tb to create the molten alloy may include melting Dy. Melting Cu, Co, and Fe and one or more of Nd, Pr, Dy, or Tb to create the molten alloy may include melting Nd and Dy. Melting Cu, Co, and Fe and one or more of Nd, Pr, Dy, or Tb to create the molten alloy may include melting Pr. Melting Cu, Co, and Fe and one or more of Nd, Pr, Dy, or Tb to create the molten alloy may include melting Tb. Melting Cu, Co, and Fe and one or more of Nd, Pr, Dy, or Tb to create the molten alloy may include melting Pr and Tb.

In some implementations, melting Cu, Co, and Fe and one or more of Nd, Pr, Dy, or Tb to create the molten alloy includes melting, in a crucible, Cu, Co, and Fe and one or more of Nd, Pr, Dy, or Tb to create the molten alloy, and cooling the molten alloy to create the cast alloy flakes includes cooling the molten alloy in the crucible. Cooling the molten alloy to create the cast alloy flakes may include pouring the molten alloy onto a water cooled wheel to create the cast alloy flakes. Pouring the molten alloy onto the water cooled wheel to create the cast alloy flakes may include pouring the molten alloy onto a copper water cooled wheel to create the cast alloy flakes.

In some implementations, cooling the molten alloy to create the cast alloy flakes includes cooling the molten alloy at a rate of 105 Kelvin/second. Cooling the molten alloy to create the cast alloy flakes may include cooling the molten alloy at a rate of 10 to 100 Kelvin/second. Cooling the molten alloy to create the cast alloy flakes may include cooling the molten alloy in a vacuum with pressure greater than 10-1 bar.

In some implementations, fragmenting, using a spray atomizing apparatus, the molten alloy with a high velocity gas jet to create the compound droplets formed from the Cu, Co, Fe and the one or more of Nd, Pr, Dy, or Tb includes removing less than about 2 wt. % of the Cu, Co, Fe and the one or more of Nd, Pr, Dy, or Tb from the molten alloy when creating the compound droplets. Fragmenting, using a spray atomizing apparatus, the molten alloy with a high velocity gas jet to create the compound droplets formed from the Cu, Co, Fe and the one or more of Nd, Pr, Dy, or Tb may include creating the compound droplets with an oxygen concentration of up to 0.04 wt. %, or less than 0.12 at. %, with a carbon concentration of less than 0.0058 at. %, or both. In some examples, the compound droplets may include between 0.00009 to 0.18 at. % oxygen, or between 0.028 to 0.1 at. % oxygen. In some examples, the compound droplets may include between 0.0001 to 0.09 at. % carbon, or between 0.0058 to 0.009 at. % carbon. Fragmenting, using a spray atomizing apparatus, the molten alloy with a high velocity gas jet to create the compound droplets formed from the Cu, Co, Fe and the one or more of Nd, Pr, Dy, or Tb may include fragmenting the molten alloy with an inert gas jet. Fragmenting, using a spray atomizing apparatus, the molten alloy with a high velocity gas jet to create the compound droplets formed from the Cu, Co, Fe and the one or more of Nd, Pr, Dy, or Tb may include fragmenting the molten alloy with a gas jet with a velocity of 500 m/s.

In some implementations, fragmenting, using a spray atomizing apparatus, the molten alloy with a high velocity gas jet to create the compound droplets formed from the Cu, Co, Fe and the one or more of Nd, Pr, Dy, or Tb includes fragmenting the molten alloy with a gas jet with a pressure of 0.18 to 0.58 MPa. Fragmenting, using a spray atomizing apparatus, the molten alloy with a high velocity gas jet to create the compound droplets formed from the Cu, Co, Fe and the one or more of Nd, Pr, Dy, or Tb may include creating the compound droplets with an average diameter of 140 to 180 micrometers. Fragmenting, using a spray atomizing apparatus, the molten alloy with a high velocity gas jet to create the compound droplets formed from the Cu, Co, Fe and the one or more of Nd, Pr, Dy, or Tb may include creating the compound droplets with a density of 8.08 g/cm$^3$.

The subject matter described in this specification can be implemented in particular embodiments and may result in one or more of the following advantages. In some implementations, the process has low energy consumption and low material consumption. In some implementations, Grain Boundary Engineering (GBE) may reduce economic and/or environmental costs, without diminishing the magnetic performance and deliverable value of a final product, a fully dense Nd—Fe—B sintered magnet. In some implementations, a GBE Nd—Fe—B magnet product may have an improved performance, e.g., high temperature performance, e.g., up to 200° C. In some implementations, GBE might not have a limitation on the thickness of a magnet being processed, e.g., and may allow homogeneous distribution of additive material throughout the whole body of a sintered magnet, when compared with other forms of magnet processing. In some implementations, GBE may control an amount of dopant material, e.g., added to magnetic powder. In some implementations, GBE may allow precise tailoring of magnetic performance to meet customer requirements. In some implementations, GBE may allow precise addition of additive materials to a sintered magnet to improve the performance of the sintered magnet while maintaining an original grain phase, e.g., a 2:14:1 phase, of the final sintered magnet, e.g., Nd2Fe14B1. For instance, the final sintered magnet may not include any of the additive material in the grain phase, e.g., the 2:14:1 phase.

In some implementations, the final sintered magnet produced by GBE modification may have improved material corrosion properties. In some examples, the GBE modification process has improved processing methodologies, grain boundary character control, homogeneous mixing, composition and microstructure control, or a combination of two or more of these, compared to other magnet processing techniques. For instance, the GBE modification process may manipulate the microstructure of the initial sintered magnet to create a final sintered magnet with improved magnetic properties. A GBE system may control the microstructure, for example grain or domain size, of the final sintered magnet to enhance corrosion resistance and magnetic performance. The GBE process may control the creation of a new grain boundary, e.g., Nd11.92Dy42.32Co38.39Cu5.34Fe2.03 at. %, within a grain matrix, e.g., an Nd2Fe14B matrix, which may improve corrosion stability of the Nd—Fe—B sintered or recycled magnet body. In some implementations, a GBE system creates final sintered magnets with improved magnetic performance, resistance to inter-granular degradation, improved corrosion resistance, or two or more of these. The GBE system may be used to create final sintered magnets from recycled magnetic material, only virgin magnetic material, e.g., to create the cast alloy flakes and the rare earth transitional elemental additive material, or a combination of both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-E show reaction bottles which may be placed on a carriage to permit transport of the reaction bottles into and out of a reaction chamber.

FIGS. 3F-G show an example of another hydrogen mixing reactor with a pair of reaction chambers.

FIG. 18 is a block diagram of a computing system that can be used in connection with computer-implemented methods described in this document.

Like reference numbers and designations in the various drawings indicate like elements.

DETAILED DESCRIPTION

Figure 1A:
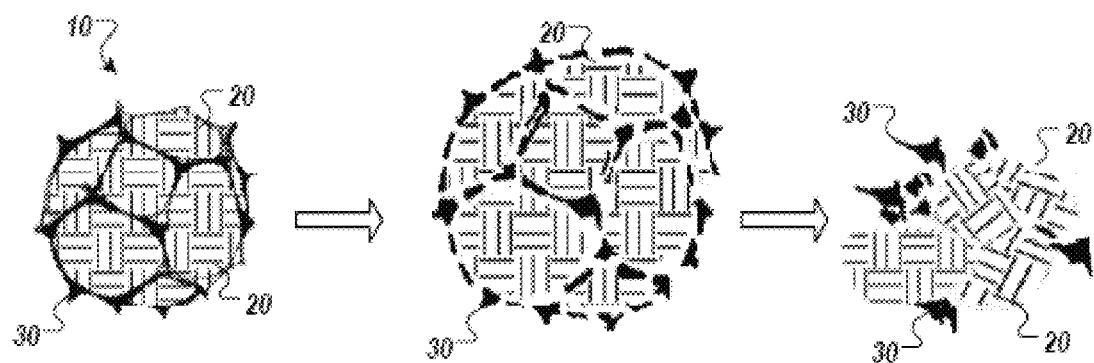
FIGS. 1A-B show an example of a grain boundary engineering process.

A process may include creation of an $N_{d2}Fe_{14}B$ permanent magnet with specific performance characteristics, such as desired combinations of particle size, alignment, density, energy product (BHmax), remanence (Br), and coercivity (iHc). For instance, a Grain Boundary Engineering (GBE) process may include the production of Nd—Fe—B permanent magnets with a grain boundary modified rich phase. A GBE process may create new magnets from new magnetic material, e.g., that has not previously been used in a consumer product, from recycled magnetic material, e.g., that was previously used in a consumer product, or both. The GBE process may also be referred to as a Grain Boundary Modification (GBM) process.

As described in more detail below, the GBE process maintains an original grain phase of starting magnetic material, while modifying a grain boundary phase of the starting magnetic material. For instance, when creating a new Nd2Fe14B magnet, a GBE system keeps, from the starting material, at least 90 vol. % of the Nd—Fe—B 2:14:1 phase grains in a final magnetic product. A GBE system may replace all or substantially all of an Nd-rich grain boundary phase with a new grain boundary phase made from additive material. In some examples, a GBE system maintains between about 90 to about 99.9 vol. % of the starting material, e.g., 2:14:1 phase grains and grain boundary phase, in a final magnetic product, preferably between about 92 to about 99.75 vol. % of the starting material is included in the final magnetic product, e.g., 0.25 to 8 at. % of the final magnetic product is additive material. In some examples, the GBE system maintains between about 90 to about 97 vol. % of the starting material. In some examples, a GBE system replaces between about 3 to about 12 vol. % of the Nd-rich grain boundary phase with the new grain boundary phase. For instance, the GBE system may replace between 3 to 4.8 vol. % of the Nd-rich grain boundary phase for magnets with a Br between 1.48 to 1.55 T and an iHc between 800 to 1000 kA/m, may replace between 6 to 7.2 vol. % of the Nd-rich grain boundary phase for magnets with a Br between 1.31 to 1.38 T and an iHc between 1300 to 1700 kA/m, or may replace between 9 to 12 vol. % of the Nd-rich grain boundary phase for magnets with a Br between 1.18 to 1.26 T and an iHc between 1800 to 2500 kA/m (all values inclusive).

In some implementations, a GBE system may melt alloys and pure elements, e.g., Nd—Pr, Fe—B and Fe, in an argon atmosphere at about 1455° C. Some example alloys may include the following elements (i) Nd, Pr, Fe, FeB, and B; (ii) Nd, Fe, Co, Cu, and Dy, or (iii) Nd, Fe, Co, Cu, Dy, a composition with a ratio of Nd 75:Pr 25, a composition with a ratio of Dy 80:Fe 20 and Pr. In some examples, one or more of these elements may be combined with an alloy of the other elements.

The GBE system pours the molten alloy on a water cooled copper wheel spinning at about 35 rotations per minute (RPM) to form cast alloy flakes. The cast alloy flakes may have a thickness of about 0.2 mm. The cast alloy flakes may have a grain size ranging from about 5 μm to about 80 μm. In some examples, waste magnet material may also be used to form the cast alloy flakes, e.g., waste magnetic material left over from the creation of other magnets.

The GBE system pulverizes the cast alloy flakes, e.g., using a jet milling process, to create fine powders with particles that have a size between about 0.9 μm to about 15 μm. The GBE system presses the fine powders under inert atmosphere at between about 5° C. to about 15° C. in a magnetic field ranging from 400 kA/m to 1200 kA/m to create a rectangular compact. The GBE system may apply pressure to the fine powders in a direct perpendicular to the magnetic field. The rectangular compact may have a length of about 35 mm, a width of about 37 mm, and a height of about 40 mm.

The GBE system sinters the rectangular compact at about 1070° C. to create a sintered compact, e.g., an Nd—Fe—B sintered block. The sintered compact, or other sinter Nd—Fe—B magnet compacts, are then processed by the GBE system using the Grain Boundary Engineering process to modify only the rare earth rich phase of the Nd—Fe—B sintered block, e.g., or an Nd—Fe—B magnet. For instance, the GBE system modifies the Nd-rich grain boundary phase of the Nd—Fe—B sintered block.

For example, the GBE system transfers the Nd—Fe—B based sintered blocks to a mixing reactor and places additive material, e.g., Nd—Pr or Nd—Dy—Co—Cu—Fe or Nd—Dy, in the mixing reactor.

The GBE system may mix a powder created from the sintered blocks with the additive material in either inert or hydrogen atmosphere, to name a few examples. When mixing in a hydrogen atmosphere, the GBE system may mix the powder and the additive material for at least 15 hours at 5 RPM. In some examples, as shown in FIG. 1A, the GBE system uses a decrepitation process, e.g., a hydrogen decrepitation process, to create the fine powders. The GBE system may use any appropriate method to separate 2:14:1 phase grains 20 in an Nd2Fe14B magnet 10 from an Nd-rich grain boundary phase 30 or, similarly, the phase grains from the grain boundary phase of another type of magnetic material.

In some examples, the mixing may include both coarse and fine mixing. For instance, coarse mixing may create particles from the sintered block with an average size of between 1 μm to 2000 mm. The coarse mixing step may include evacuating the mixing reactor before admitting hydrogen at a pressure of 0.9 bar.

After mixing, the GBE system causes the combined powder, formed from the sintered blocks and the additive material, to absorb hydrogen by exposing the combined powder to hydrogen at room temperature. The GBE system then partially degasses the combined powder at 600° C. in situ until vacuum is restored in the mixing reactor. For instance, during processing, the GBE system may oxidize the Nd-rich grain boundary phase so that it does not react with the hydrogen. The GBE system may sieve the Nd-rich grain boundary phase material to remove the Nd-rich grain boundary phase material from the Nd—Fe—B grains.

The GBE system then further homogenizes the combined powder using jet milling to achieve an approximate fine powder particle size of 0.9 to 3.5 μm. The GBE system may then sieve the fine combined powder to remove large oxidized particles. This sieving may remove the Nd-rich grain boundary phase material or may be a separate sieving process.

The GBE system may compact the fine combined powder in inert atmosphere between 5-15° C. in a magnetic field to form a magnetized green compact. The GBE system may transfer the green compact to a hydraulic chamber and subject the green compact to an isostatic pressure of 60 MPa. For instance, the GBE system may press the green compact in the hydraulic chamber to ensure that a final density of a sintered product, e.g., after sintering and annealing, is close to theoretical value, e.g., greater than 4.5 g/cm3. In some examples, the GBE system may compact the fine combined powder in the magnetic field without pressing the green compact in a hydraulic chamber, e.g., when the density of the magnetized green compact formed in the magnetic field is greater than 4.5 g/cm$^3$.

The GBE system may sinter and anneal the green compact under vacuum, e.g., in a sintering chamber. Once the sintering temperature is reached, Ar partial pressure in the sintering chamber can be adjusted between 200-500 mbar, absolute pressure. For instance, introduction of Ar, e.g., after around twenty minutes at the maximum sintering temperature, may assist the sintering process to reach the full density of the sintered body, e.g., fully dense sintered magnet.

Figure 1B:
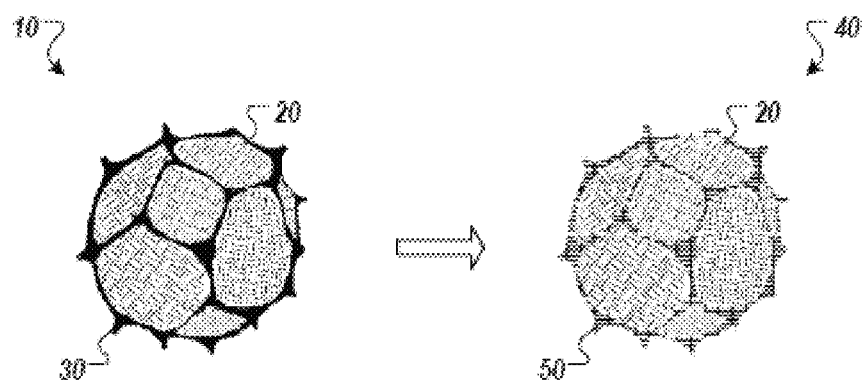

In some implementations, the result of the GBE processing is a fully dense Nd—Fe—B sintered magnet 40 with a modified grain boundary 50, e.g., as shown in FIG. 1B, in which the GBE system may control an amount of doped or additive material in the fully dense sintered magnet. The GBE process may be a reproducible and precise method for tailoring of magnetic performance of sintered magnets, and may provide a significant reduction of heavy rare earth elements, e.g., Dy, Tb, etc., homogeneous distribution of additive material throughout the whole body of full dense sintered magnet, e.g., throughout the modified grain boundary 50, and a customized microstructure design, e.g., according to customer requirements.

The new Nd—Fe—B product 40 may exhibit improved temperature resistance (coercivity, iHc), temperature profile, and corrosion resistance. A GBE method may reduce Dysprosium (Dy) material input requirements and lower basic operational costs. A GBE process may combine 81-99.9 at. % of magnetic material and/or magnet and 0.1-19 at. % of rare earth elemental additives. A GBE process may have a high affinity for recovery and improvement of magnetic performance. Some implementations may alleviate rare earth supply risk and end-user vulnerability to rare earth price volatility, play an important role in creating a more sustainable magnet supply chain, or a combination of any two or more of those. In some implementations, material input requirement costs are reduced by utilizing less Dy material inputs. Resource requirements in terms of materials, waste, pollution, and energy may be reduced with concomitant benefits.

A method for GBE may employ methods for oxygen suppression. For instance, an Nd—Fe—B sintered magnet manufactured using Grain Boundary Engineering may have an oxygen content of 1.98 at. % or less, or between 1.32 at. % and 1.98 at. %, inclusive. Some examples of the atomic percentage of oxygen content in Nd—Fe—B sintered magnets manufactured using Grain Boundary Engineering include 1.00 at. %, 1.10 at. %, 1.32 at. %, 1.33 at. %, 1.49 at. %, 1.51 at. %, 1.74 at. %, 1.81 at. %, 1.83 at. %, 1.91 at. %, and 1.98 at. %.

A method may include the addition of new rare earth material in a range of 0.1 to 19 at. % of the starting material. Further details and optional features of some implementations include operations that maintain, improve, and/or provide specific targeted Nd—Fe—B magnet performance characteristics. Such performance characteristics may include desired combinations of particle size, alignment, density, energy product (BHmax), remanence (Br), and coercivity (iHc).

In a mixing phase, materials are mixed with additive to achieve desired final properties in a finished product. The mixing process may include crushing, grinding, milling, or the use of hydrogen to break down materials to coarse powder. In some implementations, the magnets, e.g., Nd—Fe—B or Sm2Co17 type magnets, are processed into a powder using a hydrogen mixing reactor, and the powder material is combined in situ with additives to improve coercivity.

Processes for mixing include milling, cutting, high energy ball milling, roller milling, sawing, jet milling, tumbling, shaking, jaw crushing, and hydrogen mixing. In some implementations, hydrogen mixing is a process for homogenizing starting material and fresh rare earth elemental additives. In the hydrogen mixing process, hydrogen enters the Φ phase, e.g., $Nd_2Fe_{14}B$, and rare earth rich grain boundaries of magnets and reacts with the rare earth elements forming a hydride with hydrogen being trapped in the crystalline structure. The crystal structure expands as a result of hydrogen absorption and hydride formation causing the brittle structure to fracture. The result can be effective for mixing and, at the same time, for fragmentation of the material and additive.

The term "fragmentation" as used herein comprehends any type of division of solid materials including mechanical, chemical, thermal, radiative, or any suitable process including combinations thereof. The degree of fragmentation may be from coarse division to complete disintegration to a fine powder.

In situ production of a desired fine and impurity-free powder mixture using hydrogen mixing reactor, together with essential rare earth elemental additives and/or hydride additions of fresh elements, may be effective for improving magnetic performance from Nd—Fe—B-type sintered magnetic materials. Addition of 0.1 wt. %-19 wt. %, preferably 1%, of additive elemental additives may be included to improve the magnetic performance and physical properties, e.g., density or corrosion resistance, of the magnetic material. The additions and magnetic material may be loaded in the hydrogen mixing reactor to generate a coarse powder mixture of rare earth including $Pr_{75}Nd_{25}Hx$, where x is ranging from 1 to 3 mole fractions.

Figure 2:
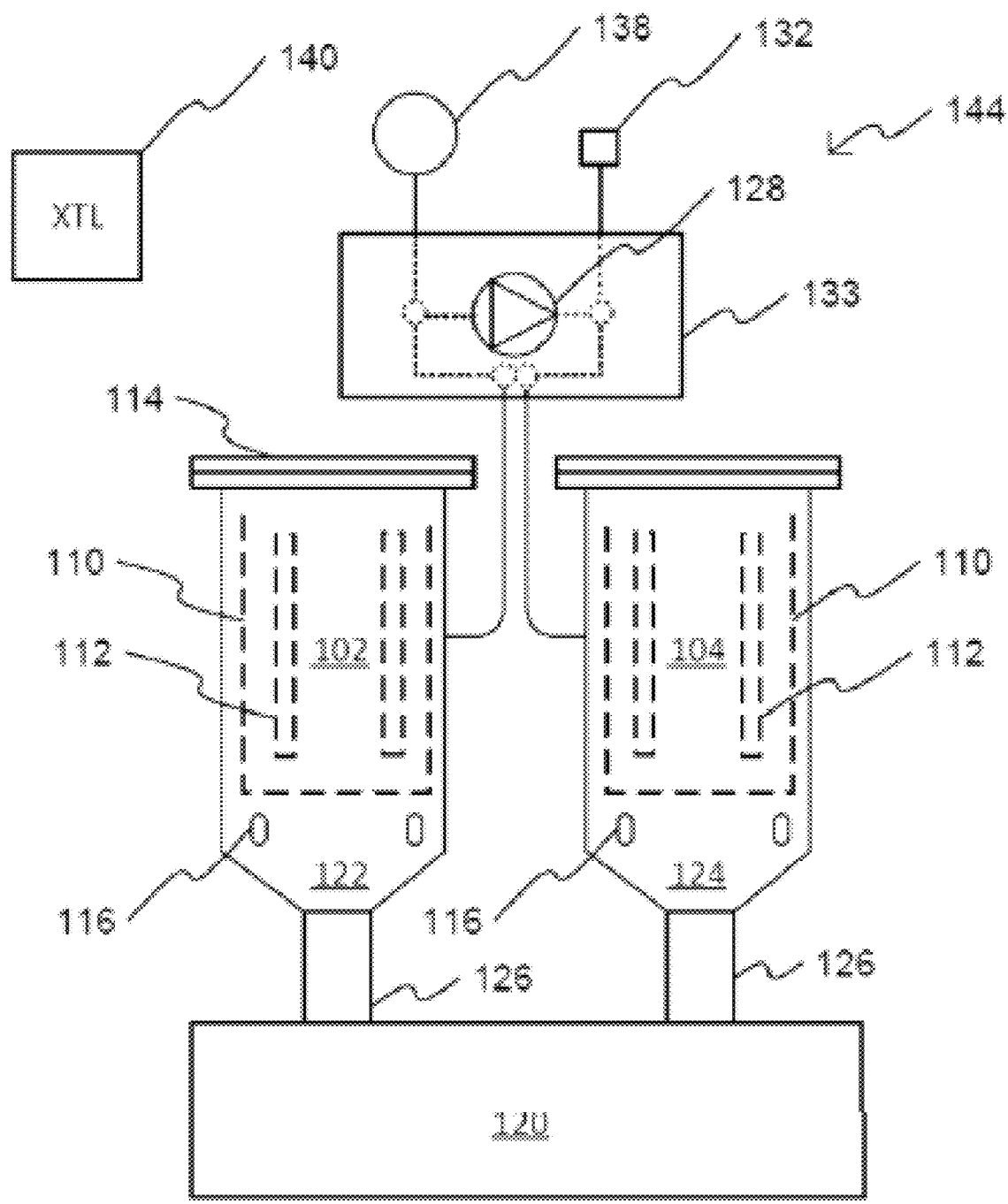
FIG. 2 shows an example of a hydrogen mixing reactor.

FIG. 2 shows an example of a hydrogen mixing reactor that breaks magnetic material, e.g., a sintered magnet, into particles and mixes the particles. The magnetic material may be waste magnetic material, magnetic material from an end-of-life product, or newly created magnetic material, e.g., that has not been used in a consumer product. In some examples, the magnetic material may be from a newly formed sintered magnet created from recycled magnetic material.

In some implementations, the hydrogen mixing reactor mixes elemental additives with the particles. The hydrogen mixing reactor may create particles with a target average diameter of between about 1 micron to about 2 millimeters, or between about 4 to about 7 microns. The hydrogen mixing reactor includes two vessels 102, 104, placed in mixing chambers 122, 124 respectively, that each have inner linings 110 that hold the magnetic material and facilitate the circulation of gas around the magnetic material through apertures in the inner linings 110.

The filling of one of the vessels 102, 104 with hydrogen gas while the vessel contains rare earth materials causes the fragmentation of the magnetic material due to hydrogen mixing. Exposure to hydrogen gas can last for between about 1 to 40 hours. The exposure may be for shorter or longer periods and the pressure and temperature may be selected based on process engineering requirements, other processing stages used to achieve a target particulate size, other processing stages used to achieve a target homogeneous mixture, or any combination of two or more of these.

Diffusion promotion devices 112, such as snorkels or pipes, with apertures, may be used to ensure that hydrogen mixing causes the breakdown of the magnets in the reactor vessels 102, 104, and to ensure that the pile-up of particulate matter does not prevent some of the magnetic material from exposure to the hydrogen gas. Circulation promoters (not shown) such as stirrers, fans, or gas feeds may help promote hydrogen gas flow in the vessels 102, 104. Magnetic material that falls through the apertures of the inner lining 110 may be stirred by a stirrer located at the bottom of the respective vessel 102, 104.

A removable lid 114 may be provided for the introduction of magnetic material into the vessels 102, 104. For example, the magnetic material may be placed in the vessels 102, 104 shown in FIG. 2. Magnetic material may be transferred into the inner linings 110 by a conveyor or manually, with or without a controlled environment. A small fraction of rare earth transitional elemental additive material may be added to the inner linings 110 to bring the properties of a final product made from the magnets to a predefined specification remanence, energy product, and/or coercivity. In some examples, an additive may be added to crushed magnetic material after mixing to adjust the properties of the final product. Some examples of the additive material may include Nd, Pr, Dy, Gd, Tb, La, Ce, Yb, Ho, or Eu, or combinations of two or more of these.

The vessels 102, 104 may withstand a predefined pressure. For instance, the hydrogen mixing reactor may include a vacuum pump. In some implementations, the pressure may be increased up to 60 bar. The vessels 102, 104 may also withstand lower pressures. The vessels 102, 104 may have thermostatically controlled heaters 116 and pressure regulation controls.

The hydrogen mixing reactor includes gas source connections 138 that introduce hydrogen or other gases into the vessels 102, 104 through a pumping assembly 128 and a valve assembly 133. The pumping assembly 128, the valve assembly 133 a gas management component 144, or a combination of two or more of these, may feed gas directly into the diffusion promotion devices 112, to ensure full volumetric perfusion of the magnetic material in the vessels 102, 104. In some examples, the pumping assembly 128 and the valve assembly 133 may connect the vessels 102, 104, allowing for vacuum pump evacuation of the vessels 102, 104, e.g., for degassing or primary loading of gas, pumping gas from one vessel to the other, e.g., to reclaim hydrogen gas, venting to atmosphere, e.g., using ambient connections 132 to the external atmosphere, pressurizing the vessels 102, 104, backfilling one or both of the vessels 102, 104 with inert gas, performing other reclamation processes or combinations of two or more of these. A controller 140 may be connected to the valve assembly 133 and the pump assembly 128 to automate the hydrogen mixing processes and hydrogen transfer between the vessels 102, 104.

During the hydrogen mixing process, magnetic particles fall from the vessels 102, 104 through chutes 126 into a chamber 120. The magnetic particles may be removed from the chamber 120 for further processing. In some implementations, press-withstanding valves may be employed at the openings between the chutes 126 and the vessels 102, 104.

In some implementations, one of the vessels 102, 104 is made gas tight and evacuated using the gas management component 144. The selected vessel 102, 104 may then be filled with hydrogen from a gas source, e.g., through the pumping assembly 128, to prepare the selected vessel 102, 104 for mixing and fragmentation of magnetic material. After mixing and fragmentation, the hydrogen may be transferred by the gas management component 144 to the other vessel 104, 102, e.g., by evacuating the hydrogen from the selected vessel 102, 104 and transferring the hydrogen to the other vessel 104, 102. As each vessel's contents are subjected to hydrogen mixing, the hydrogen can be recovered and transferred to the other vessel 102, 104 and the process of hydrogen mixing is repeated in the other vessel.

In some implementations, a gas storage chamber is included in the gas management component 144 and the hydrogen evacuated from one of the vessels 102, 104 is temporarily stored in the gas storage chamber (not shown) prior to transfer to the other vessel 102, 104, e.g., between hydrogen mixing cycles. The use of the gas storage chamber may allow the hydrogen mixing reactor to include only one vessel. In some examples, the hydrogen mixing reactor may include more than two vessels. The gas storage chamber may include multiple chambers constituting respective stages with volumes chosen to maximize the energy economy for transfer of gas to and from the chambers and the vessels 102, 104 by minimizing the pressure drop or elevation during transfer.

Figure 3A:
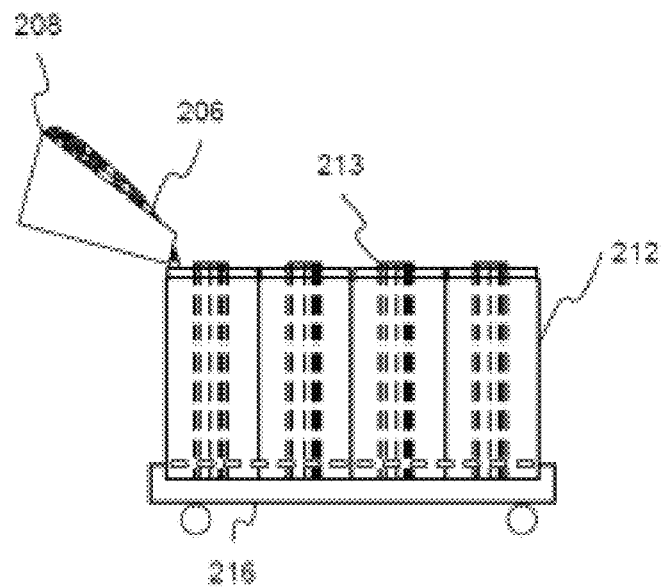

FIG. 3A shows a set of four reaction bottles 212 on a carriage 216, which transports the reaction bottles 212 into and out of a reaction chamber, e.g., one of the reaction chambers 202, 202' shown in FIG. 3F. The reaction chambers 202, 202' may be used in conjunction with or instead of the hydrogen mixing reactor shown in FIG. 2. In some examples, the reaction bottles 212 may be used with the hydrogen mixing reactor shown in FIG. 2, e.g., as the vessels 102, 104. For example, the gas management component 144 may fill the bottles 212 with inert gas, e.g., Ar or N, that are subsequently filled with magnetic material, e.g., newly sintered magnets. Magnetic material 206 such as magnets, e.g., to be hydrogenated, may be loaded from a transfer chute 208 into the reaction bottles 212. The magnetic material 206 may be loaded into the reaction bottles 212 in an inert atmosphere, to prevent the contamination of the magnetic material 206 such as by oxygen.

In some implementations, a small fraction of rare earth transitional elemental additive material may be added to the reaction bottles 212. The rare earth transitional elemental additive material may be selected to bring the properties of a final product, produced from the magnetic material 206 and the rare earth transitional elemental additive material, to a predefined specification remanence, energy product, and coercivity. In some examples, a hydride of the rare earth transitional elemental additive material may be added to the hydrogenated magnetic material 206 after mixing and fragmentation of the material in the reaction chambers 202, 202'.

Each of the reaction bottles 212 may include a snorkel 213 or another device that facilitates gas diffusion in the reaction bottles. For example, the snorkels 213 may be a cylinder with openings in the side that allow for the diffusion of gas, so the gas reaches magnetic material positioned in the center of each bottle 212.

The bottles 212 and the snorkels 213 may be open at the top to allow hydrogen gas to enter the bottles 212 and the snorkels 213 and contact the magnetic material 206 contained within the bottles 212 and/or to allow loading of the magnetic material 206 into the bottles 212.

Figure 3B:
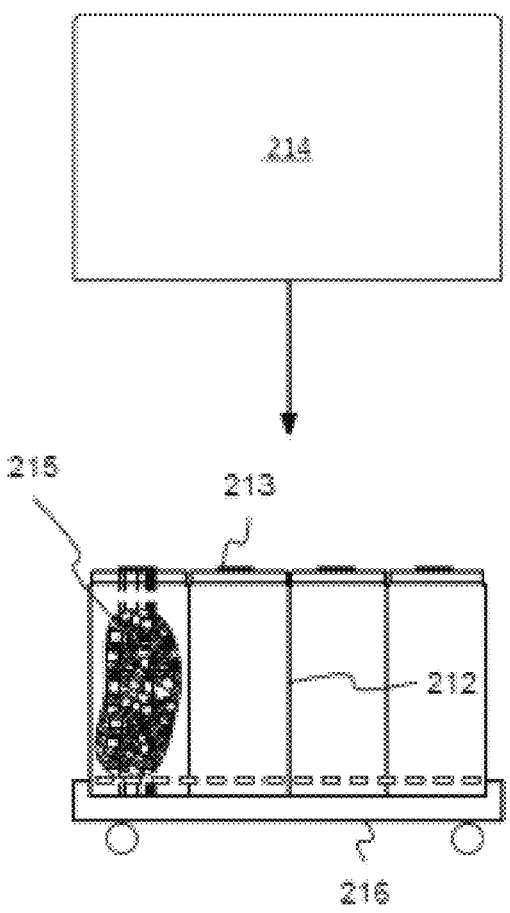

When the magnetic material 215, e.g., magnets, is positioned within the bottles 212, shown in FIG. 3B, a transfer cover 214 may be attached to the carriage 216 to isolate the bottles 212 and their contents from external atmosphere. The container formed by the cover 214 and carriage 216 may preclude gas leakage so that its internal volume can maintain an atmosphere of inert gas preventing ambient air from contacting the magnetic material 215. For instance, after the bottles 212 are loaded with the magnetic material 215 in the inert atmosphere, the bottles 212 may be covered by the cover 214, and the carriages 216 stored outside the space with the inert atmosphere. For instance, FIG. 3E shows an example of a loaded bottle 212 prior to the placement of the loaded bottle 212 onto the carriage 216 and the cover 214 on top of the loaded bottle 212. The bottles 212 may be loaded while on the carriage 216 or may be loaded and then placed onto the carriage 216.

Figure 3G:
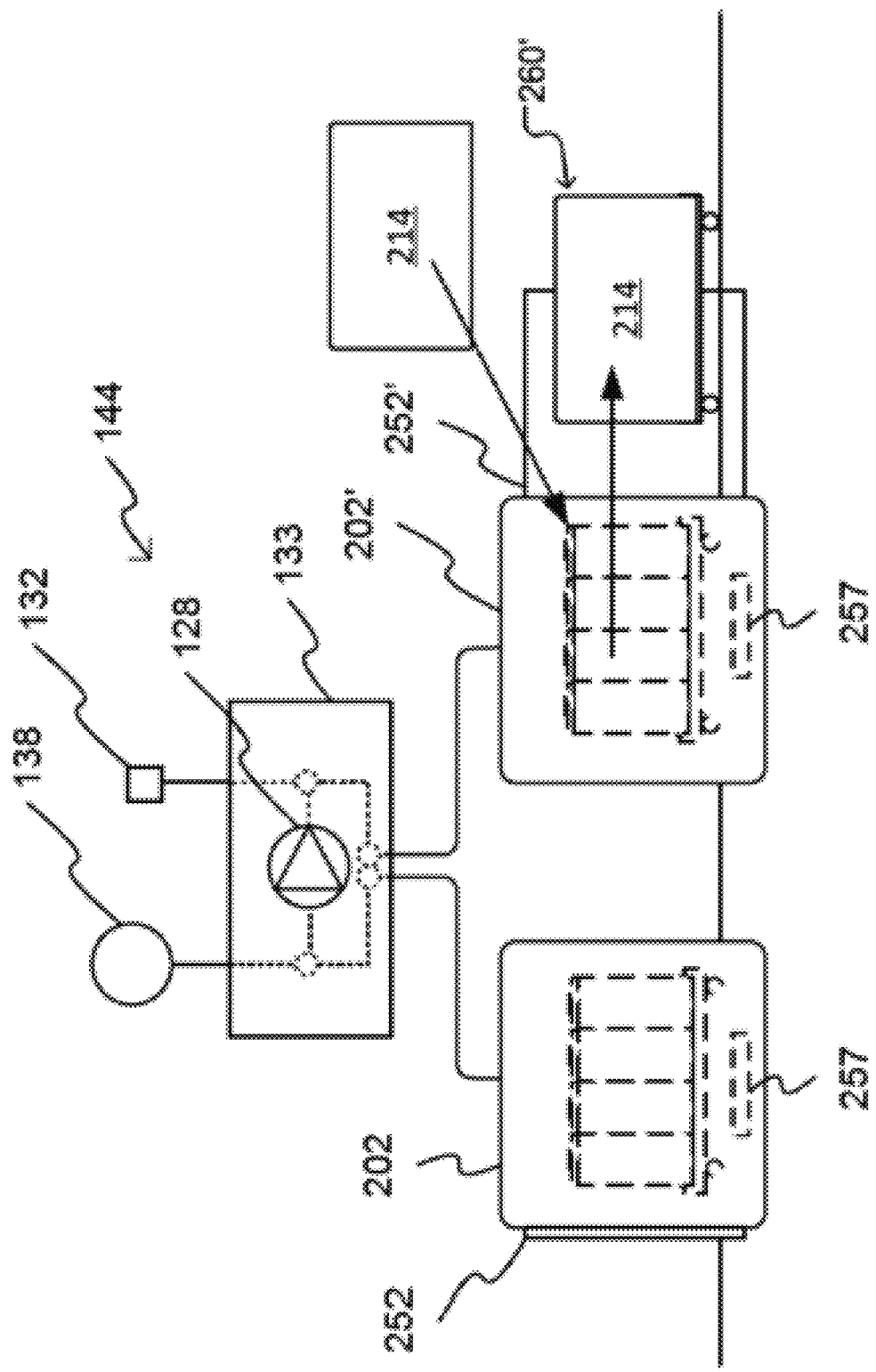

FIGS. 3F-G show an example of another hydrogen mixing reactor with a pair of reaction chambers 202, 202'. The reaction chambers 202, 202' are connected to, and interconnected by, a gas management component 144 as discussed above. The gas source 138 may provide respective connections for multiple gases such as inert gas and hydrogen. The ambient connection 132 may provide a vent to atmosphere. The gas management component 144 operates as described above with reference to FIG. 2 in that it transfers gas from one reaction chamber 202 to the other 202' and vice versa, instead of between the vessels 102, 104.

A covered carriage 260, e.g., the carriage 216, is rolled into a first one of the reaction chambers 202 while hydrogenation is occurring in the other reaction chamber 202', e.g., for bottles placed on another carriage in the other reaction chamber 202'. Once the covered carriage 260 is in the reaction chamber 202, the cover 214 is removed from the carriage 260 and a hatch 252 on the reaction chamber 202 is closed. The reaction chamber 202 may then be filled with inert gas, e.g., transferred from the other reaction chamber 202' after processing in the other reaction chamber 202' is complete.

The gas management component 144 may supply, to the reaction chamber 202, hydrogen from a hydrogen source to achieve a required pressure. For instance, when the hydrogenation in the reaction chamber 202' is complete, the gas management component 144 transfers hydrogen from the reaction chamber 202' into the reaction chamber 202 and pressurizes the reaction chamber 202 to a target pressure. The gas management component 144 may initiate hydrogenation in the reaction chamber 202 by introducing the hydrogen gas, e.g., pressurized hydrogen gas, from the reaction chamber 202 into the bottles 212 through the covers 232 or other openings in the bottles.

The hydrogen mixing process may create magnetic particles with an average diameter of between about 1 micron to about 2 mm, e.g., when the hydrogen mixing reactor performs an initial mixing process, or between about 4 microns to about 7 microns, e.g., when the hydrogen mixing reactor performs a second mixing process. In some examples, the hydrogen mixing reactor shown in FIGS. 3F-G may perform both processes, the hydrogen mixing reactor shown in FIG. 2 may perform both processes, or one of the reactors may perform one process and the other reactor may perform the other process. For instance, the hydrogen mixing reactor shown in FIG. 2 may perform the first mixing process and the hydrogen mixing reactor shown in FIGS. 3F-G may perform the second mixing process.

The gas management component 144 may evacuate, e.g., completely, gas from the reaction chamber 202' and place the gas in the reaction chamber 202, for use during processing in the reaction chamber 202, or in a storage chamber or vessel. A thermostatically regulated heater 257 within the reaction chamber 202, shown in FIG. 3G, may be regulated by a controller to provide a target temperature.

As the hydrogenation process proceeds in the reaction chamber 202, the gas management component 144 backfills the reaction chamber 202' with inert gas. The hatch 252' to the reaction chamber 202' is then opened, as shown in FIG. 3G, and a cover 214' is placed on the carriage 260'. The hydride magnet material, now reduced to particles, then moves out from the reaction chamber 202' in the carriage 260'.

After the hydrogenation is completed in the reaction chamber 202, the gas management component 144 evacuates the excess hydrogen gas from the reaction chamber 202. For instance, the hydrogenation process may begin again for one or more bottles 212 placed in the reaction chamber 202' and transfer the excess hydrogen gas, e.g., and leave some hydrogen material in the magnetic material that was processed, to the reaction chamber 202' from the reaction chamber 202.

Figure 3J:
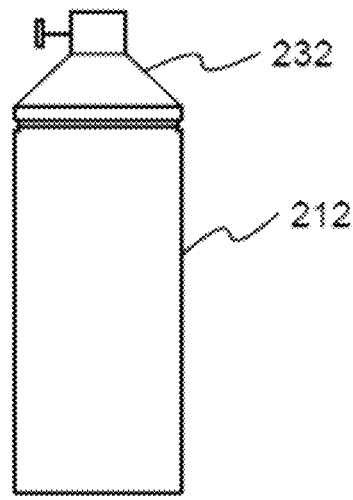
FIGS. 3H and 3J show reaction bottles which may be placed on a carriage to permit transport of the reaction bottles into and out of a reaction chamber.

In some implementations, the bottles 212 can be closed with a cover 232, shown in FIGS. 3C-D and 3J, that acts as a funnel to permit recovered hydride magnet particles to be directed through a chute 237 when a valve 234 is open, e.g., when the bottle 212 is in the inverted position. The cover 232 may be removed, e.g., to allow the magnetic material 206 to enter the bottles 212, and placed on the respective bottles 212 afterward.

Referring to FIG. 3J, in an inert atmosphere, the covers 232 are positioned on the bottles 212 and the bottles can be sealed and removed from the inert atmosphere without the need for the cover 214. The bottles 212 can be transported by the carriage 216 or individually.

Figure 3H:
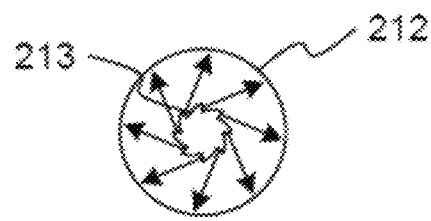
Figure 3K:
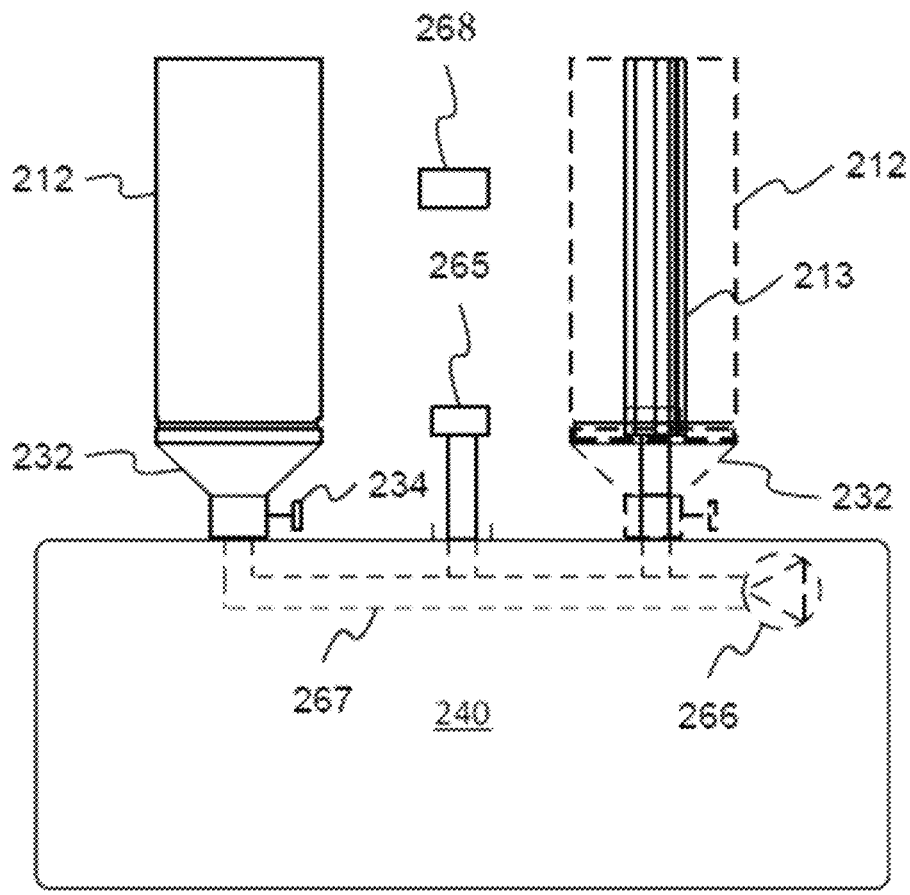
FIG. 3K shows and example of a storage container.

FIG. 3K shows and example of a storage container 240 for the magnetic particles received from the bottles 212. The valves 234 on the bottles 212 accept a nozzle 265, included in the storage container 240, to seal a manifold 267 to the snorkels 213 in the bottles 212. A blower 266 feeds inert gas through the manifold 267 and into the snorkels 213 to remove magnetic particles from the bottles 212 into the storage container 240. The inert gas may circulate back into the storage chamber 240 after entering one of the bottles 212.

The inert gas may flow out of the snorkels 213 in a tangential or radial (or both) flow, as shown in FIG. 3H which is a cross section of a bottle 212 and a snorkel 213. The arrows show the tangential pattern of the inert gas ejected through tangentially-aimed slots in the snorkel 213. The tangential pattern of the inert gas flow may help remove particles from the inside walls of the bottle 212 and facilitate fully emptying the magnetic particles from the bottles 212.

The valve 234 may have a gate configuration, e.g., to permit the entry of the nozzle 265 into the bottle 212. A cover 268 may be place on the nozzle 265 to seal the storage container 240 when the bottles 212 are removed.

Figure 4:
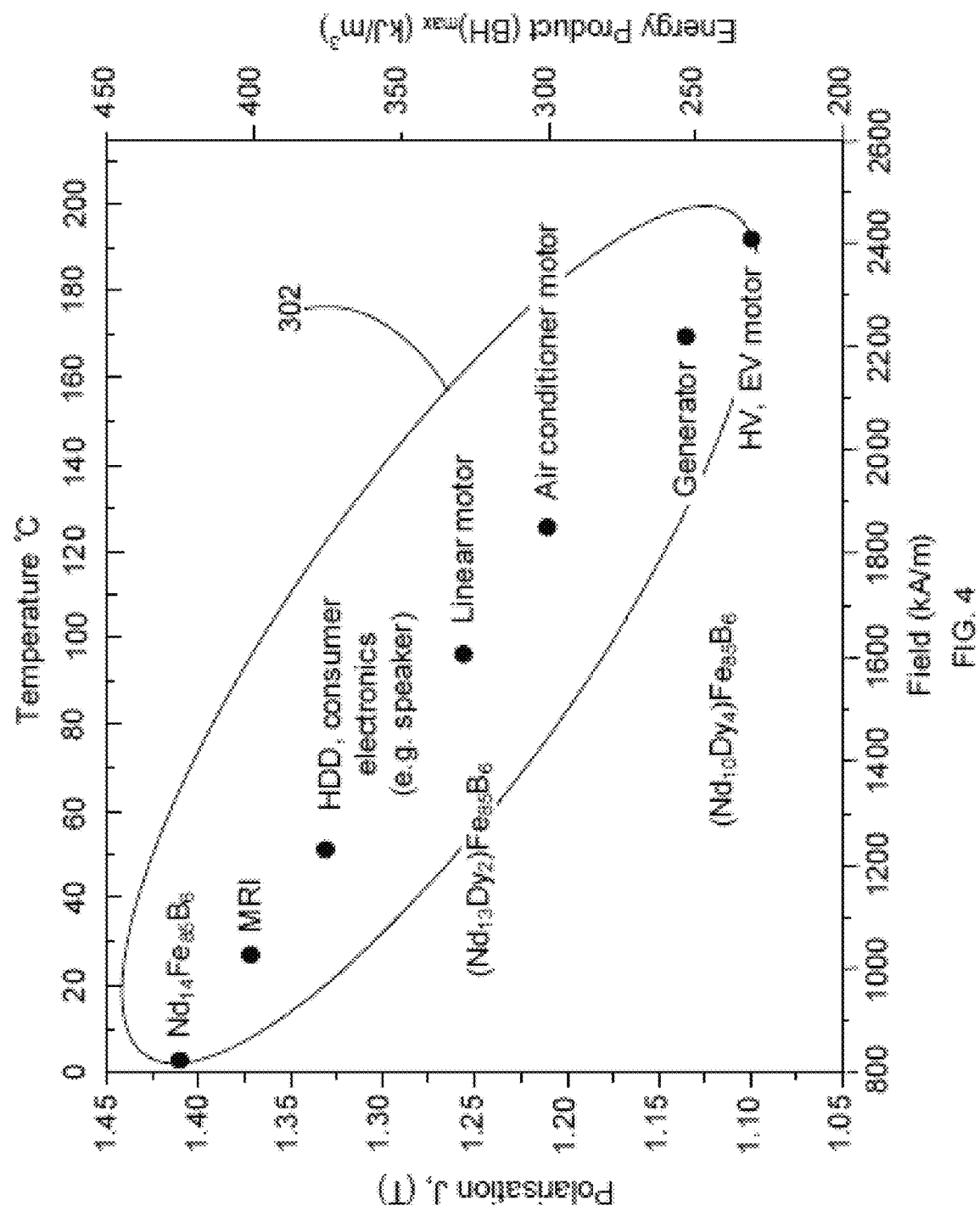
FIG. 4 is a graph that shows an example of property ranges for starting materials.

FIG. 4 is a graph that shows an example of property ranges for starting materials, e.g., recycled magnets from a variety of different types of consumer products and that include a variety of different magnetic properties. A bubble 302 drawn onto the graph represents the approximate range of starting materials to which the process can apply. The process may also apply to other starting materials outside of the bubble 302.

Figure 5:
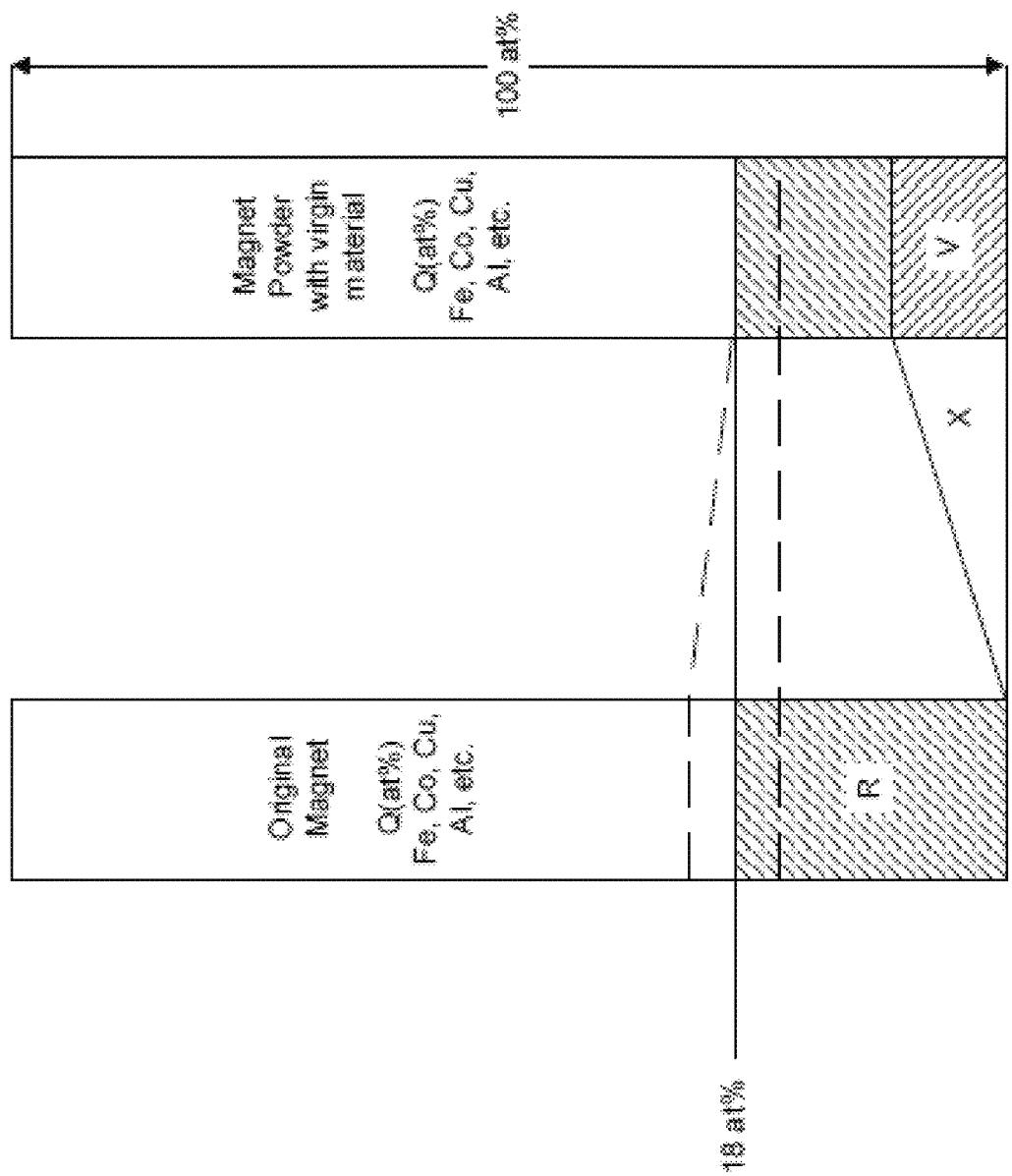
FIG. 5 is a diagram comparing the composition of the original material, shown in the left column, to the finished magnet product, shown in the right column.

FIG. 5 is a diagram comparing the composition of the original magnetic material, shown in the left column, to the finished magnet product, shown in the right column, created by the process. In the starting material, the composition of rare earth metals may be greater or less than 18 at. %, noted by the "R" region of the left column. The rare earth metals may be included in the grains of the original magnetic material or in the grain boundary phase material. An amount of rare earth metals "X" is removed from the starting magnet material during processing, e.g., from the grain boundary phase material. For instance, a GBE system may remove substantially all of an Nd-rich grain boundary phase from the original magnetic material. In order for the final Nd—Fe—B product to have a composition similar to the original magnet, new rare earth material, i.e., virgin material, must be added. The new rare earth material, e.g., the additive material, may replace the Nd-rich grain boundary phase removed from the original magnetic material.

In FIG. 5, the virgin material is represented by the "V" region and is approximately equal to the amount of rare earth metals removed during processing, or "X." In the finished product, the final percentage of rare earth metals is at least the percentage in the starting magnetic material, but not higher than 18 at. %. If the percentage of rare earth material in the starting magnetic material "R" is as low as the lower of the two dashed lines in the left column, e.g., less than 18 at. %, the final rare earth atomic percentage in the finished magnet product, shown in the right column, is at least equal to the same percentage, as depicted by the lower dashed line carrying over. If, however, the percentage of rare earth metals in the starting material is greater than 18 at. %, then the atomic percentage in the finished magnet is limited to 18%, as shown by the upper dashed line being capped at 18% in the right column.

In the finished product, the final rare earth atomic percentage is one in which the percentage of each component, Nd, Pr, Dy, Gd, Tb, La, Ce, Yb, Ho, and/or Eu of virgin material is in the range of 0.1 to 19 at. % of its percentage in the original material, and the atomic percentage of Nd or Pr or both is greater than zero. The following formulas further describe some implementations: $R=s(Nd)+s(Pr)+s(Dy)$ in the staring magnet material; $T=f(Nd)+f(Pr)+f(Dy)$ in final Nd—Fe—B product, as defined in paragraph 19; and virgin material added $V=Nd[p]+Pr[q]+Dy[r]$, where $0.1 \leq p+q+r \leq 19$ at. % of final product and $T \geq \min(R, 18$ at. %). For illustrative purposes, consider the following example: If the atomic percentage values for Nd, Pr, and Dy in an starting magnet material are 9.77, 2.96, and 0.92, respectively, then substituting the corresponding values into the formula $R=s(Nd)+s(Pr)+s(Dy)$ yields $R=9.77+2.96+0.92$, or $R=13.65$. In the same example, the atomic percentage values for Nd, Pr, and Dy in the new Nd—Fe—B sintered magnet might be 10.74, 3.26, and 0.91, respectively. Upon substituting the values of the new Nd—Fe—B sintered magnet into the formula $T=s(Nd)+s(Pr)+s(Dy)$, T then equals $10.74+3.26+0.91$, or $T=14.91$. If, in the same example, virgin material is added during the GBE process, and the virgin material contains atomic percentage values of 0.2, 0.3, and 0.4 for Nd, Pr, and Dy, respectively, the formula $V=Nd[p]+Pr[q]+Dy[r]$ yields $V=0.2+0.3+0.4$, or $V=0.9$. The formula for the virgin material, or V, is subject to two constraints: $0.1 \leq p+q+r \leq 19$ at. % of final product and $T \geq \min(R, 18$ at. %). In our example, $p+q+r=0.9$ at. %, which satisfies the first constraint—that the value of $p+q+r$ must be greater than or equal to 0.1 at. % and less than or equal to 19 at. %. This example also satisfies the second constraint for the formula for the virgin material: T is greater than or equal to the minimum of the set of R or 18. In this example, T is 14.91 and the minimum of the set of R or 18 is R, which is 13.65, so T is greater than or equal to the minimum of the set of R or 18.

In some implementations, $V=Nd[p]+Pr[q]+Dy[r]$, where $0.1 \leq p+q+r \leq 15$ at. % of final product and $T \geq \min(R, 18$ at. %). In some implementations, $V=Nd[p]+Pr[q]+Dy[r]$, where $0.1 \leq p+q+r \leq 12$ at. % of final product and $T \geq \min(R, 18$ at. %). In some implementations, $V=Nd[p]+Pr[q]+Dy[r]$, where $0.1 \leq p+q+r \leq 8$ at. % of final product and $T \geq \min(R, 18$ at. %). In some implementations, $V=Nd[p]+Pr[q]+Dy[r]$, where $0.1 \leq p+q+r \leq 5$ at. % of final product and $T \geq \min(R, 18$ at. %). In some implementations, $V=Nd[p]+Pr[q]+Dy[r]$, where $0.1 \leq p+q+r \leq 3$ at. % of final product and $T \geq \min(R, 18$ at. %). In some implementations, $V=Nd[p]+Pr[q]+Dy[r]$, where $0.1 \leq p+q+r \leq 2$ at. % of final product and $T \geq \min(R, 18$ at. %). In some implementations, $V=Nd[p]+Pr[q]+Dy[r]$, where $0.1 \leq p+q+r \leq 1$ at. % of final product and $T \geq \min(R, 18$ at. %).

In some implementations, X is at. % RE (Nd, Pr, Dy) removed from original magnet, and $p+q+r \geq X$. In some implementations, the additive is such that in the final Nd—Fe—B sintered product, where f is a fraction by at. % of starting Nd—Fe—B sintered magnetic material, $f(Nd)+f(Pr)>0$. In some implementations, $f(Nd)+f(Pr)+f(Dy) \leq 18$. In some implementations, $f(Co) \leq 3$. In some implementations, $f(Cu) \leq 0.3$. In some implementations, $f(Fe)+f(Co) \leq 77$. In some implementations, $f(Dy)+f(Nd)+f(Pr) \geq R$.

In some implementations, the elemental additions are $Nd[0.1\text{-}19$ at. %*s(Nd), x]Pr[0.1-19 at. %*s(Pr), y]Dy[0.1-19 at. %*s(Dy), z]Co[0, d]Cu[0, e]Fe[0, f]$, where [m, n] means a range from minimum m and maximum n; s(t) is the atomic percent of element t in starting composition; f(t) is the atomic percent of element t in final composition; $x=18-[81, 99.9]$ at. %*(s(Nd)+s(Pr)+s(Dy)); $y=18-[81, 99.9]$ at. %*(s(Nd)+s(Pr)+s(Dy)); $z=18-[81, 99.9]$ at. %*(s(Nd)+s(Pr)+s(Dy)); $d=3-[81, 99.9]$ at. %*s(Co); $e=0.3-[81, 99.9]$ at. %*s(Cu); $f=77-[81, 99.9]$ at. %*(s(Fe)+s(Co)).

In some implementations, (i) virgin material, e.g., NdpPrqDyr, need be in the range of $0.1 \leq p+q+r \leq 19$ at. % of final product, and $T \geq \min(R, 18)$, where $T=f(Nd)+f(Pr)+f(Dy)$ and $R=s(Nd)+s(Pr)+s(Dy)$; (ii) $p+q+r \geq X$, where X is at. % RE (Nd, Pr, Dy) removed from original magnet; (iii) $T \leq 18$ at. %; (iv) $f(Nd)+f(Pr)>0$, where f is an at. % fraction of the final product; (v) $f(Nd)+f(Pr)+f(Dy)<=18$; (vi) $f(Co)<=3$; (vii) $f(Cu)<=0.3$; (viii) $f(Fe)+f(Co)<=77$; and (ix) $f(Dy)+f(Nd)+f(Pr)>=R$.

Besides the rare earth metals, the remainder of both the starting magnetic material and finished magnets may include of Fe, Co, Cu, Al, and other elements. In some examples, other types of magnetic material may be used. Final magnet products made with other types of magnetic material may have different compositions of magnetic material.

The following examples demonstrate that starting magnet material may be processed according to the Grain Boundary Engineering technique to produce a final Nd—Fe—B magnet with maintained or minimal loss of certain magnetic properties including remanence (Br); and improvement of other properties including temperature resistance (iHc) and temperature profile, while more efficiently using and optimization content of Dysprosium (Dy) in the Nd—Fe—B final product, which may reduce cost and supply vulnerability. In some implementations, the method is not limited by the thickness of the magnetic body. For instance, the use of the rare earth transitional elemental additive material, e.g., $Nd_{1-20}Dy_{1-60}Co_{1-60}Cu_{0.1-20}Fe_{0.5-90}$ at. %, $Nd_{7-14}Dy_{30-50}Co_{28-45}Cu_{1-10}Fe_{1-10}$ at. %, $Nd_{8.5-12.5}Dy_{35-45}Co_{32-41}Cu_{3-6.5}Fe_{1.5-5}$ at. %, or $Nd_{11.92}Dy_{42.32}Co_{38.39}Cu_{5.34}Fe_{2.03}$ at. % at. %; for the grain boundary phase of the Nd—Fe—B final product may allow the Nd—Fe—B final product to be any thickness, e.g., greater than 6 millimeters thick.

EXAMPLE 1

Figure 6:
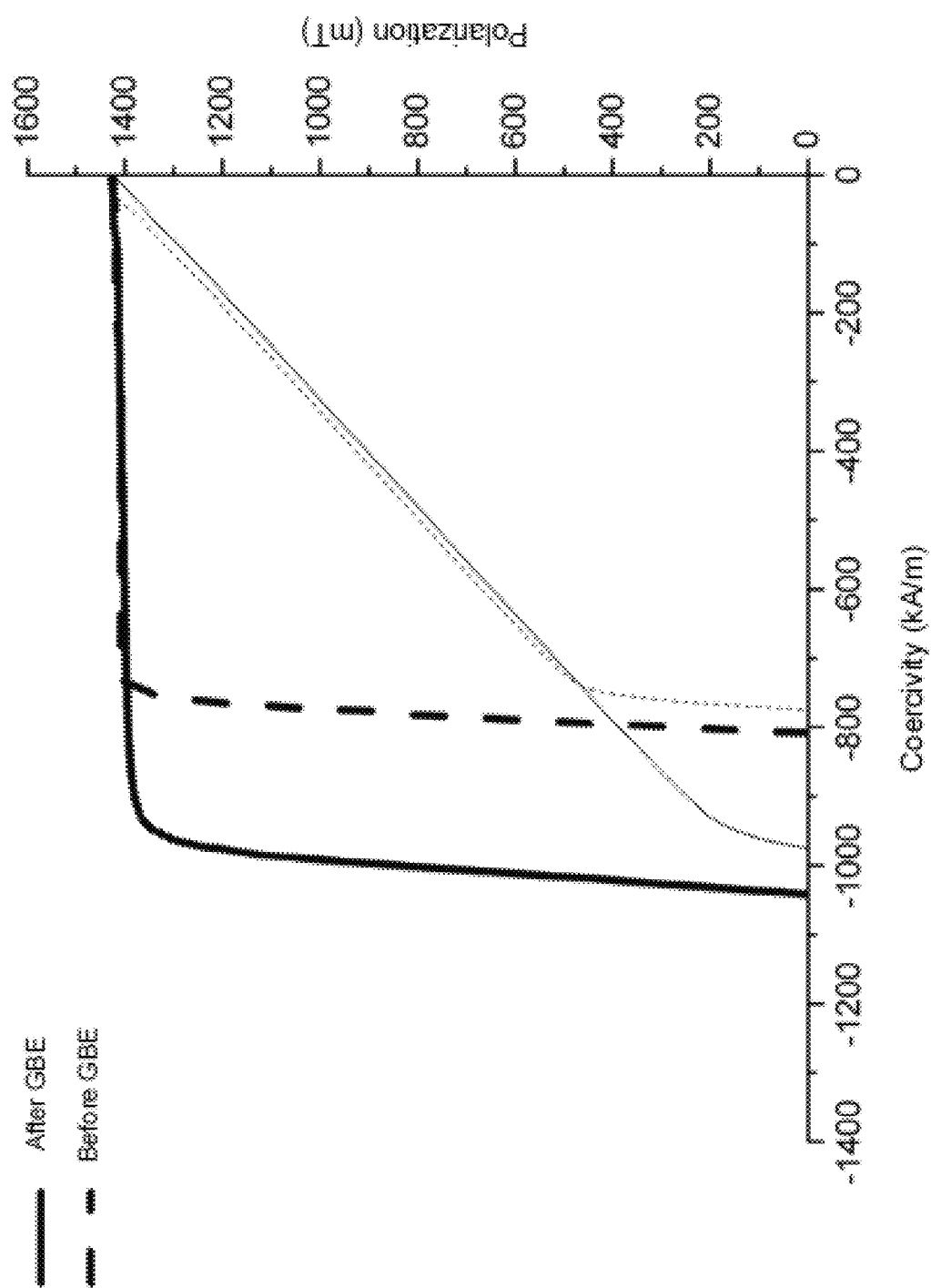
FIGS. 6-8 are graphs that show example properties of magnets processed using Grain Boundary Engineering.
Figure 7:
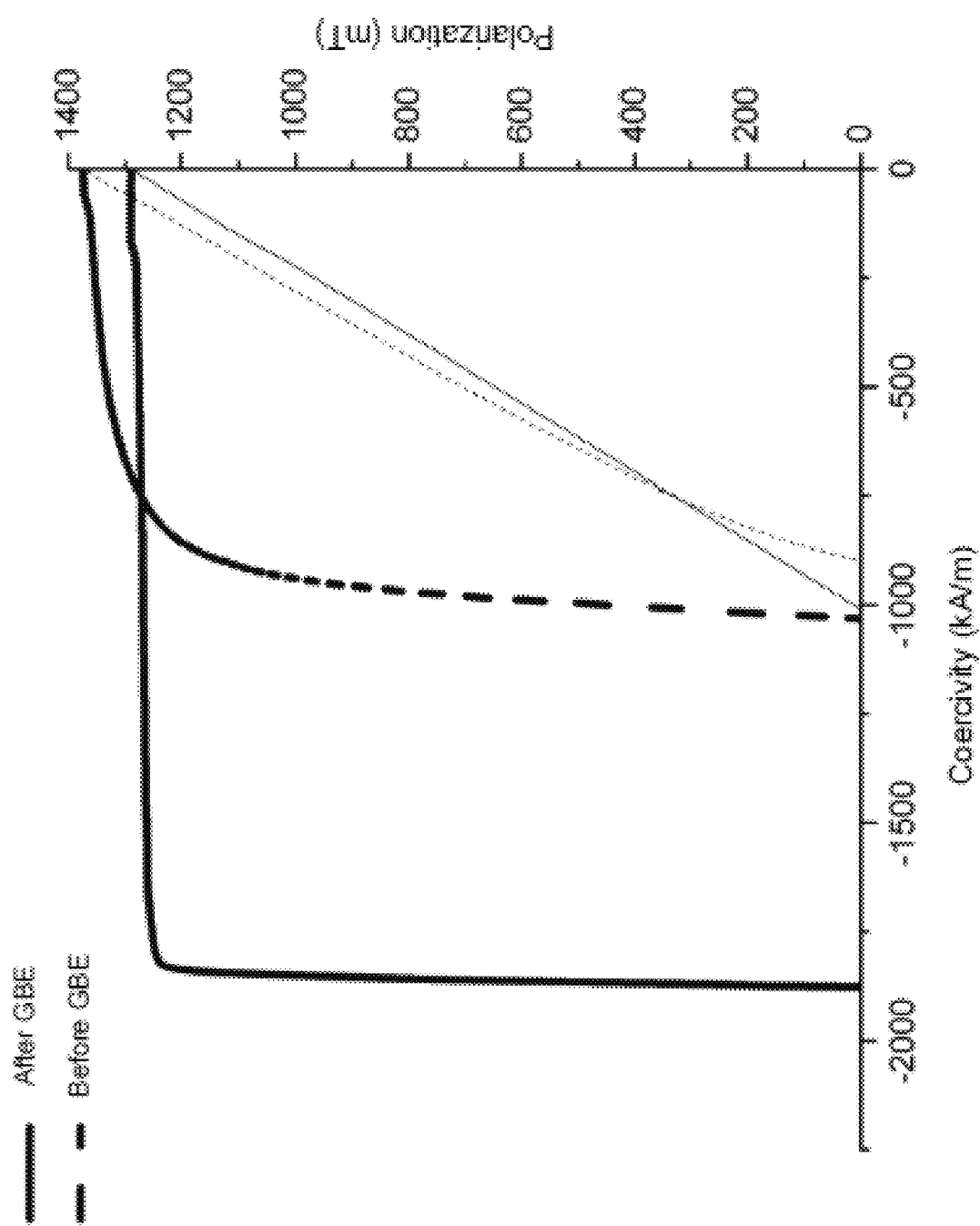
Figure 8:
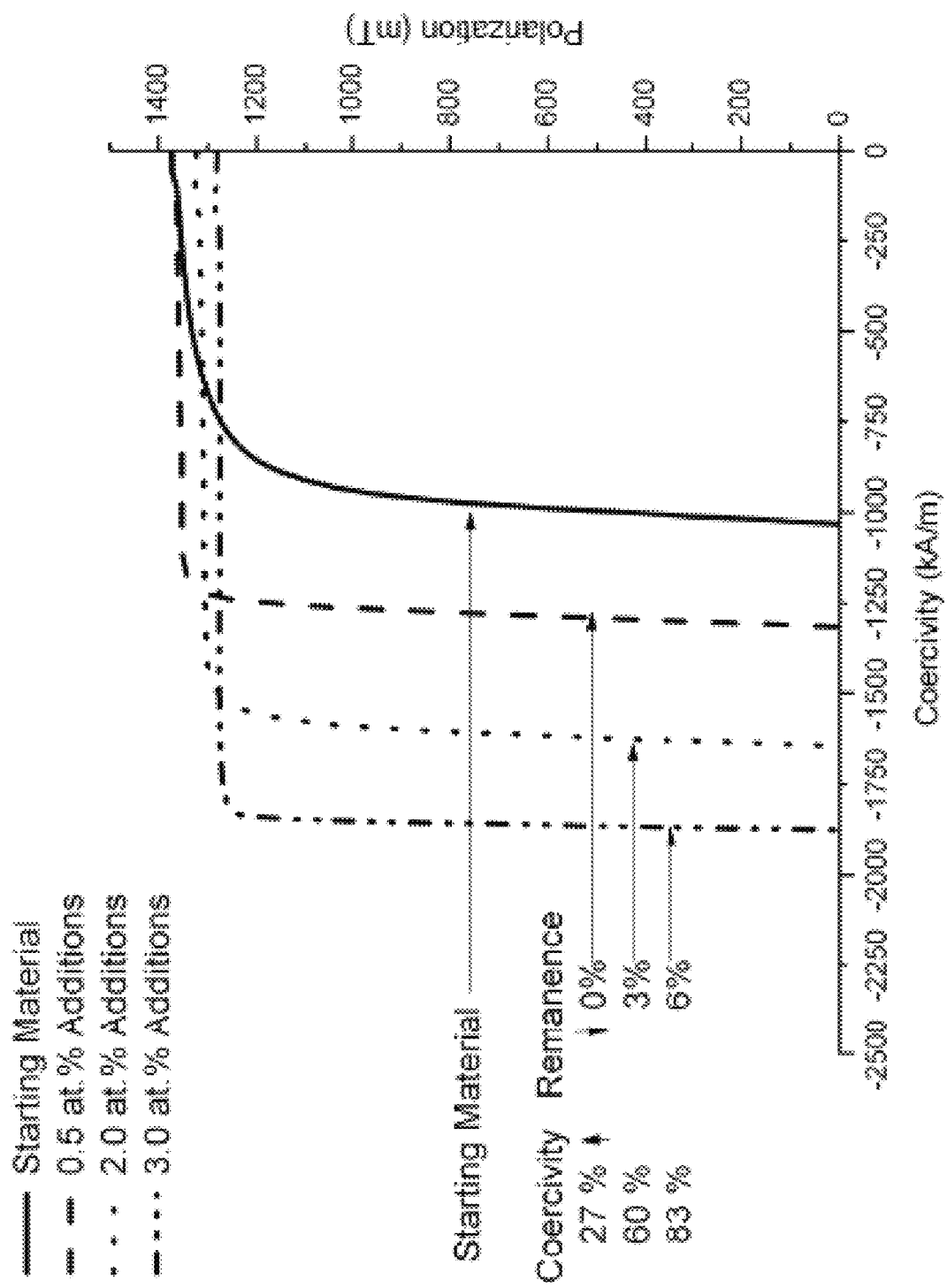

These examples demonstrate that the overall magnetic performance of permanent magnets can be improved, with minimum amount of dopants using the GBE process. For instance, the GBE process may result in 27% increase in coercivity and 0% decrease in remanence as shown in FIG. 6, or 83% increase in coercivity and 6% decrease in remanence as shown in FIG. 7, or 60% increase in coercivity and 3% decrease in remanence as shown in FIG. 8. For instance, FIG. 6 shows an example of variations of Nd—Fe—B-type sintered magnets with 0.5 at. % additions, e.g., Nd or Dy, resulting in high energy. The final magnet with 0.5 at. % additions has a remanence (Br) of 1.423 T, a coercivity (iHc) of 1042 kA/m and an energy product (BHmax) of 391 kJ/m³. FIG. 7 shows an example of variations of Nd—Fe—B-type sintered magnets with 3 at. % additions, e.g., Dy, resulting in high coercivity suitable for high temperature applications. The final magnet with 3 at. % additions has a remanence (Br) of 1.29 T, a coercivity (iHc) of 1900 kA/m and an energy product (BHmax) of 323 kJ/m³. The densities of both magnets are 7.56 g/cm³.

In one example, a magnet with the properties shown in FIG. 6 may include 0.5 at. % Nd dopant. The starting material of the magnet may have a composition shown in Table 1 below, identified as "Starting Material," before the addition of the Nd dopant and a final composition, identified as "Final Material," after the addition of the Nd dopant. In some examples, this magnet may have high energy.

TABLE 1

0.5 atom % Nd dopant

| Stage | Nd (at. %) | Pr (at. %) | Dy (at. %) | B (at. %) | Al (at. %) | Fe (a. %) | C (at. m %) | O (at. %) |
|---|---|---|---|---|---|---|---|---|
| Starting Material | 10.50 | 3.04 | 0.12 | 6.92 | 0.52 | Balance | 0.31 | 0.95 |
| Final Material | 11.39 | 3.01 | 0.37 | 6.85 | 0.52 | Balance | 0.31 | 1.00 |

In one example, a magnet with the properties shown in FIG. 7 may include 3 at. % Dy dopant. The starting material of the magnet may have a composition shown in Table 2 below, identified as "Starting Material," before the addition of the Dy dopant and a final composition, identified as "Final Material," after the addition of the Dy dopant. In some examples, this magnet may have high coercivity.

TABLE 2

3 atom % Dy dopant

| Stage | Nd (at. %) | Pr (at. %) | Dy (at. %) | B (at. %) | Al (at. %) | Fe (a. %) | C (at. m %) | O (at. %) |
|---|---|---|---|---|---|---|---|---|
| Starting Material | 9.97 | 3.18 | 0.17 | 5.81 | 0.75 | Balance | 0.37 | 0.22 |
| Final Material | 9.80 | 2.98 | 1.37 | 5.62 | 0.76 | Balance | 0.62 | 0.53 |

In some examples, the composition of the magnets identified in Tables 1 and 2 may have an accuracy between about 0.009 to about 0.08 at. %. In some examples, the magnets identified in Tables 1 and 2 may include other minor dopants.

Grain Boundary Engineering might not be limited to a thickness of about 6 mm of the magnet sintered body. For instance, a system may perform Grain Boundary Engineering to form sintered magnets that are more than about 6 mm thick or more than 6 mm thick. In some examples, the thickness of magnets formed using the Grain Boundary Engineering process are 6 mm thick or more.

FIG. 8 shows an example of demagnetization curves of GBE-processed sintered magnets containing different amounts of Dy additions to Nd—Fe—B type sintered magnets. For instance, the GBE technique described herein may be applied to sintered magnets on a mass scale to improve remanence and coercivity by adding 0.5 at. % additive material, 2.0 at. % additive material, or 3.0 at. % additive material to achieve the respective properties shown in FIG. 8.

Figure 9:
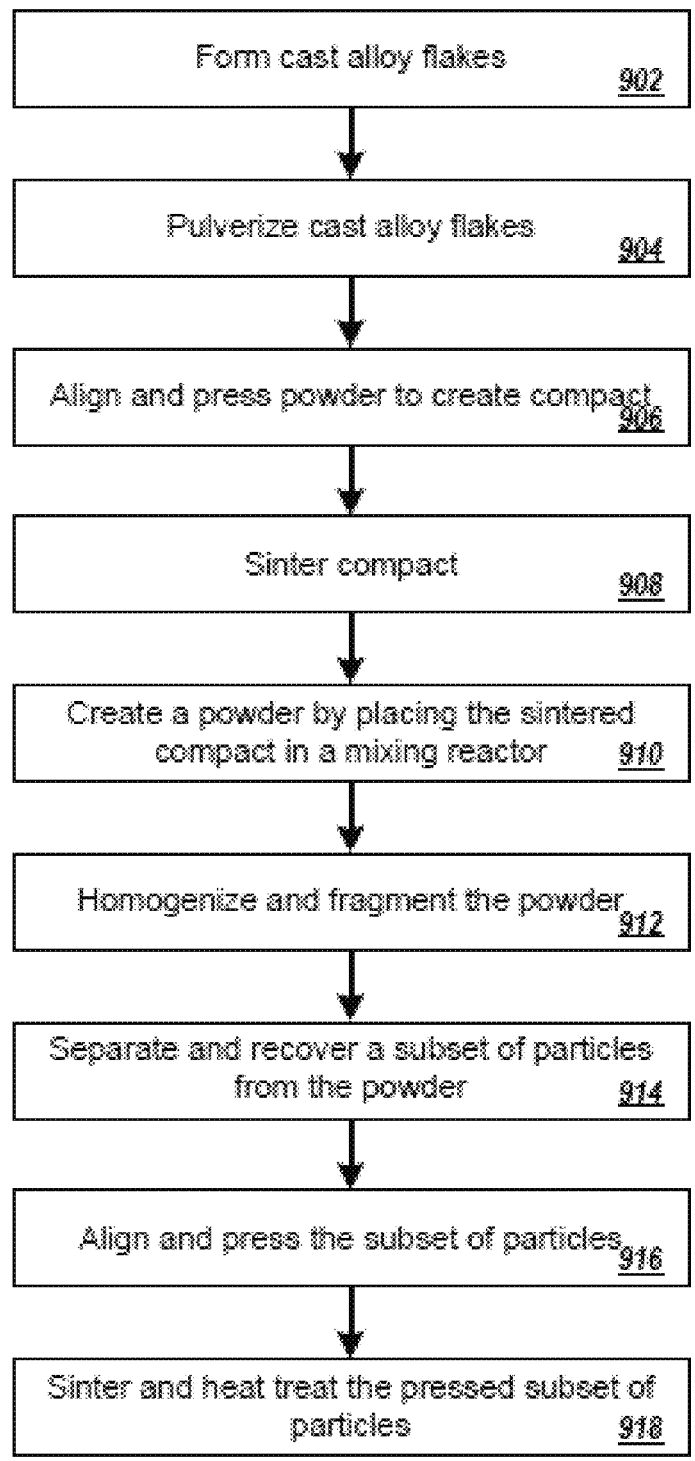
FIG. 9 is an example of a process for applying the Grain Boundary Engineering technique.

FIG. 9 is an example of a process 900 for applying the Grain Boundary Engineering technique. The process 900 may be performed using one or more of the systems described above.

At 902, the process forms cast alloy flakes. For instance, a GBE system melts an alloy, pure elements, or both, and pours the molten alloy on a water cooled copper wheel to form the cast alloy flakes. The cast alloy flakes include multiple 2:14:1 phase grains, e.g., of Nd2Fe14B1. In some examples, each of the cast alloy flakes include 2:14:1 phase grains. In some examples, some of the cast alloy flakes include 2:14:1 phase grains and some of the cast alloy flakes include a) grains that include other materials, e.g., materials other than Nd, Fe, or B such as contaminants, or b) grains that include different compositions of Nd—Fe—B, e.g., other than $N_{d2}Fe_{14}B_1$.

The combinations of elements used in the alloy, separately as pure elements, or in a combination of an alloy and pure elements, may include: (i) Nd, Pr, Fe, FeB, and B; (ii) Nd, Fe, Co, Cu, and Dy, (iii) Nd, Fe, Co, Cu, Dy, a composition with a ratio $Nd_{75}$:$Pr_{25}$, a composition with a ratio $Dy_{80}$:$Fe_{20}$ and Pr, (iv) $Nd_2Fe_{14}B$, (v) $D_{y2}Fe_{14}B$, (vi) $Pr_2Fe_{14}B$, (vii) $Tb_2Fe_{14}B$, (viii) $Nd_2Co_{14}B$, (ix) $Pr_2Co_{14}B$, (x) $Tb_2Co_{14}B$, (xi) $Nd_2Ni_{14}B$, (xii) $Pr_2Ni_{14}B$, (xiii) $Tb_2Ni_{14}B$, (xiv) $V_2FeB_2$, (xv) NbFeB, (xvi) MoFeB, (xvii) ZrFeB, (xviii) TiFeB, (xix) Nd-rich, (xx) $CoNd_3$, (xxi) $NiNd_3$, (xxii)

GaNd, (xxiii) Nd-oxide, (xxiv) Proxide, (xxv) RE-Carbide, (xxvi) Nd-Oxifluoride, (xxvii) Re-Nitride, or (xxviii) a combination of two or more of these. In some implementations, some or all of the elements may be from waste magnet material. In some implementations, some or all of the elements are from new magnetic material, e.g., that has not been previously used in a consumer product.

At 904, the process pulverizes the cast alloy flakes to create an initial powder. For instance, the GBE system may use a jet milling system, or another appropriate system, e.g., high speed energy milling under Ar or He or another inert gas, to create the initial powder from the cast alloy flakes. In some implementations, the GBE system may expose the cast alloy flakes to hydrogen gas at a temperature between about 20 to about 150° C. and a pressure of up to about 1 to about 10 bar to decrepitate the cast alloy flakes. The GBE system maintains the 2:14:1 phase grains, or between about 90 to 97 vol. % of those grains, when creating the initial powder.

At 906, the process aligns and presses the initial powder to create an initial compact. For example, the GBE system creates a pressed compact from the initial powder.

In some implementations, some boron from the starting elements may be lost during processing of the alloy, e.g., during preparation and forming of the cast alloy flakes, creation of the initial powder, creation of the initial compact, or two or more of these. In some implementations, oxygen, carbon, or both, may be mixed with the powder during the processing of the alloy. For instance, the alloy may initially be Nd14.2Fe79.3B6.5 (at. %) and the initial compact may be Nd14.2Fe79.55B6.1C0.05O0.1 (at. %). In some examples, the alloy may initially be Nd31.284Fe67.6427B1.0733 (wt. %) and the initial compact may be $Nd_{31.2275}Fe_{67.7335}B_{1.0054}C_{0.0092}O_{0.0244}$ (wt. %).

At 908, the process sinters the initial compact. For example, the GBE system creates a fully dense sintered magnet from the initial compact. In some implementations, oxygen, carbon, or both may be added to the initial compact during sintering. For instance, the GBE system may add a lubricant to the initial compact during or as part of a sintering process and oxygen, carbon, or both may be added to the initial compact as a result of the lubrication. In some examples, a sintering process may include the use of argon gas and oxygen present in the argon gas may be added to the initial compact, e.g., during sintering.

The GBE system may perform steps 902 through 908 to create a sintered magnet with multiple 2:14:1 phase grains and then process the sintered magnet using steps 910 through 918, described below, to maintain the 2:14:1 phase grains of the sintered magnet in a final product. For instance, the process 900 may maintain all or between about 90 to 97 vol. % of the 2:14:1 phase grains created in the cast alloy flakes in the fully dense sintered magnet, made in step 908, and maintain all or between about 90 and 97 vol. % of the 2:14:1 grains from the fully dense sintered magnet in the powder created in step 910, described in more detail below.

In some examples, the GBE system receives a new magnet, e.g., that has not been used in a commercial process, or a magnet which hasn't been used much, and processes that magnet instead of performing steps 902 through 908. The GBE system may use any appropriate type of sintered magnet instead of performing steps 902 through 908.

At 910, the process places the magnetic material in a mixing apparatus to create a powder. The mixing apparatus may subject the magnetic material to a pressurized hydrogen atmosphere for a predetermined period of time, temperature, rotational speed, etc. For instance, the magnetic material may be processed by the hydrogen mixing reactor shown in FIG. 2, FIG. 3G, or both or another appropriate mixing apparatus. The GBE system, e.g., the mixing apparatus, maintains all or between about 90 and 97 vol. % all of the 2:14:1 phase grains from the magnetic material when creating the powder. In some implementations, when the GBE system creates a powder from the initial sintered magnet, the GBE system removes an old Nd-rich grain boundary phase from the initial sintered magnet.

In some examples, rare earth transitional elemental additive material may be added to the magnetic material before or after mixing. In some implementations, Nd—Fe—B magnets, e.g., magnetic material and rare earth elemental additive, for example, $Nd_{1-x}Pr_x$, are placed together in a mixing apparatus at a ratio between 99.9:0.1 to 81:19 at. % and are homogeneously blended together, e.g., in-situ. In some examples, a ratio between 99.9:0.1 to 94:6 at. %, magnetic material to rare earth transitional elemental additive material, specifically a ratio between 99.9:0.1 to 99:1 at. %, are homogeneously blended together. The rare earth transitional elemental additive material may be fragmented separately and added to the magnetic material after step 910.

For instance, the GBE system may mix a rare earth transitional elemental additive of $Nd_{11.92}Dy_{42.32}Co_{38.39}Cu_{5.34}Fe_{2.03}$ at. % with the $Nd_2Fe_{14}B$ powders to produce composite powders and, optionally, replace the old Nd-rich grain boundary phase, which is normally present in the sintered Nd—Fe—B-type magnet body, with the $Nd_{11.92}Dy_{42.32}Co_{38.39}Cu_{5.34}Fe_{2.03}$ at. % material. In some examples, the GBE system may use flash pyrolysis of $Nd_{11.92}Dy_{42.32}Co_{38.39}Cu_{5.34}Fe_{2.03}$ at. % fine powder to form a precursor and mix the precursor with $Nd_2Fe_{14}B$ powders to create a composite powder. The GBE system may use a hydrogen mixing reactor for a first mixing step, e.g., that disperses fine $Nd_{11.92}Dy_{42.32}Co_{38.39}Cu_{5.34}Fe_{2.03}$ at. % articles into an $Nd_2Fe_{14}B$ powder.

In some implementations, the GBE system may create the $Nd_{11.92}Dy_{42.32}Co_{38.39}Cu_{5.34}Fe_{2.03}$ at. % rare earth transitional elemental additive material, e.g., the precursor, using arc melting, RF (radio frequency), book molding, strip casting or atomizing or any other appropriate method to prepare optimum composition of the final precursor. In some examples, the purity level of the elements in the precursor, e.g., Nd, Dy, Co, Cu and Fe, is 95% or higher, e.g., 99.9% purity, to produce the $Nd_{11.92}Dy_{42.32}Co_{38.39}Cu_{5.34}Fe_{2.03}$ at. % rare earth transitional elemental additive material.

In some examples, a GBE system may use a melting preparation process, e.g., vacuum induction melting, to prepare the rare earth transitional elemental additive material. For instance, the GBE system may use vacuum induction melting preparation of a multicomponent, highly alloyed material that includes at least copper, cobalt, iron and one or more modifier elements, e.g., neodymium, praseodymium, dysprosium, terbium and combinations of two or more of these. The GBE system may use the alloyed material to replace the Nd-rich grain boundary phase present in the sintered magnets.

For instance, the GBE system may melt the elements of the alloy, e.g., Nd, Pr, Fe, Dy, Tb, Co, Cu, elements in the alumina or zirconium crucible, e.g., a high density crucible, a high purity crucible, or both, to prepare a compound of the elements, e.g., of five elements. Some examples of the compound may include $Nd_2Dy_7Co_6CuFe_{0.33}$, $Nd_{11.92}Dy_{42.32}Co_{38.39}Cu_{5.34}Fe_{2.03}$ at. %, $Pr_{11.92}Tb_{42.32}Co_{38.39}Cu_{5.34}Fe_{2.03}$ at. %, or $Pr_2Tb_7Co_6CuFe_{0.33}$, e.g., see Tables 3 and 4. For example, the Nd element can be substituted by Pr and the Dy element can be substituted by Tb.

The GBE system melts the elements at 1450° C. to create a molten alloy and pours the molten alloy material from the alumina or zirconia crucible onto a water cooled copper wheel to create cast alloy flakes. In some examples, the GBE system may cool the molten alloy in the crucible to room temperature to create a block from the compound. The GBE system may rapidly cool the molten alloy to create strip casted alloy flakes, e.g., at a rate of 105 Kelvin/second, e.g., to achieve flakes less than 50 micrometers in size. In examples when the GBE system slowly cools the molten alloy, the GBE system may cool the molten alloy at a rate between 10 to 100 Kelvin/second.

The GBE system may melt the elements in Ar atmosphere, e.g., at approximately 1.5 bar absolute pressure, or another inert gas, e.g. nitrogen. In some examples, the GBE system may melt the elements in vacuum allows. For instance, when the GBE system uses an inert gas or vacuum during melting and creation of the compound, e.g., for the rare earth transitional elemental additive material alloy, the GBE system may slightly increase the oxygen content, the carbon content, or both, in the alloy. In some examples, when the GBE system uses an inert gas or vacuum during melting and creation of the compound, the GBE system may suppress loss of neodymium, dysprosium, praseodymium, or two or more of these, e.g., due to the evaporation.

In some implementations, the GBE system may use an induction melting process of at least 400 V, 3000 Hz and 100 KW power, for a charge size of 55 Kg. The GBE system may include operative amounts of a reducing agent in the inert atmosphere used during melting of the elements. For instance, the GBE system may use hydrogen as a reducing agent. In some examples, the GBE system may agitate the elements in the crucible by argon purging through the bottom of a porous crucible to achieve homogeneous distribution of the elements in the melt.

The GBE system may reduce the amount of 0, C, or both, introduced into the rare earth transitional elemental additive material by preparing the compound as described above, e.g., compared to other techniques for alloy preparation. The GBE system may replace part or all of an Nd-rich grain boundary phase with a liquid eutectic phase of the alloy to increase the properties of a final sintered magnet body.

TABLE 3

$Nd_2Dy_7Co_6CuFe_{0.33}$ Alloy Properties

| Elemental Material | Oxygen Content in Elemental Material | Carbon Content in Elemental Material | Average Oxygen and Carbon Introduced into Alloy | Elemental Content in Alloy |
|---|---|---|---|---|
| Nd | 0.08 wt % | Below detection limit | | 13.44 |
| Dy | 0.03 wt % | Below detection limit | | 61.50 |
| Co | Below detection limit | 0.005 wt % | | 19.280 |
| Cu | Below detection limit | Below detection limit | | 3.130 |
| Fe | Below detection limit | Below detection limit | | 2.466 |
| Oxygen | — | — | 0.06 wt % | 0.17 wt % |
| Carbon | — | — | 0.009 wt % | 0.014 wt % |
| Total | — | — | — | 100 wt % |

TABLE 4

$Pr_2Tb_7Co_6CuFe_{0.33}$ Alloy Properties

| Elemental Material | Oxygen Content in Elemental Material | Carbon Content in Elemental Material | Average Oxygen and Carbon Introduced into Alloy | Elemental Content in Alloy |
|---|---|---|---|---|
| Nd | 0.07 wt % | Below detection limit | | 14.100 |
| Dy | 0.02 wt % | Below detection limit | | 61.400 |
| Co | Below detection limit | 0.004 wt % | | 19.500 |
| Cu | Below detection limit | Below detection limit | | 3.100 |
| Fe | Below detection limit | Below detection limit | | 2.466 |
| Oxygen | — | — | 0.03 wt % | 0.12 wt % |
| Carbon | — | — | 0.006 wt % | 0.01 wt % |
| Total | — | — | — | 100 wt % |

In some implementations, the GBE system may use an arc melting process, e.g., vacuum melting or re-melting, to prepare the rare earth transitional elemental additive material. For instance, the GBE system melts the elements for the alloy, e.g., the elements described above, in a copper crucible to create a molten alloy, e.g., using induction or arc melting. The GBE system under vacuum cools the copper crucible, e.g., using water cooling, to create an ingot from the molten alloy which solidifies, continuously, from the bottom upwards. The GBE system may melt the elements to create the molten alloy and cool the molten alloy to create the ingot. The GBE system may melt the elements under 1.8 bar of absolute pressure, e.g., in an argon atmosphere. The GBE system may cool the molten allow in a vacuum that is greater than 10-1 bar.

In some examples, the GBE system re-melts the ingot in the copper crucible by heating the ingot using arc melting to product a re-melted molten alloy. The GBE system cools the re-melted molten alloy to create a re-melted ingot which solidifies, continuously, from the bottom upwards.

The arc melting or re-melting process may create a high performance alloy, a high purity alloy, or both, for manufacturing a rare earth sintered magnet with specific properties, e.g., a high Br of 1.3 T or more, a high coercivity of 2000 kA/m or more, or both, with a modify grain boundary phase. A GBE system may use a melting or a re-melting process to reduce gas content, e.g., contamination, reduce macro-segregation and microsegregation, increase yield, increase property reproducibility, or two or more of these. For instance, the GBE system may increase property reproducibility because of a limited molten metal alloy pool produced during re-melting which allows GBE system control of ingot solidification rates, e.g., the segregation and the chemical composition of the molten metal alloy.

In some examples, the GBE system may form the $Nd_{11.92}Dy_{42.32}Co_{38.39}Cu_{5.34}Fe_{2.03}$ at. % precursor using the RF melted ingots and cool the melted ingots naturally, e.g., at room temperature, without a cooling source, or both, in an alumina crucible. The GBE system may melt the ingots multiple times, e.g., twice, to ensure homogenous elemental distribution of the elements in the melted ingots. The GBE system may verify the distribution of the elements in the final precursor using inductive coupled plasma (ICP). The density of the $Nd_{11.92}Dy_{42.32}Co_{38.39}Cu_{5.34}Fe_{2.03}$ at. % precursor may be 8.21 g/cm³. The GBE system may verify the density of the precursor using Archimedes principle.

In some implementations, the GBE system may use a spray atomizing apparatus with a high velocity gas jet on a free falling $Nd_{11.92}Dy_{42.32}Co_{38.39}Cu_{5.34}Fe_{2.03}$ at. % melt stream to form the precursor from the rare earth transitional elemental additive material. For instance, the high velocity gas jet may be an inert gas, e.g., Ar, Ne, He, N, or a combination of two or more of these, have a velocity of 500 m/s, or both. The high velocity gas jet may fragment the free falling $Nd_{11.92}Dy_{42.32}Co_{38.39}Cu_{5.34}Fe_{2.03}$ at. % melt stream into small droplets, each with a loss of about 2 wt. % of rare earth materials and an oxygen concentration of up to 0.04 wt. %.

The high velocity gas jet forms, propels and cools the droplets and may create droplets with nearly spherical submicron and micron particle size. This may create $Nd_{11.92}Dy_{42.32}Co_{38.39}Cu_{5.34}Fe_{2.03}$ at. % particles with a large surface area to volume ratio, e.g., which the GBE system may use to produce the composite powder using the $Nd_{11.92}Dy_{42.32}Co_{38.39}Cu_{5.34}Fe_{2.03}$ at. % precursor and the $Nd_2Fe_{14}B$ powder or $Nd_2(FeCo)_{14}B$ powder. The process of suitable powder size preparation of the $Nd_{11.92}Dy_{42.32}Co_{38.39}Cu_{5.34}Fe_{2.03}$ at. % is not limited only to spray atomizing but can be achieved also by spray pressure atomization, two-fluid atomization, rotary atomization, effervescent atomization, electrostatic atomization, ultrasonic and whistle atomization.

Figure 10:
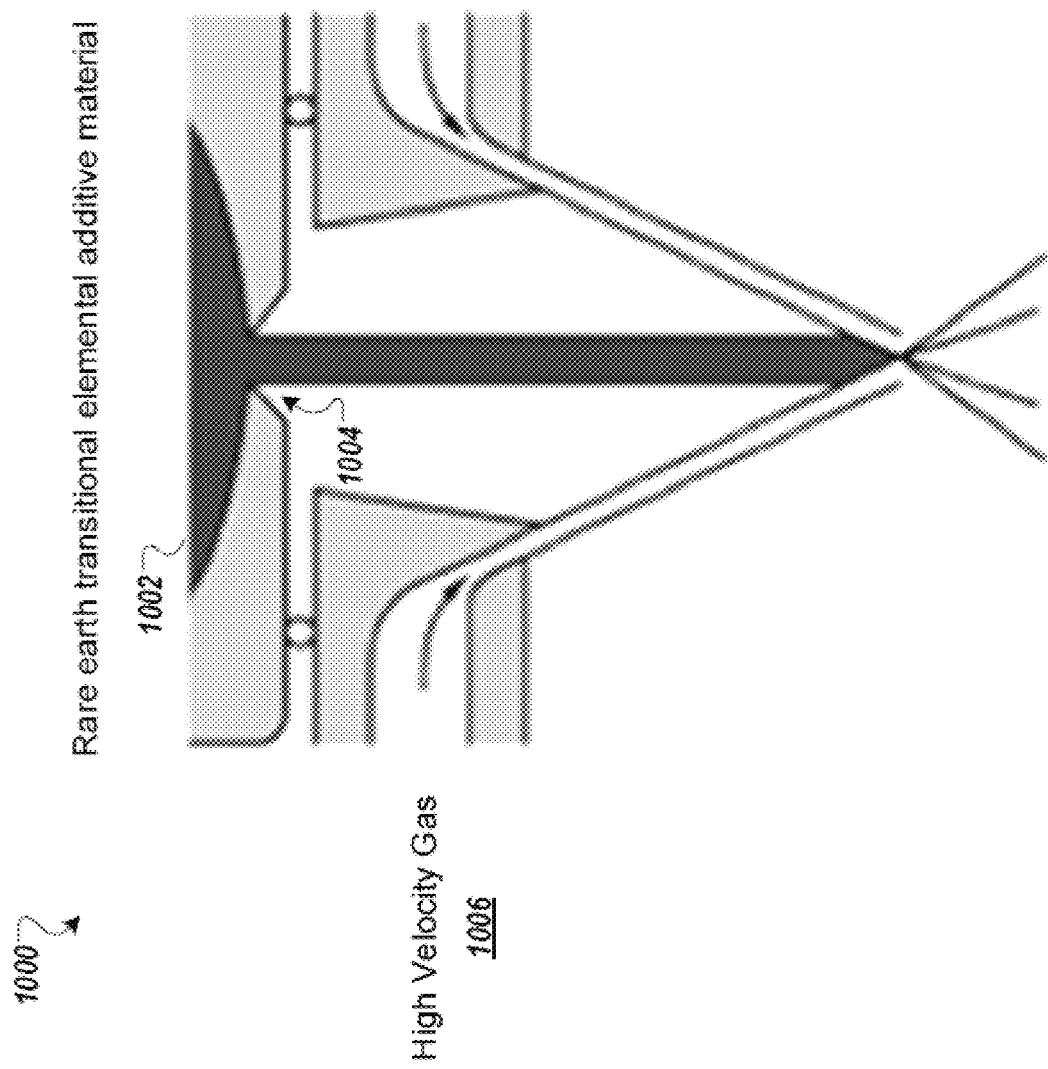
FIG. 10 is an example of a spray atomizing apparatus.

FIG. 10 shows an example of a spray atomizing apparatus 1000 that may allow the melted $Nd_{11.92}Dy_{42.32}Co_{38.39}Cu_{5.34}Fe_{2.03}$ at. % precursor 1002 to fall through a bottom aperture 1004 of the spray atomizing apparatus. For instance, the melted precursor 1002 may fall through the aperture 1004 due to gravity, in a high velocity gas jet, e.g., 0.18-0.58 MPa, on a free falling $Nd_{11.92}Dy_{42.32}Co_{38.39}Cu_{5.34}Fe_{2.03}$ at. % melt stream. The high velocity inert gas jet 1006 rapidly fragments a volume of the melted $Nd_{11.92}Dy_{42.32}Co_{38.39}Cu_{5.34}Fe_{2.03}$ at. % precursor 1002 into large number of small droplets. The small droplets may have an oxygen concentration of up to 0.04 wt. %, about 2 wt. % loss of rare earth material, and a powder size of 140-280 micrometers. The density of the measured $Nd_{11.92}Dy_{42.32}Co_{38.39}Cu_{5.34}Fe_{2.03}$ at. % powder of the precursor may be 8.08 g/cm3. In some examples, a density of the droplets varied from 95-98% of the theoretical value, e.g., 8.375 g/cm3 for a single phase $Nd_{11.92}Dy_{42.32}Co_{38.39}Cu_{5.34}Fe_{2.03}$ at. % droplet.

The GBE system may then place the atomized powder or melted droplets into a hydrogen mixing reactor together with an $Nd_2Fe_{14}B$ sinter block to produce the composite mixture. The hydrogen mixing reactor may be evacuated and then introduce hydrogen gas into the processing chamber with the precursor and the $Nd_2FeB$ sinter block for 12 hours. The hydrogen is absorbed by the Nd—Fe—B sinter block magnet body, by the $Nd_{11.92}Dy_{42.32}Co_{38.39}Cu_{5.34}Fe_{2.03}$ at. % precursor, e.g., powder or droplets, or both, causing expansion of the corresponding material and the corresponding material to break apart into a powder, e.g., a coarse powder. The hydrogen mixing reactor processing may cause the $Nd_{11.92}Dy_{42.32}Co_{38.39}Cu_{5.34}Fe_{2.03}$ at. % precursor to release entrapped gas accumulated during the atomization process. In some examples, hydrogen mixing reactor may process the precursor and the $Nd_2Fe_{14}B$ sinter block under absolute pressure of about 2 bar with a constant feed of hydrogen into the processing chamber until the process is complete, e.g., when there is no change of pressure detected. The GBE system may then heat the powders in-situ to 580° C. to partially desorb the composite $Nd_{11.92}Dy_{42.32}Co_{38.39}Cu_{5.34}Fe_{2.03}$ at. %/Nd—Fe—B mixture, e.g., to cause the release of hydrogen from the body of the powder particles. The GBE system may then transfer the composite powder into an argon atmosphere transfer-box, e.g., to move the composite powder to another component of the GBE system.

In some implementations, the GBE system may further process the composite powder, e.g., the $Nd_{11.92}Dy_{42.32}Co_{38.39}Cu_{5.34}Fe_{2.03}$ at. % precursor and Nd—Fe—B or Nd—Fe—Co—B, using high energy milling, ball milling or jet milling. The GBE system may process the composite powder until the powder is a homogeneous mixture and has a powder size of 2-4.5 µm.

The rare earth transitional elemental additive material may include one or more elements from Nd, Pr, Dy, Co, Cu, and Fe. Some examples of ranges for the combinations of the elemental additive material include Nd: [6.1717, 11.8917] (at. %); Pr: [1.5495, 4.821] (at. %); Dy: [0.2132, 5.3753] (at. %); Co: [0, 4.0948] (at. %); Cu: [0.0545, 0.2445] (at. %); and Fe: [81.1749, 85.867] (at. %). In some implementations, a range for the amount of rare earth elements in the rare earth transitional elemental additive material may be [13.236, 16.407] (at. %) or [28.82, 33.7] (wt. %). In some examples, small amounts of 0, C, or both, may be added to the rare earth transitional elemental additive material during processing of the rare earth transitional elemental additive material. The ranges of the rare earth transitional elemental additive material in wt. % may be: Nd: [12.726, 24.85] (wt. %); Pr: [3.1638, 9.677] (wt. %); Dy: [0.506, 12.49] (wt. %); Co: [0, 3.4963] (wt. %); Cu: [0.0506, 0.2248] (wt. %); and Fe: [63.6551, 70.009] (wt. %).

In some examples, the GBE system replaces the old Nd-rich grain boundary phase with the rare earth transitional elemental additive material by any appropriate method. For instance, when the Nd-rich grain boundary phase is oxidized and does not react with $H_2$ during hydrogen processing, the GBE system may sieve the $Nd_2Fe_{14}B$ powders to remove the Nd-rich grain boundary phase. In some examples, the GBE system may sieve the $Nd_2Fe_{14}B$ powders to remove ultra-fine particles, e.g., that have a nanometer size less than one micrometer, that include the Nd-rich grain boundary phase particles. In some implementations, the GBE system may fragment the $Nd_2Fe_{14}B$ sintered magnet separately from the rare earth transitional elemental additive material so that some of the additive material is not removed during the sieving process.

The rare earth transitional elemental additive material may be chosen using an elemental analysis of the magnetic material composition and a database of formulas determined by experiment and extrapolation to be suitable for achieving a predefined target formulation and magnetic performance or any other appropriate method. For instance, the database may include historical data indicating composition properties of magnetic material and rare earth transitional elemental additive material added to the magnetic material to achieve desired properties for a resulting sintered magnet product.

In some examples, a system may use the following formulas to determine the total amount of elements in the sintered magnet product, e.g., created in step 918. For instance, a final value f1 of Nd in the sintered magnet product may be $f1 = w*p1 + (1-w)*a1$ when w=[81, 99.9] (at. %), 1−w=[0.1, 19] (at. %), p1 is the amount of Nd in the initial alloy, and a1 is the amount of Nd in the elemental additive material. A final value f2 of Pr in the sintered magnet product may be $f2 = (1-w)*a2$ when a2 is the amount of Pr in the elemental additive material. A final value f3 of Dy in the sintered magnet product may be $f3 = (1-w)*a3$ when a3 is the amount of Dy in the elemental additive material. A final value f4 of Co in the sintered magnet product may be f4=(1−w)*a4 when a4 is the amount of Co in the elemental additive material. A final value f5 of Cu in the sintered magnet product may be f5=(1−w)*a5 when a5 is the amount of Cu in the elemental additive material. A final value f6 of Fe in the sintered magnet product may be 6=w*p2+(1−w)*a6 when p2 is the amount of Fe in the initial alloy and a6 is the amount of Fe in the elemental additive material. A final value f7 of O in the sintered magnet product may be f7=w*p4+(1−w)*a7+E_O when p4 is the amount of O in the initial alloy, e.g., after processing of the alloy, a7 is the amount of O in the elemental additive material, and E_O is the amount of oxygen added during processing of the combined alloy and elemental additive material to create the sintered magnet product. A final value f8 of C in the sintered magnet product may be f8=w*p5+(1−w)*a8+E_C when p5 is the amount of C in the initial alloy, e.g., after processing of the alloy, a8 is the amount of C in the elemental additive material, and E_C is the amount of carbon added during processing of the combined alloy and elemental additive material to create the sintered magnet product. A final value f9 of B in the sintered magnet product may be f9=w*p3 when p3 is the amount of B in the initial alloy.

In some examples, the final value f1 of N may be in the range [7.3635, 11.1038] (at. %). The final value f2 of Pr may be in the range [1.445, 3.6323] (at. %). The final value f3 of Dy may be in the range [0.199, 4.0535] (at. %). In some implementations, a total amount of the rare earth elements in the rare earth transitional elemental additive material may be in the range [12.66, 15.03] (at. %). The final value f4 of Co may be in the range [0, 3.098] (at. %). The final value f5 of Cu may be in the range [0.0508, 0.1849] (at. %). The final value f6 of Fe may be in the range [76.3928, 80.0287] (at. %). The final value f7 of O may be in the range [0.09, 4.0] (at. %). The final value f8 of C may be in the range [0.01, 1.0] (at. %). The final value f9 of B may be in the range [5.7493, 6.4244] (at. %).

In some examples, the final value f1 of N may be in the range [16.125, 24.575] (wt. %). The final value f2 of Pr may be in the range [3.125, 7.75] (wt. %). The final value f3 of Dy may be in the range [0.5, 10] (wt. %). In some implementations, a total amount of the rare earth elements in the rare earth transitional elemental additive material may be in the range [29, 33] (wt. %). The final value f4 of Co may be in the range [0, 2.8] (wt. %). The final value f5 of Cu may be in the range [0.05, 2.8] (wt. %). The final value f6 of Fe may be in the range [64.6705, 69.2205] (wt. %). The final value f7 of O may be in the range [0.01, 0.9] (wt. %). The final value f8 of C may be in the range [0.01, 0.5] (wt. %). The final value f9 of B may be in the range [0.95, 1.05] (wt. %).

At 912, the process fragments and homogeneously mixes the powder by suitable means. In some implementations, this is accomplished by jet milling to a target particle size between about 1 to about 4 microns. The powder may be fragmented, homogenized, or both using any appropriate fragmentation apparatus, such as those described in more detail above. In some implementations, steps 910 and 912 may be performed concurrently. In some implementations, instead of adding the rare earth transitional elemental additive material minor fraction to the batch to be hydrogenated, the rare earth material is separately hydrogenated and mixed in at 912. In some examples, the rare earth transitional elemental additives may be milled separately and added after milling of the magnetic material, e.g., after 912, during which the magnetic material is preferably divided suffi- ciently to form a powder in the range of between about 1 to about 50 microns using high pressure e.g., 60 bar.

In some implementations, the GBE system may use a jet milling system, e.g., after using a hydrogen mixing reactor, to homogenize and form the composite power with a results powder size of 2 to 4.5 μm.

In some implementations, a GBE system homogenizes the $Nd_{11.92}Dy_{42.32}Co_{38.39}Cu_{5.34}Fe_{2.03}$ at. % powders with the $Nd_2Fe_{14}B$ powders to obtain uniform distribution of a new grain boundary elemental concentration within a bulk Nd—Fe—B-type body, e.g., a final sintered magnet. In some examples, the GBE system may use homogenization and uniform distribution to make final sintered magnets from different initial sintered magnets more uniform.

In some examples, homogenization may reduce grain size, may enclose, e.g., surround, the original Nd—Fe—B powders, e.g., grains, with $Nd_{11.92}Dy_{42.32}Co_{38.39}Cu_{5.34}Fe_{2.03}$ at. % powders, or both. In some implementations, homogenization may include a comminuting step in which the GBE system grinds a coarse powder of $Nd_{11.92}Dy_{42.32}Co_{38.39}Cu_{5.34}Fe_{2.03}$ at. % and a coarse powder of the initial Nd—Fe—B sintered magnet into a fine powder consisting of small particles, e.g., with a size between about 0.5 μm to about 5 μm by applying a mechanical force, e.g., H2, to the materials. The application of the mechanical force to the materials, e.g., the $Nd_{11.92}Dy_{42.32}Co_{38.39}Cu_{5.34}Fe_{2.03}$ at. % and the Nd—Fe—B sintered magnet, may create particles from the materials and cause an increase in the surface area of the particles. In some examples, the homogenization may cause a random distribution of the $Nd_{11.92}Dy_{42.32}Co_{38.39}Cu_{5.34}Fe_{2.03}$ at. % particles within the Nd2Fe14B particles. In some examples, a GBE system may homogenize the distribution of the $Nd_{11.92}Dy_{42.32}Co_{38.39}Cu_{5.34}Fe_{2.03}$ at. % powders within the $Nd_2Fe_{14}B$ powder using mechanical mixing devices, including a spiral mixer, V-blender or a twin-shell V-blender, jet milling, ball milling, high-energy milling or mechano-chemical devices such as hydrogen mixing reactor.

At 914, the process sieves larger particles, e.g., about 1 mm, out of the fragmented material. For instance, the GBE system processes a powder oxidized fraction by sieving out larger particles, such as particles between about 500 microns to about 2 mm, from the fine powder. This procedure is effective for removing the oxidized fraction because of the hardness of oxides relative to the major fraction of recovered rare earth magnet material which prevents the oxidized particles from fragmenting into smaller parts. For example, hydrogenation, milling, jet milling, crushing, or another appropriate method, may be less apt to break up oxides leaving their size distribution larger and making possible to eliminate or reduce their proportion in the fine powder by sieving.

At 916, the process presses and aligns the fine powder to form a green compact by filling a press and establishing a magnetic field in the press, and at 918 the process sinters and heat treats the green compact to form a final sintered magnet product. For instance, the GBE system creates a green compact with the rare earth transitional elemental additive materials in the grain boundary between the 2:14:1 phase grains initially created in the cast alloy flakes. The rare earth transitional elemental additive materials are distributed homogeneously between the 2:14:1 phase grains. The final sintered magnet product may be a composite of high density, e.g., from 7.5 to 7.6 $g/cm^3$.

The rare earth transitional elemental additive materials may form a new grain boundary phase, e.g., that is substantially $Nd_{11.92}Dy_{42.32}Co_{38.39}Cu_{5.34}Fe_{2.03}$ at. %. In some implementations, the new grain boundary phase substantially replaces the initial grain boundary phase that was previously included in the initial sintered magnet. For instance, the $Nd_{11.92}Dy_{42.32}Co_{38.39}Cu_{5.34}Fe_{2.03}$ at. % grain boundary phase substantially replaces the old Nd-rich grain boundary phase. The new grain boundary phase may have increased grain boundary cohesion with increasing volume fraction and act as a nucleation site for the formation and growth of reversed nucleation sides within the final sintered magnet product. In some examples, the new grain boundary phase may inhibit the probability of surface defects on the individual grains of the final sintered magnet.

In some implementations, the GBE process may use powder blending and a hydrogen mixing reactor to prepare composite mixture of $Nd_2Fe_{14}B$ alloy and $Nd_{11.92}Dy_{42.32}Co_{38.39}Cu_{5.34}Fe_{2.03}$ at. % prior to removing the Nd-rich phase from the alloy. The GBE process may create a final sintered magnet with a new grain boundary phase that exhibits density improvements as the volume fraction of the new grain boundary phase increases from 10 to 90 vol. %, e.g., using $Nd_{11.92}Dy_{42.32}Co_{38.39}Cu_{5.34}Fe_{2.03}$ at. % as the rare earth transitional elemental additive material. In some examples, the rare earth transitional elemental additive material may act as a sintering aid, e.g., in the range of 10 to 30 vol. % and 50 to 90 vol. % of the grain boundary phase, by making the sintering process more efficient, providing better mechanical properties for the final sintered magnet, or both. In some examples, when a GBE system uses the GBE process to add a new grain boundary phase to a final sintered magnet, the final sintered magnet has improved corrosion resistance.

Figure 11:
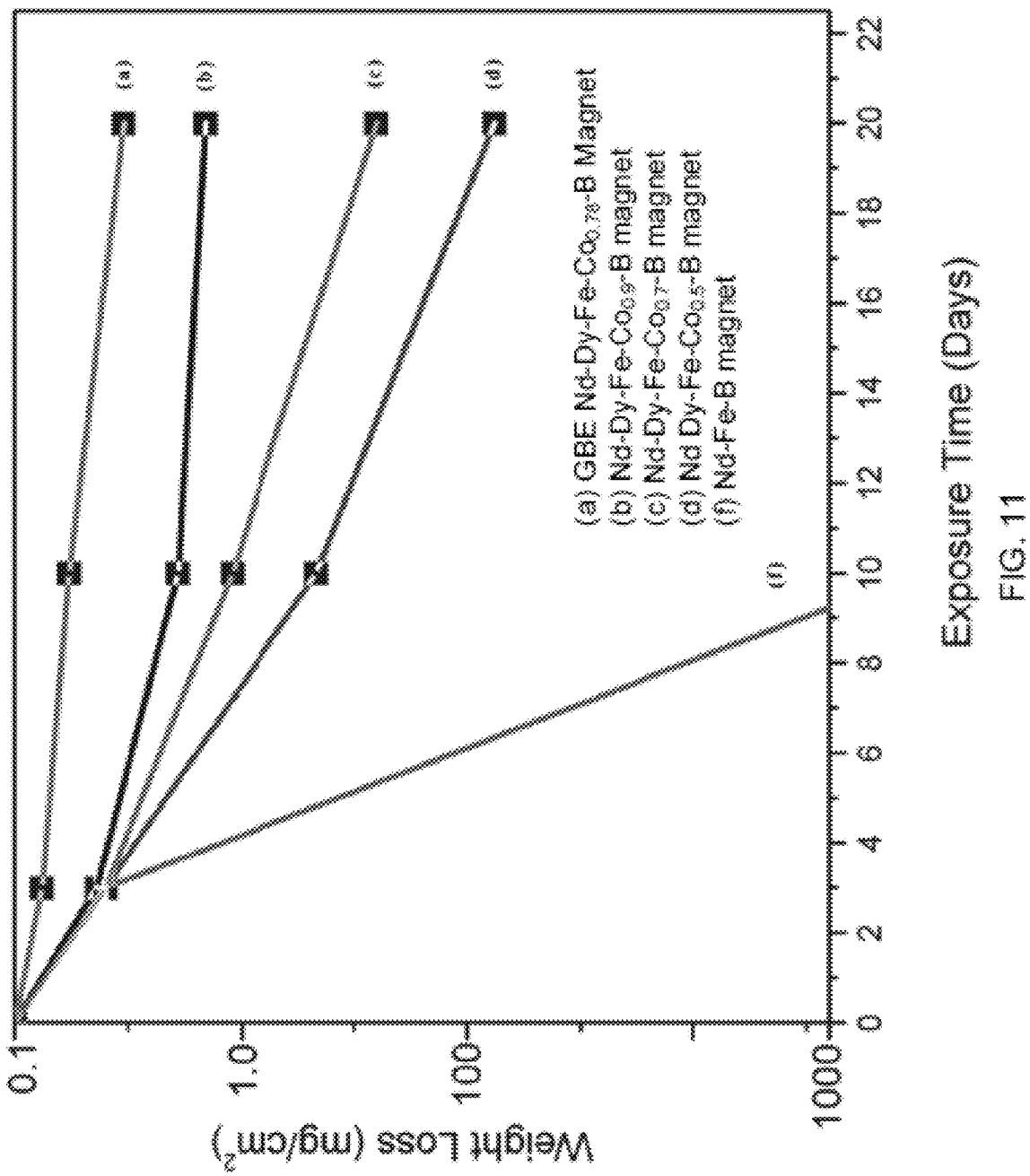
FIG. 11 shows a graph comparing the corrosion resistance of a GBE final magnet with other Nd—Fe—B magnets.

For instance, FIG. 11 shows a graph comparing the corrosion resistance of a GBE final magnet with other Nd—Fe—B magnets, e.g., waste sintered Nd—Fe—B magnets. For instance, FIG. 11 shows the weight loss in milligrams per cm2 of surface area of the following sintered magnets, (a) a final GBE Nd—Dy—Fe—Co0.78-B magnet with 1 at. % of Nd/Pr additions, (b) a Nd—Dy—Fe—Co0.9-B magnet, (c) a Nd—Dy—Fe—Co0.7-B magnet, (d) a Nd—Dy—Fe—Co0.5-B magnet, and (f) an Nd—Fe—B traditional magnet. The magnets were tested using a highly accelerated stress test at 130° C. and 2.7 bar in water vapor similar to IEC 68-2-66, with an exposure time of twenty days, in dependence on the Co-concentration of the magnets.

A GBE system added fresh additive material to waste Nd—Fe—B powder to create the GBE final magnet with restored magnetic performance, microstructure, and density. The fresh additive material may be, e.g., Nd and Pr or $Nd_{11.92}Dy_{42.32}Co_{38.39}Cu_{5.34}Fe_{2.03}$ at. % or Nd with two additional material, or Pr with two additional materials. The additional materials may be selected from Fe, Co, Cu, Dy, Nd, or Pr. The GBE final magnet has improved corrosion resistance compared to the other magnets tested. In this example, the corrosion resistance begins to increase with inclusion of 10 vol. % of newly modified $Nd_{11.92}Dy_{42.32}Co_{38.39}Cu_{5.34}Fe_{2.03}$ at. % grain boundary phase to replace the old Nd-rich grain boundary phase.

In some implementations, the starting composition of the initial sintered magnet, e.g., a waste Nd—Fe—B sintered material or a new sintered magnet, may include Pr at 5.585 wt. %, Nd at 23.615 wt. %, Dy at 0.4 wt. %, Co at 0.79 wt. %, Cu at 0.1 wt. %, B at 0.98 wt. %, C at 0.0704 wt. %, O at 0.059 wt. %, and Fe at 68.4006 wt. %. The end composition of the final sintered magnet may include Pr at 5.22 wt. %, Nd at 22.88 wt. %, Dy at 0.93 wt. %, Co at 1 wt. %, Cu at 0.12 wt. %, B at 1 wt. %, C at 0.13 wt. %, O at 0.12 wt. %, and Fe at 68.6 wt. %.

In some implementations, a GBE system may design an appropriate grain boundary engineering approach. For instance, a GBE system may use global trend information about a degree of equilibrium of non-ordered or ordered grain boundaries to reduce an overall grain size by grain boundary segregation engineering, leading to a reduction in grain boundary energy and grain boundary mobility. In some examples, the GBE system may require crystallographic and elemental analysis of segregation or quantification of overall additions of volume fraction of new grain boundary $Nd_{11.92}Dy_{42.32}Co_{38.39}Cu_{5.34}Fe_{2.03}$ at. % between grain interiors and the abutting $Nd_2Fe_{14}B$ grain boundary, or both, as starting information for a possible grain boundary segregation and microstructure information for a grain growth inhibition. In some implementations, Grain Boundary Engineering results in a homogeneously distribution of the $Nd_{11.92}Dy_{42.32}Co_{38.39}Cu_{5.34}Fe_{2.03}$ at. % precursor powder through the final magnet body, e.g., throughout the grain boundary.

In some implementations, the GBE system may use the process 900, some of the steps of the process 900, or another appropriate method to modify the grain boundary of another type of magnet. For instance, the GBE system may modify the grain boundary of an $Nd_2(FeCo)_{14}B$ sintered magnet or an $Sm_2Co_{17}$ sintered magnet. In some examples, when modifying the grain boundary of an $Sm_2Co_{17}$ sintered magnet, the GBE system may add a combination of one or more of Sm, Co, Zr, Fe, or Cu.

EXAMPLE 2

Magnets created with the GBE technique have improved temperature performance. For example, magnets created with the GBE technique have improved thermal stability and improved magnetic properties. Recycled magnets, such as Nd—Fe—B recyclates e.g., from end-of-life products, may have improved thermal stability compared to the input material, e.g., virgin magnets, processed to create the recycled Nd—Fe—B magnets. Magnets made from input virgin, or mostly virgin, Nd—Fe—B magnetic material and processed with the GBE technique may have improved thermal stability compared to magnets made with other processes.

Table 5 shows the ICP composition of two starting magnets, starting magnet 1 and starting magnet 2, and of two final magnets made from the starting magnets, final magnet 1 and final magnet 3. Final magnet 1 includes 0.5 at. % addition of additive material, added using the GBE technique, and final magnets 2 and 3 include 2 at. % and 3 at. %, respectively, addition of additive material, added using the GBE technique.

The starting magnet 1 was used as the starting magnetic material for the final magnet 2, with 2 at. % additions, and the final magnet 3, with 3 at. % additions. The starting magnet 2 was used as the starting magnetic material for the final magnet 1. The starting magnets 1 and 2 were made from virgin magnetic material, i.e., and were not recycled magnets.

TABLE 5

ICP of magnets (wt. %) ± 0.08 wt. %

|  | Starting Magnet 1 | Starting Magnet 2 | Final Magnet 1 | Final Magnet 3 |
|---|---|---|---|---|
| Pr | 5.75 | 7.14 | 5.64 | 6.43 |
| Nd | 23.91 | 21.07 | 22.5 | 21.63 |
| Dy | 0.31 | 0.4 | 0.95 | 3.42 |
| Fe | 67.85 | 69.10 | 68.2 | 64.75 |
| Ga | 0.11 | 0.11 | 0.1 | 0.1 |
| Zr | 0.1 | 0.12 | 0.09 | 0.11 |
| Al | 0 | 0.25 | 0.1 | 0.28 |
| Co | 0.73 | 0.55 | 1 | 1.74 |
| Cu | 0.12 | 0.16 | 0.13 | 0.32 |
| B | 0.98 | 0.96 | 1.05 | 0.97 |
| C | 0.074 | 0.069 | 0.12 | 0.12 |
| O | 0.069 | 0.067 | 0.12 | 0.13 |
| Density (g/cm$^3$) | 7.55 | 7.55 | 7.55 | 7.55 |

Testing was performed to determine the thermal stability of the starting magnets and the final magnets, i.e., from 20 to 200° C., using a permeameter. Each of the magnets had a cylindrical shape and a length to diameter ratio L/D of 0.9 cm/1 cm=0.9, e.g., the length to diameter ratio L/D for each of the magnets is the same. Testing proceed by placing each of the magnets into the permeameter and measuring the respective magnet's remanence and coercivity at room temperature. Testing continued by increasing the temperature and holding the temperature at each stage for fifteen minutes before again measuring the respective magnet's remanence and coercivity.

The starting magnet 1 and the starting magnet 2 had a demagnetization curve knee, e.g., the point at which remanence drops abruptly to zero, barely above 80° C. The final magnet 1 had a demagnetization curve knee at 120° C. The final magnet 3 had a demagnetization curve knee above 200° C. These results indicate that both the final magnet 1 and the final magnet 3 are more thermally stable than both of the starting materials 1 and 2 and that the final magnet 3 is the most thermally stable of the four magnets tested.

The reversible loss coefficients α and β plotted against temperature represent the reversible loss of remanence and coercivity when a magnet is operating at a particular temperature. For example, Table 6 below summaries the temperature range and reversible loss α and the coercivity reversible loss β for starting magnet 1 and final magnet 3.

TABLE 6

Reversible loss for starting magnet 1 and final magnet 3

Remanence reversible loss α

|  | α at 80° C. | α at 120° C. | α at 140° C. | α at 160° C. | α at 180° C. | α at 200° C. |
|---|---|---|---|---|---|---|
| Starting Magnet 1 | −0.12 | −0.12 | −0.13 | −0.141 | −0.14 | −0.14 |
| Final Magnet 3 | −0.019 | −0.062 | −0.06 | −0.09 | −0.09 | −0.11 |

Coercivity reversible loss β

|  | β at 80° C. | β at 120° C. | β at 140° C. | β at 160° C. | β at 180° C. | β at 200° C. |
|---|---|---|---|---|---|---|
| Starting Magnet 1 | −0.82 | −0.68 | −0.62 | −0.57 | −0.53 | −0.50 |
| Final Magnet 3 | −0.60 | −0.56 | −0.53 | −0.51 | −0.49 | −0.47 |

The temperature at which magnetic flux φ for a magnet decreases by no more than 5% while held at that temperature and remains reversible during cooling is defined at T5%. To determine this temperature for the magnets, a flux reading for the magnets was taken after the magnets were held at various temperatures in a range from 20 to 200° C. for two hours. When testing the final magnet 2 and the final magnet 3, both magnets had a maximum temperature T5% at which the magnetic flux decreased by no more than 5% of 200° C.

Figure 12A:
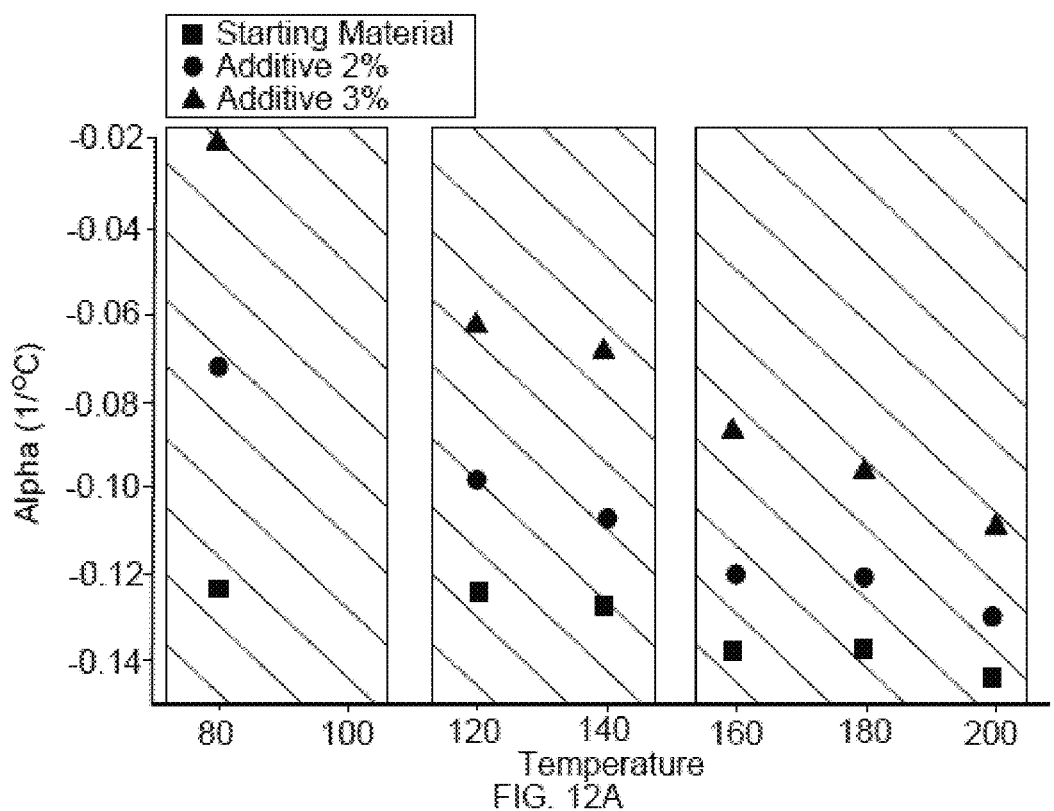
FIGS. 12A-B show remanence reversible losses α for starting and final magnets.
Figure 12B:
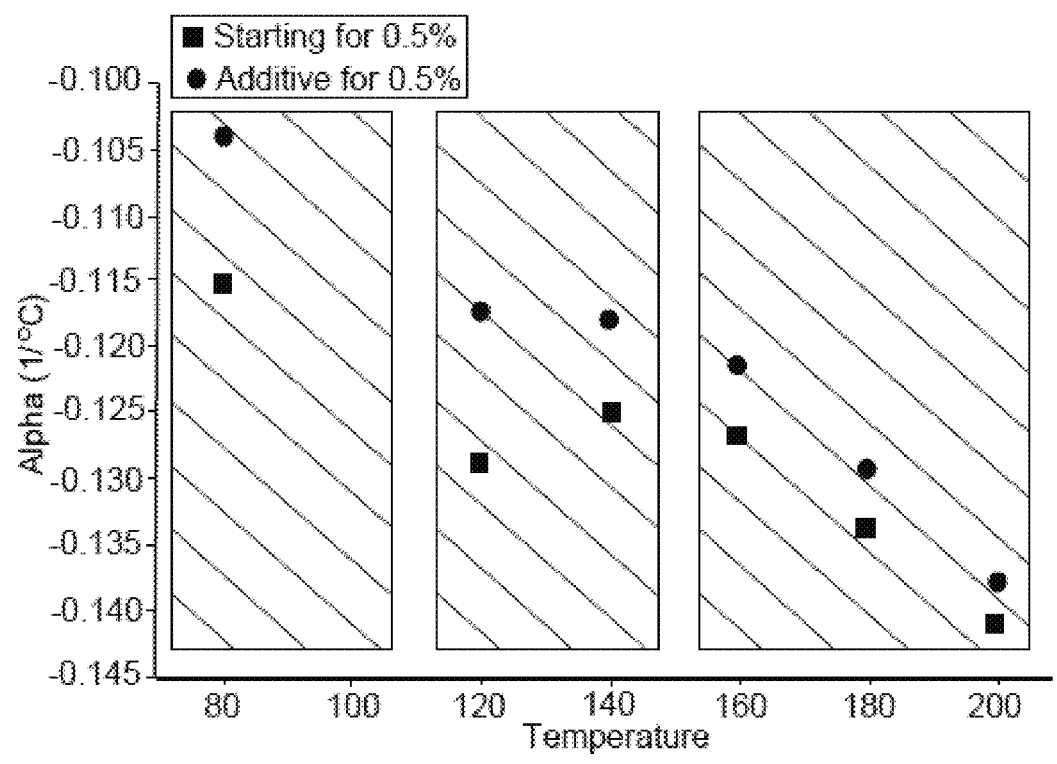

FIGS. 12A-B show remanence reversible losses α for starting and final magnets. For instance, FIG. 12A shows remanence reversible losses α for starting magnet 1, final magnet 2, and final magnet 3. For example, the final magnet 3 has better α at each temperature range with the improvement ranging from 84% at 80° C. to 25% at 200° C. compared to the starting magnet 1. The final magnet 2 had improved a at each temperature range compared to the starting magnet 1. FIG. 12B shows remanence reversible losses α for starting magnet 2 and final magnet 1. The final magnet 1 has a better α at each temperature range compared to the starting magnet 2.

Figure 13A:
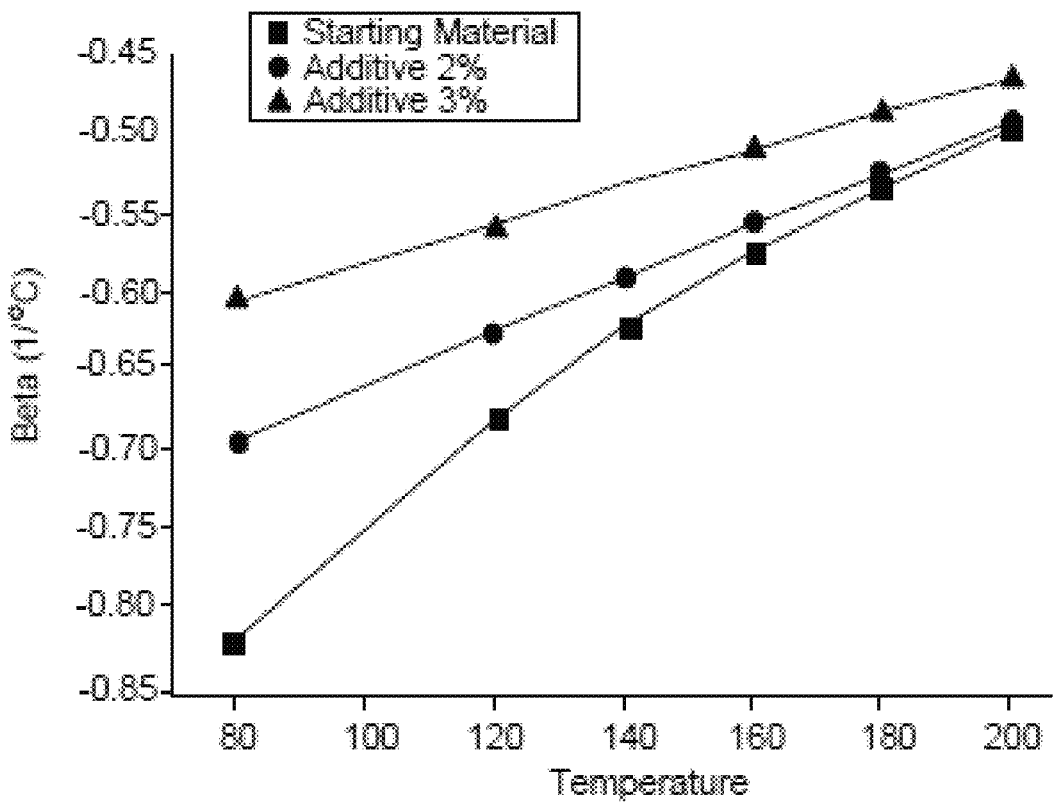
FIGS. 13A-B show coercivity reversible losses β for starting and final magnets.
Figure 13B:
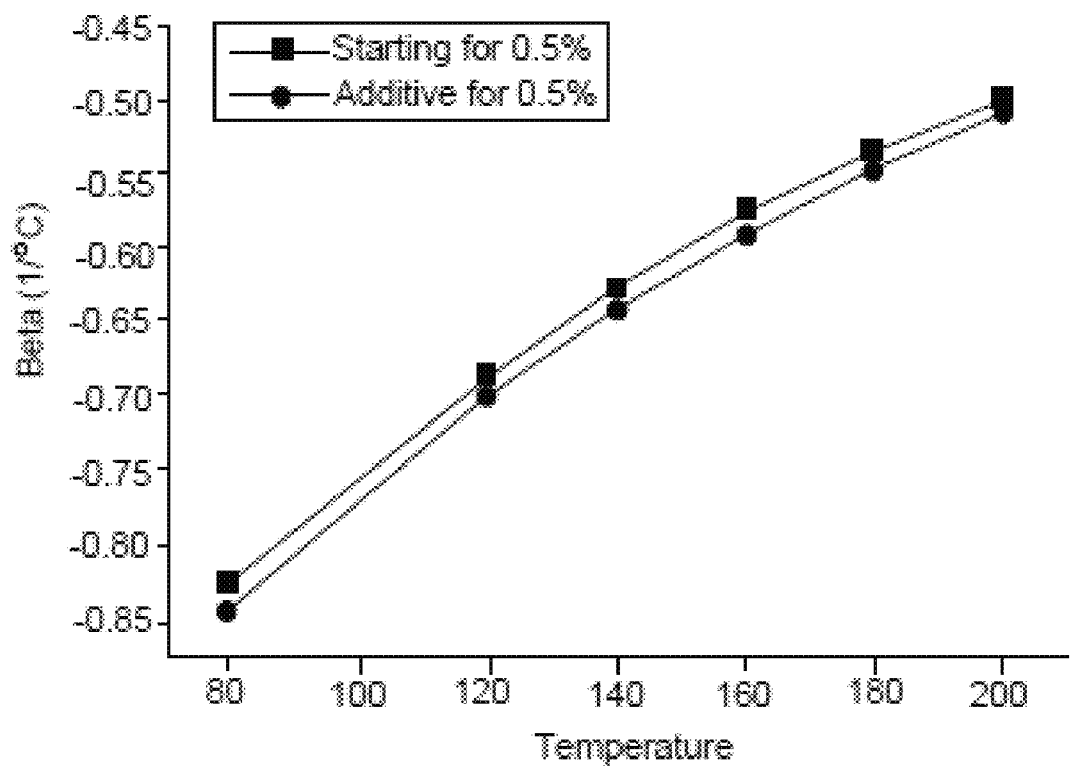

FIGS. 13A-B show coercivity reversible losses β for starting and final magnets. The final magnet 1 has decreasing β as temperature increases. For example, as temperature increases the coercivity loss saturates.

For instance, FIG. 13A shows coercivity reversible losses β for starting magnet 1, final magnet 2, and final magnet 3. FIG. 13B shows coercivity reversible losses β for starting magnet 2 and final magnet 1. The recycled final magnets 2 and 3 showed improved value for β at each temperature when compared with the starting magnets. For example, the final magnet 3 has better β at each temperature range with the improvement ranging from 26% at 80° C. to 6% at 200° C. compared to the starting magnet 1.

The final magnet 1, the final magnet 2, and the final magnet 3 have an overall improvement in coercivity (iHc) value. For example, the average coercive force (iHc) improvements for the final magnets 1, 2, and 3, respectively, across the whole temperature range, are 16%, 70% and 128% when compared to the respective starting magnets.

Table 7 shows the reversible coefficients α and β for Nd—Fe—B magnets made from virgin material and recycled Nd—Fe—B magnets. The recycled magnets have improved a and β compared to the magnets made from virgin material. Specifically, the recycled magnets have a remanence reversible loss α at 80° C. that is a factor of ten better than the magnets made from virgin material. At 140° C. the recycled magnets have a remanence reversible loss α that is twice as good as the romance reversible loss α of the magnets made from virgin material.

TABLE 7

Comparison of α and β in magnets made from virgin material and recycled magnets

|  | Br %/° C., α80 to α200 | iHc %/° C., β80 to β200 |
|---|---|---|
| Starting Magnets | −0.10 to −0.13 | −0.55 to −0.65 |
| Recycled Magnet | −0.02 to −0.11 | −0.47 to −0.60 |

In some implementations, the more elemental addition added to magnetic material using the GBE process, the more thermally stable the resulting final product, compared to starting magnetic material. In some examples, the GBE process may result in improved temperature stability and coercivity compared to starting material or magnetic material created with a different process.

EXAMPLE 3

In some examples, waste magnets may be processed using the GBE technique. For instance, a GBE system may create magnets, e.g., using steps 902 through 908, which includes the creation of waste magnets. In some examples, the waste magnets may be created using another process or may be received by a GBE system from another system.

The GBE system processes the waste magnets using steps 910 through 918 described above. In some implementations, the waste magnets and the recycled magnets may have properties similar to those shown in Table 8 below. As described above, the quantity and types of elements included in the additive material may be adjusted for each of the different waste magnets to result in a final magnet with the same properties. In some examples, 1 at. % of Nd/Pr was added to the particles formed from each of the waste magnets.

TABLE 8

ICP of magnets (at. %)

| | Waste Magnet 1 | Waste Magnet 2 | Waste Magnet 3 | Waste Magnet 4 | Final Magnet |
|---|---|---|---|---|---|
| Nd | 10.95 | 10.94 | 10.55 | 8.34 | 10.95 |
| Pr | 3.08 | 3.08 | 2.7 | 2.14 | 2.8 |
| Dy | 0 | 0.41 | 0.2 | 3.62 | 1.07 |
| Tb | 0 | 0 | 0 | 0 | 0.01 |
| Fe | 78.11 | 74.65 | 77.91 | 76.24 | 75.79 |
| B | 5.77 | 5.64 | 5.97 | 6.05 | 5.91 |
| Co | 0.52 | 3.36 | 1.05 | 1 | 1.5 |
| Al | 0.72 | 0.36 | 0.29 | 1.45 | 0.71 |
| Cu | 0.01 | 0.14 | 0.1 | 0.1 | 0.09 |
| Ga | 0 | 0.21 | 0.09 | 0.09 | 0.1 |
| O | 0.41 | 0.83 | 0.6 | 0.43 | 0.58 |
| C | 0.43 | 0.38 | 0.54 | 0.54 | 0.49 |

The remanence (Br) of the final magnet may be 1.25 T. The coercivity (iHc) of the final magnet may be 1710 kA/m. The energy product (BHmax) of the final magnet may be 303 kJ/m$^3$. The final magnet product may have a density of 7.55 g/cm$^3$.

Figure 14:
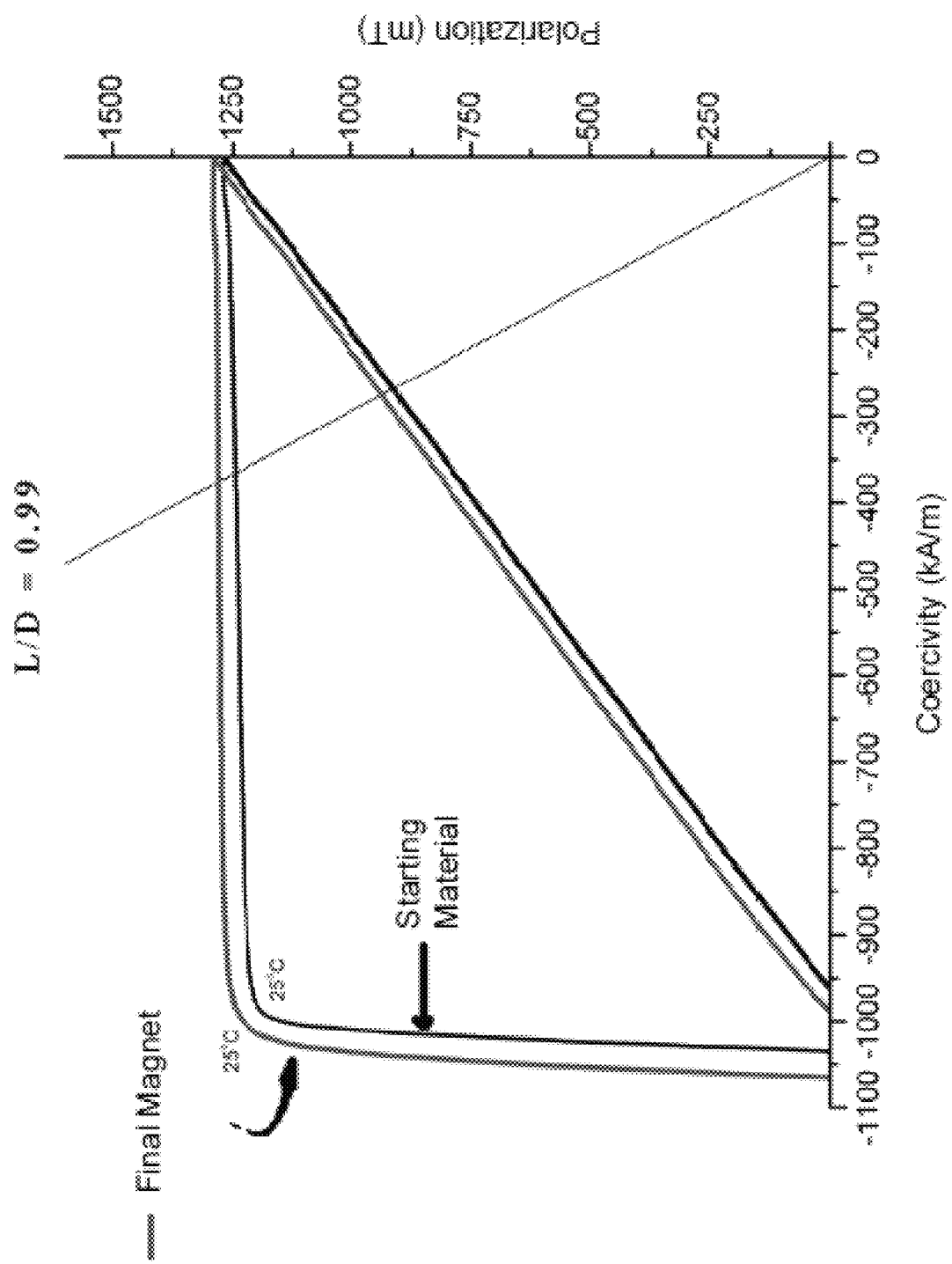
FIG. 14 shows a graph of example properties of a final magnet.

FIG. 14 shows a graph of example properties of the final magnet described in example 2, e.g., made from mixed grade waste magnets with 1 at. % Nd/Pr mixture additions. For instance, the final magnet may include an Nd/Pr grain boundary phase that replaced an old Nd-rich grain boundary phase.

Figure 15:
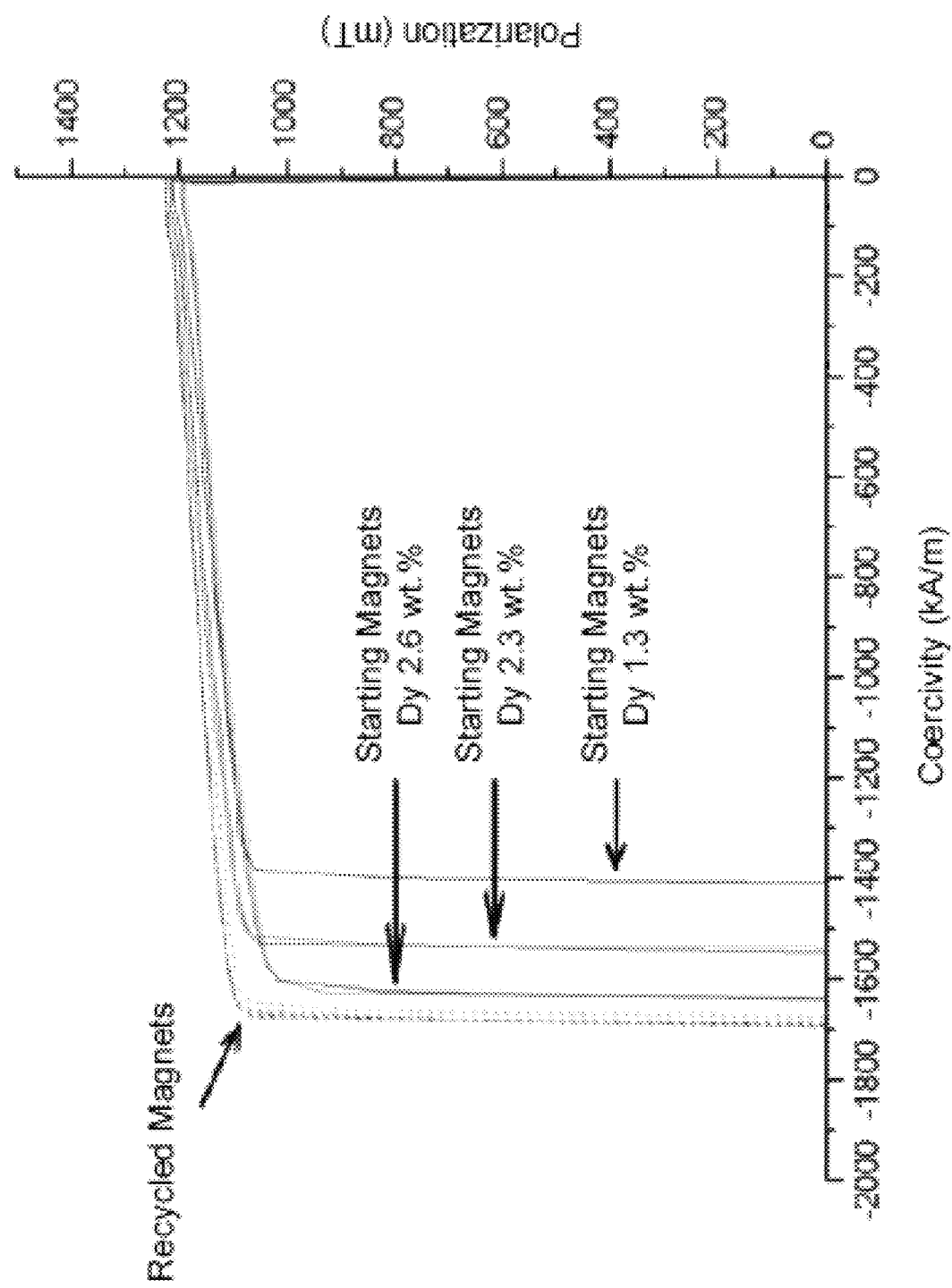
FIG. 15 shows some examples of magnetic properties of waste sintered magnets and recycled magnets.

FIG. 15 shows some examples of magnetic properties of waste sintered magnets and recycled magnets, e.g., processed using the GBE process. For instance, multiple waste sintered magnets were collected from consumer products in which the waste sintered magnets had different elemental compositions, e.g., see Table 8 for an ICP analysis of the waste sintered magnets.

In this example, the coercivity is controlled by the nucleation of so-called reverse domains at the surface defects of the individual grains in the magnets, e.g., both the waste sintered magnets and the recycled magnets. A GBE system may inhibit the formation of these defects by adding a new grain-boundary phase, e.g., using Nd/Pr additive material, which, after processing, surrounds the Nd—Fe—B phase grains, and may minimize the occurrence of surface defects, such as cracks, bumps, pits, etc.

In some implementations, the GBE system may create the recycled magnets to have the same or higher coercivity, as shown in FIG. 15, than the waste sintered magnets. In some examples, the coercivity of a starting magnet before GBE is about 1400 kA/m and the coercivity of a magnet processed using GBE is 1700 kA/m. For instance, the following GBE processes may recover or improve the coercivity of the waste magnets when forming the recycled magnets: a) the preparation of the composite powder from Nd/Pr additive material and the Nd—Fe—B waste magnet, b) adjustment of processing parameters, e.g., jet milling, sintering parameters, and annealing, or c) both. The GBE system may improve the performance of the recycled magnets, compared to the waste sintered magnets, by hindering of the formation of reverse-domain nucleation sites when the new Nd/Pr grain-boundary zones form a more uniform encapsulation of the Nd2Fe14B matrix-phase grains. In some examples, the GBE system may "clean" the "old" Nd-rich phase grain boundary, which may have acted as a nucleation site for the formation and growth of reverse domains within the Nd—Fe—B-type sintered magnets, with the new Nd/Pr grain boundary phase because of the increased grain boundary cohesion with an increasing volume fraction of the new Nd/Pr grain-boundary phase.

EXAMPLE 4

In some implementations when a GBE system uses a spray atomizing apparatus, the GBE system may initially use a single phase $Nd_{11.92}Dy_{42.32}Co_{38.39}Cu_{5.34}Fe_{2.03}$ at. % powder with a measured density of 8.375 g/cm$^3$, and a variance from the theoretical value of about 95 to 98%. The spray atomizing apparatus may create an $Nd_{11.92}Dy_{42.32}Co_{38.39}Cu_{5.34}Fe_{2.03}$ at. % precursor with a density of 8.08 g/cm$^3$. The GBE system may then transfer the $Nd_{11.92}Dy_{42.32}Co_{38.39}Cu_{5.34}Fe_{2.03}$ at. % precursor, e.g., the atomized powder, to a hydrogen mixing reactor with an $Nd_2Fe_{14}B$ sintered block to produce a composite powder from the precursor and the sintered block.

For instance, after the $Nd_{11.92}Dy_{42.32}Co_{38.39}Cu_{5.34}Fe_{2.03}$ at. % precursor and the sintered block are placed in the hydrogen mixing reactor, the hydrogen mixing reactor is evacuated and then hydrogen may be introduced for twelve hours. The hydrogen is absorbed by the $Nd_2Fe_{14}B$ sintered block and the $Nd_{11.92}Dy_{42.32}Co_{38.39}Cu_{5.34}Fe_{2.03}$ at. % precursor powder causing the sintered block to expand and break apart into a coarse powder and the $Nd_{11.92}Dy_{42.32}Co_{38.39}Cu_{5.34}Fe_{2.03}$ at. % precursor powder to further break apart and release entrapped gas accumulated during the atomization process. The hydrogen mixing process may occur under an absolute pressure of about 2 bars with a constant feed of hydrogen into the hydrogen mixing chamber until the mixing process is complete. The GBE system may then heat the powders in the hydrogen mixing chamber, e.g., in-situ, to 550° C. to partially desorb the composite mixture, e.g., to cause the release of hydrogen from the body of the powder particles.

EXAMPLE 5

In some implementations, final magnet products produced using the GBE process may have improved temperature stability compared to other magnets, e.g., other recycled magnets. For instance, a GBE system may create a powder from Nd—Fe—B material, e.g., using a hydrogen mixing process, and mix the powder with $Nd_{11.92}Dy_{42.32}Co_{38.39}Cu_{5.34}Fe_{2.03}$ at. % to replace the old Nd-rich grain boundary phase with a new $Nd_{11.92}Dy_{42.32}Co_{38.39}Cu_{5.34}Fe_{2.03}$ at. % grain boundary phase. The mixing of the powder with the $Nd_{11.92}Dy_{42.32}Co_{38.39}Cu_{5.34}Fe_{2.03}$ at. % may homogenize the new $Nd_{11.92}Dy_{42.32}Co_{38.39}Cu_{5.34}Fe_{2.03}$ at. % grain boundary phase throughout the Nd—Fe—B powder while the old Nd-rich grain boundary phase is removed, e.g., by sieving, air blowing, vibration, shape separation, density gradient separation, twin cylindrical gravity separation, or a combination of two or more of these.

The GBE system may obtain a composite raw material powder and orient the composite raw material powder in a magnetic field, e.g., inter atmosphere under magnetic field orientation. While the composite raw material powder is oriented in the magnetic field, the GBE system may compression-mold the powder and charge the magnetic field to obtain a molded composite body. The GBE system may sinter the molded composite body to obtain a final sintered magnet product.

Figure 16:
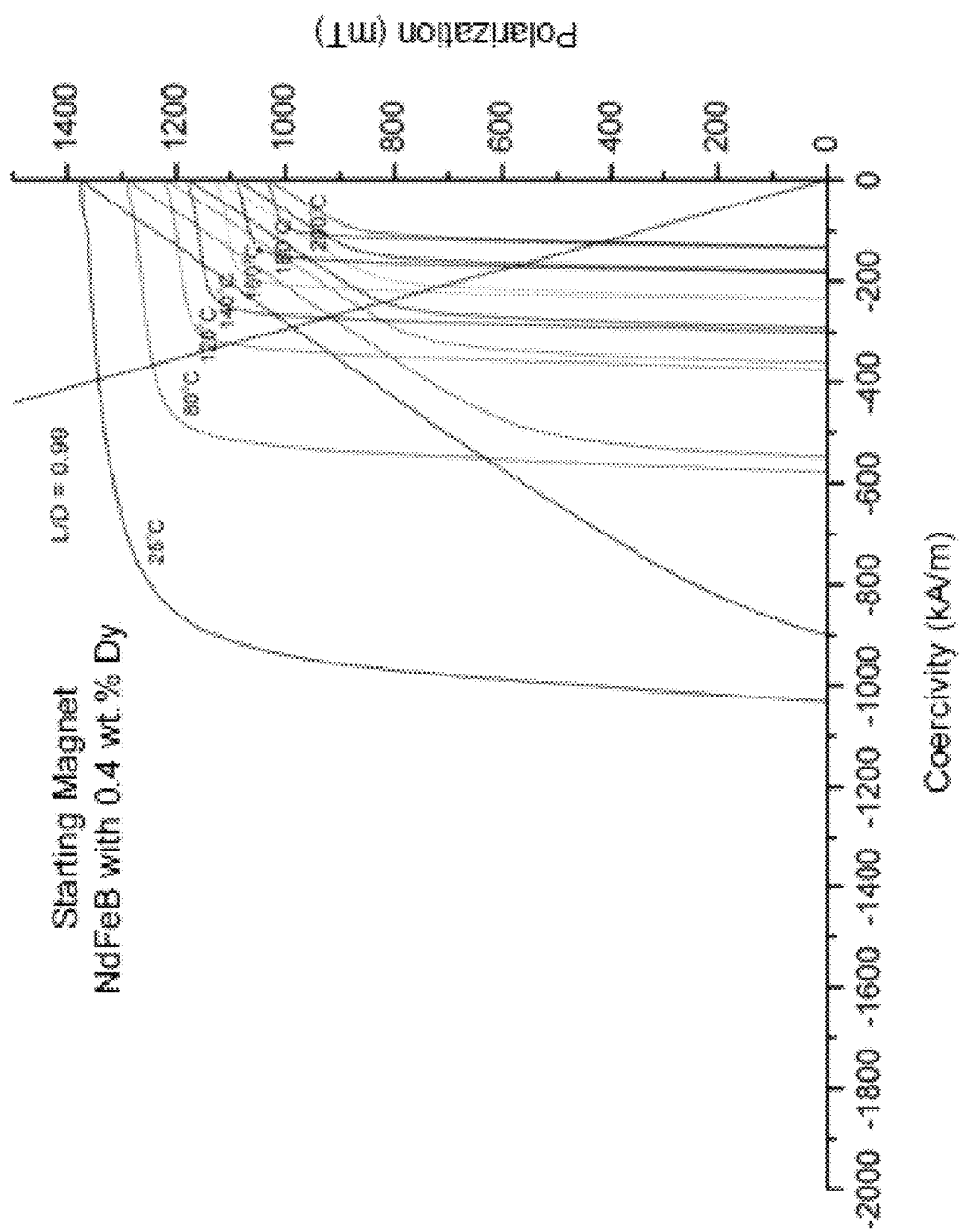
FIG. 16 shows examples of demagnetization curves of a magnet that has not been processed using the GBE process.

FIG. 16 shows examples of demagnetization curves of a magnet that has not been processed using the GBE process.

Figure 17:
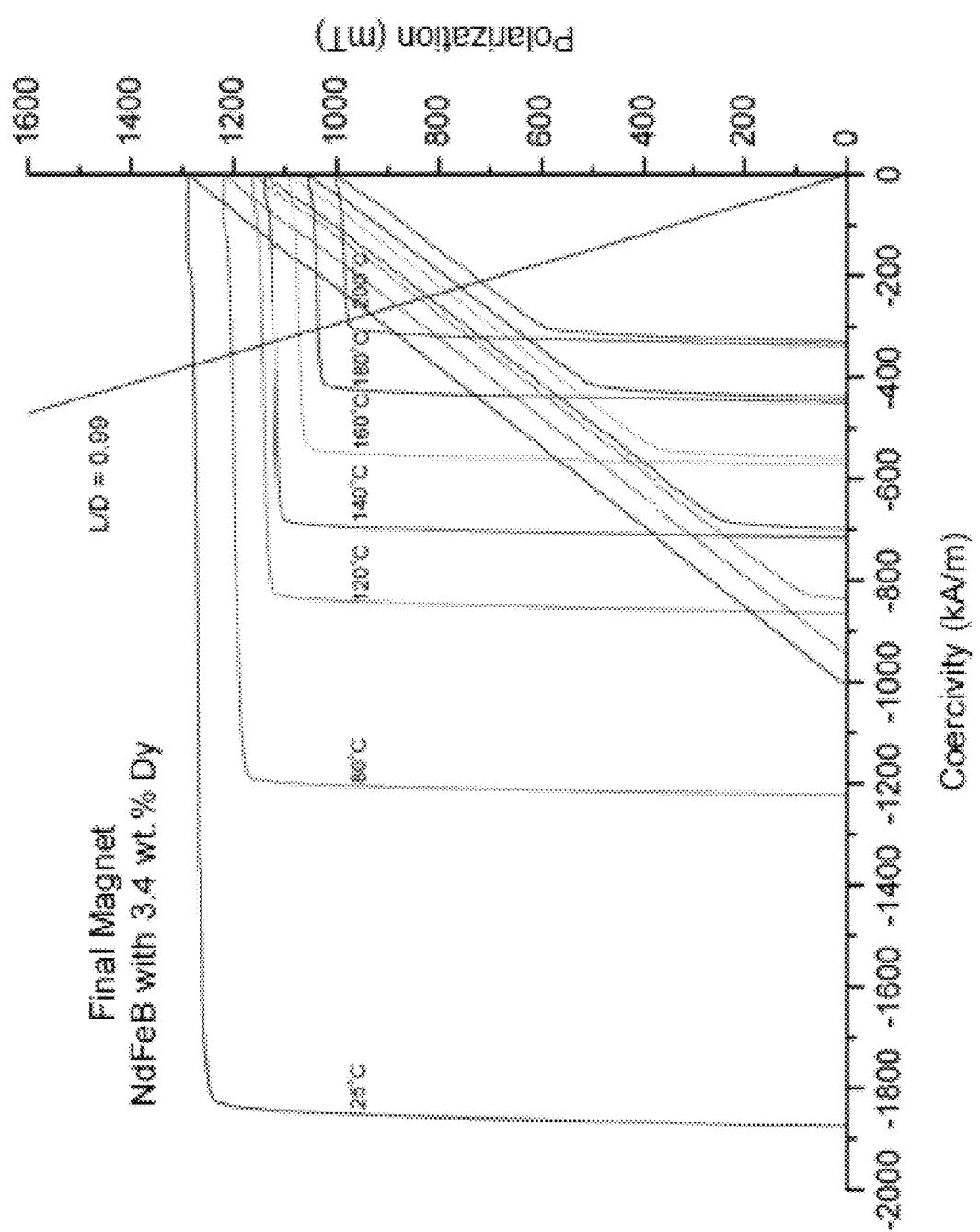
FIG. 17 shows examples of demagnetization curves of a magnet that has been processed using the GBE process.

FIG. 17 shows examples of demagnetization curves of a magnet that has been processed using the GBE process, e.g., and has an improved temperature stability as indicated by the better squareness factor in FIG. 17 compared to FIG. 16. For instance, at 25° C., the coercivity of the starting material, as shown in FIG. 16, is between 1000 and 1100 kA/m and the coercivity of a final magnet, as shown in FIG. 17, is between 1800 and 1900 kA/m. The change in the content from the magnet whose properties are shown in FIG. 16 compared to the magnet whose properties are shown in FIG. 17, e.g., from 0.4 wt. % Dy to 3.4 wt. % Dy, is due to the rare earth elemental additive material. In some examples, the content of Cu, Nd, Co, or two or more of these, may be higher in a magnet processed using the GBE process compared to a starting magnet or starting magnetic material.

EXAMPLE 6

In some implementations, when a system performs grain boundary engineering on scrap material, the scrap material may contain a high amount of Dy in the grain boundary, the Nd2Fe14B1 matrix phase, or both. The high amount of Dy may contribute to lower magnetic performance of a final magnetic product made from the scrap material. To increase the remanence (Br) in a final magnetic product made from the scrap material, the system may remove Dy from the scrap material by replacing the Dy with Fe, e.g., the system may push Dy out of the scrap material by pumping Fe into the scrap material. The system may use Fe in an additive material mixed with the scrap material to remove Dy from the scrap material, e.g., during a mixing process.

The system may mix an additive material that does not include any Dy with the scrap material. The additive material may include a high amount of Fe, Nd, Co, or two or more of these, as shown in Table 9 below. For instance, the system may add Fe, remove Dy, or both, to and from the scrap material to get as close to Nd2Fe14B1 phase as possible to ensure a high magnetic performance of a final magnetic product. For example, the system may add Fe, remove Dy, or both, to and from the scrap material to increase remanence (Br) and decrease coercivity (iHc).

Table 9 shows quantities, in weight percent, of two starting scrap materials, s1 and s2, additive material, a, and a final magnetic product, f made from the two starting scrap materials and the additive material. For instance, s1 (e) indicates the quantity, in weight percent, of element e in the first starting scrap material s1 and s2 (e) indicates the quantity, in weight percent, of element e in the second starting scrap material s2 in Table 9 below. The quantity in weight percent of element e in the additive material a is indicated by a(e) and the quantity in weight percent of element e in the final magnetic product f is indicated by f(e) in Table 9 below.

Some minor elements are omitted from Table 9 for clarity. The quantities in Table 9 have +/−0.01 to 0.08 wt. % error (due to ICP readings).

TABLE 9

| | wt. % of magnetic material | | | | | | | | | | |
|---|---|---|---|---|---|---|---|---|---|---|---|
| | Nd | Pr | Dy | B | Co | Al | Cu | Ga | O | C | Fe | All |
| $s_1$(e) | 18.08 | 4.52 | 6.50 | 1.02 | 2.94 | 0.12 | 0.18 | 0.21 | 0.20 | 0.10 | 66.13 | 100 |
| $s_2$(e) | 17.55 | 5.85 | 4.20 | 0.96 | 0.19 | 0.40 | 0.15 | | 0.10 | 0.07 | 70.53 | 100 |
| a(e) | 15.20 | | | | 1.50 | | | | | | 83.30 | 100 |
| f(e) | 17.29 | 4.15 | 4.28 | 1.00 | 1.55 | 0.21 | 0.13 | 0.08 | 0.18 | 0.10 | 71.02 | 100 |

In the example shown in Table 9, a system mixes the final magnetic product from 40 wt. %*s1+40 wt. %*s2+20 wt. %*a, e.g., such that, for each element e in the final magnetic product f, f(e)=40 wt. %*s1 (e)+40 wt. %*s2 (e)+20 wt. %*a(e). For instance, the system mixed 40 kg s1, 40 kg s2, and 20 kg a to create 100 kg of the final magnetic product f.

Table 10 indicates the magnetic properties of the two starting materials, s1 and s2, as well as the final magnetic product, f. For instance, Table 10 shows that a system that mixes 40 wt. %*s1 with 40 wt. %*s2 and 20 wt. %*α to create the final magnetic product f may improve the performance of the final magnetic product f compared to one or both of the two starting materials. For instance, the system may increase the remanence (Br), increase the energy product (BHmax), decrease the average coercivity (iHc), or two or more of these.

TABLE 10

| | magnetic properties | | |
|---|---|---|---|
| | Br (T) | iHc (kA) | BH (max) |
| $s_1$ | 1.25 | 2345 | 300 |
| $s_2$ | 1.30 | 1820 | 330 |
| f | 1.35 (calculated) | 2013 (calculated) | 360 |

In some implementations, a GBE method provides for the addition of 0.1 to 19 wt. % of one or more rare earth elemental additives to a composition or method described herein. In another aspect, a method provides for the addition of about 0.1 wt. %, about 0.2 wt. %, about 0.3 wt. %, about 0.4 wt. %, about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, or about 19 wt. % of one or more elemental additions or a combination of one or more elemental additions to a composition or method described herein. In yet another aspect, a method provides for the addition of about 0.1-0.5 wt. %, about 0.1-1 wt. %, about 0.5-1 wt. %, about 1-2 wt. %, about 1-3 wt. %, about 1-5 wt. %, about 1-8 wt. %, about 1-12 wt. %, bout 1-15 wt. %, about 1-19 wt. % about 2-4 wt. %, about 2-6 wt. %, about 2-12 wt. %, about 2-19 wt. %, about 3-5 wt. %, about 3-8 wt. %, about 3-15 wt. %, and about 3-19 wt. % of one or more elemental additions or a combination of one or more elemental additions to a composition or method described herein.

In some implementations, the hydrogen mixing process of the initial sintered magnet blocks, and optionally the additive material, may be performed at 20-150° C. at 1 to 60 bar pressure under a hydrogen atmosphere. The initial sintered magnet blocks may be created using any appropriate process or may be purchased from a vendor, to name a few examples. After that, the powder created from the hydrogen mixing process may be heated, preferably in situ, to 550-600° C. to partially degas the mixture. The average particle size in the powder generated by the mixing step may be in the range of 1 μm to 2000 mm. If a pressure of 50 bar is used, the average particle size may correspond to a grain size, e.g., 2-8 μm, present in the original magnetic material, and particles in the range of 500 μm to 2000 mm that have not reacted with hydrogen due to oxidation. The powder may be sieved to remove the oxidized coarse rare earth powders.

In some implementations, the hydrogen mixing process employs a high enough pressure to ensure that particles are small enough for a final magnet and the jet milling operation can be skipped. In this example, the sieving to remove larger particles, thereby to remove particles with higher concentration of oxygen, may be advantageous. The sieving may be effective because the oxides constitute a harder fraction of the recovered material from the magnet and resist reduction to smaller particle sizes.

Further mixing and homogenization of the magnetic powder mixture may be transferred to a roller mill for further homogenization of the mixture. The milled material may be lubricated, for example, with 1% of Zn stearate, during roller milling. After the roller milling step, magnetic powders may be sieved to further remove any remaining rare earth oxide. In some implementations, the sieving may be selective to remove particles bigger than 500 μm.

The lubricant used for roller milling may have low oxygen content and/or contain a binder. Examples of the lubricant include amide, e.g., oleamide or amide, or other lower carbon-hydrogenate esters or fatty acid, such as oleic acid.

Powders may be further homogenized by jet milling. In some implementations, the jet may be formed using air or an inert gas such as He, Ar, or N. The jet milling may be performed for such time, e.g., 1-4 hours, and at such velocity so as to homogenize the mixture and further break down aggregates of single grains with a size between 1 to 4 μm. In some implementations, the jet milling may be completed in 24 hours or less.

In some implementations, an 80% reduction in time for the jet milling of Nd—Fe—B powders may be observed compared to jet milling of Nd—Fe—B elemental additives. The average particle size of the magnets may be in the range of between 4 to 10 μm. During jet milling, the aggregates may be broken to single grains while an oxidized rare earth powder remained coarse, e.g., have a larger particle size. By removing the oxidized rare earth coarse powder, the amount of oxygen incorporated in the starting magnetic material can be reduced and more preferably suppressed in the final magnet. This phase may be done preferably under inert atmosphere, for example using Ar gas, free of any oxygen contamination, with the purpose of homogenizing the mixture of magnetic powder and fresh additive material of (RE(TM)x) elemental additives and break the segregated single grains along grain boundaries. RE (rare earth) refers to a combination of any Nd, Pr, Dy, Tb, Y, La, or Sm and TM (transitional elemental additive material) refers to a combination of any Co, Ni, V, Nb, Mo, Ti, Zr, Al, Cu, Ga, or Fe.

After the particle reduction, mixing, and sieving are completed, the powder may be aligned and pressed to form a green compact in air or an inert atmosphere. A lubricant may be applied to the powder prior to pressing and aligning. The green compact may be pressed and aligned in a magnetic field. Then the green compact may go directly on to sintering in the range of 1050-1100° C. for 5 hours of holding time, followed by heat treatment at 900° C. for 5 hours and 550° C. for 3 hours. The selection of sintering temperatures may depend on the amount of total rare earth additions added prior to the hydrogenation/mixing steps.

In some implementations, hydrogen mixing may be used advantageously to facilitate homogenization of original material, e.g., from a sintered magnet, with fresh elemental additives. This may be followed by jet milling, which may be used for further homogenization with supplemental materials, e.g., rare earth oxides or Nd/Pr, in a process that is amenable to cost efficient scalable processing. Other implementations may include milling, roller milling, high energy ball milling, tumbling and other mixing steps.

In some implementations, a method provides for the addition of 0.1 to 19 wt. % of one or more rare earth elemental additives to a composition or method described herein. In another aspect, a method provides for the addition of about 0.1 wt. %, about 0.2 wt. %, about 0.3 wt. %, about 0.4 wt. %, about 0.5 wt. %, about 1 wt. %, about 2 wt. %, about 3 wt. %, about 4 wt. %, about 5 wt. %, about 6 wt. %, about 7 wt. %, or about 8 wt. % of one or more rare earth elemental additives or a combination of one or more rare earth elemental additives to a composition or method described herein. In yet another aspect, a method provides for the addition of about 0.1-0.5 wt. %, about 0.1-1 wt. %, about 0.5-1 wt. %, about 1-2 wt. %, about 1-3 wt. %, about 1-5 wt. %, about 1-8 wt. %, about 2-4 wt. %, about 2-6 wt. %, about 3-5 wt. %, or about 3-8 wt. % of one or more rare earth elemental additives or a combination of one or more rare earth elemental additives to a composition or method described herein.

The foregoing and other embodiments can each optionally include one or more of the following features, alone or in combination. The method may include performing the fragmenting and the mixing concurrently. Fragmenting may include fragmenting the material to an average particle size between 1 to 4 μm. Fragmenting may include removing particles with a particle fraction of size bigger than an average size of particles to obtain a low oxygen concentration. Removing particles with the particle fraction of size bigger than the average size of particles to obtain a low oxygen concentration may include sieving.

In some implementations, the method includes mixing the homogeneous powder with another element selected from the rare earth material R or the elemental additive A. Fragmenting may include fragmenting to form the powder with an average particle size between about 1 micron to about 2 millimeters. The method may include further fragmenting the powder to an average particle size between about 1 to about 4 microns, and homogenizing the powder. Homogenizing the powder may include homogenizing the powder that may include an average particle size between about 1 micron to about 2 millimeters, and mixing the powder with a) the rare earth material R and b) the elemental additive A to produce the homogeneous powder may include mixing the powder with an average particle size between about 1 to about 4 microns with a) the rare earth material R and b) the elemental additive A to produce the homogeneous powder. Mixing the powder with a) the rare earth material R and b) the elemental additive A to produce the homogeneous powder may include mixing the powder with an average particle size between about 1 micron to about 2 millimeters with a) the rare earth material R and b) the elemental additive A to produce the homogeneous powder, and homogenizing the powder may include homogenizing the powder that may include an average particle size between about 1 to about 4 microns.

In some implementations, the method includes fragmenting the rare earth material R and the elemental additive A separately to form the powder, wherein mixing the powder with a) the rare earth material R and b) the elemental additive A to produce the homogeneous powder may include mixing the powder with a) the fragmented rare earth material R and b) the fragmented elemental additive A to produce the homogeneous powder.

In some implementations, the method may include sintering and magnetizing the homogeneous powder to form an Nd—Fe—B magnetic product. Sintering and magnetizing the homogeneous powder to form an Nd—Fe—B magnetic product may include compacting the homogeneous powder to form a green compact, sintering the green compact between about 1000° C. to about 1100° C., and magnetizing the sintered green compact to an inert atmosphere below 15° C. to form the Nd—Fe—B magnetic product. The method may include heat treating the sintered green compact between about 490° C. to about 950° C. prior to magnetizing the sintered green compact. The method may include exposing the green compact to an inert magnetic field below 15° C. An atomic percentage of Co in the Nd—Fe—B magnetic product may be less than or equal to 3%. An atomic percentage of Cu in the Nd—Fe—B magnetic product may be less than or equal to 0.3%. A combined atomic percentage of Fe and Co in the Nd—Fe—B magnetic product may be less than or equal to 77%. A combined atomic percentage of Nd, Dy, and Pr in the Nd—Fe—B magnetic product may be less than or equal to 18 at. %. The method may include adding a lubricant to the powder prior to compacting the homogeneous powder to form the green compact. The coercivity of the Nd—Fe—B magnetic product may be between about 0 to about 20% greater.

In some implementations, the method may include sintering and magnetizing the powder to form an Nd—Fe—B magnetic product with a final coercivity, wherein the final coercivity is increased by at least 30%. The method may include sintering and magnetizing the powder to form an Nd—Fe—B magnetic product with a final coercivity, wherein the final coercivity is increased by at least 80%.

In some implementations, the method may include sintering and magnetizing the homogeneous powder to form an Nd—Fe—B magnetic product having a composition substantially of $W_aR_bA_c$, where W may include Nd—Fe—B material and indices a, b, and c represent atomic percentages of the corresponding compositions or elements. Mixing the powder with a) the rare earth material R and b) the elemental additive A to produce the homogeneous powder may include homogeneously distributing the rare earth material R and the elemental additive A, and sintering and magnetizing the homogeneous powder to form a Nd—Fe—B magnetic product may include forming the Nd—Fe—B magnetic product with a concentration of the rare earth material R and a concentration of the elemental additive A that increases, on average, surrounding the primary $Nd_2Fe_{14}B$ phase within the Nd—Fe—B magnetic product. Forming the Nd—Fe—B magnetic product may include restoring, modifying, and improving a concentration and an elemental composition of a grain boundary phase, on average, at a plurality of grain boundary regions that extend throughout the Nd—Fe—B magnetic product.

In some implementations, mixing the powder may include mixing the powder with at least three elements of: Pr, Nd, Dy, Co, Cu, or Fe. The elemental additive A may include pure Nd. The elemental additive A may include pure Pr. The method may include adding a lubricant to the powder prior to fragmenting.

The foregoing and other embodiments can each optionally include one or more of the following features, alone or in combination. The Nd—Fe—B sintered magnet may exhibits an increase of iHc of greater than about 27%, greater than about 60%, or greater than about 83% with respective decreases in Br of less than about 0.1%, less than about 3%, and less than about 6%. The rare earth material R and the elemental additives A may be distributed homogeneously throughout the Nd—Fe—B sintered magnet such that a concentration of the rare earth material R and a concentration of the elemental additives A increases on average in a mixture of material W surrounding the primary Nd2Fe14B phase within the Nd—Fe—B magnet. A atomic percentage of a combination of the rare earth material R and the elemental additives A may include between about 0.1 at. % and about 19 at. %. The Nd—Fe—B sintered magnet may include an average grain size less than 5 microns. The Nd—Fe—B sintered magnet may include an average grain size less than 2.5 microns. The Nd—Fe—B sintered magnet may include a density between about 7.56 g/cm$^3$ to about 7.6 g/cm$^3$.

In some implementations, the Nd—Fe—B sintered magnet may include an atomic percentage of Co less than or equal to 3%. The Nd—Fe—B sintered magnet may include an atomic percentage of Cu less than or equal to 0.3%. The Nd—Fe—B sintered magnet may include a combined atomic percentage of Fe and Co less than or equal to 77%. The Nd—Fe—B sintered magnet may include a combined atomic percentage of Nd, Dy, and Pr less than or equal to 18%. The elemental additive A may include pure Nd. The elemental additive A may include pure Pr.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatuses, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

An example of one such type of computer is shown in FIG. 18, which shows a schematic diagram of a generic computer system 1800. The system 1800 can be used for the operations described in association with any of the computer-implement methods described previously, according to one implementation. The system 1800 includes a processor 1810, a memory 1820, a storage device 1830, and an input/output device 1840. Each of the components 1810, 1820, 1830, and 1840 are interconnected using a system bus 1850. The processor 1810 is capable of processing instructions for execution within the system 1800. In one implementation, the processor 1810 is a single-threaded processor. In another implementation, the processor 1810 is a multi-threaded processor. The processor 1810 is capable of processing instructions stored in the memory 1820 or on the storage device 1830 to display graphical information for a user interface on the input/output device 1840.

The memory 1820 stores information within the system 1800. In one implementation, the memory 1820 is a computer-readable medium. In one implementation, the memory 1820 is a volatile memory unit. In another implementation, the memory 1820 is a non-volatile memory unit.

The storage device 1830 is capable of providing mass storage for the system 1800. In one implementation, the storage device 1830 is a computer-readable medium. In various different implementations, the storage device 1830 may be a floppy disk device, a hard disk device, an optical disk device, or a tape device.

The input/output device 1840 provides input/output operations for the system 1800. In one implementation, the input/output device 1840 includes a keyboard and/or pointing device. In another implementation, the input/output device 1840 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A homogenized population of particles comprising a homogenized mixture a first population of particles of a rare earth transitional elemental additive and a second population of particles of a demagnetized magnetic material, wherein the rare earth transitional elemental additive is an alloy comprising the formula $Nd_{8.5-12.5}Dy_{35-45}Co_{32-41}Cu_{3-6.5}Fe_{1.5-5}$, wherein the subscript values are atom percent relative to the total composition of the rare earth transitional elemental additive; and the demagnetized magnetic material is virgin material or material derived from recycled magnetic material and is substantially represented by the formula $G_2Fe_{14}B$, where G is a rare earth element, the demagnetized magnetic material optionally doped with one or more rare earth elements.

2. The homogenized population of particles of claim 1, present with a weight ratio of the first and second population of particles in a range of from 0.1:99.9 to 19:81 wt %.

3. The homogenized population of particles of claim 1 having an average particle size in a range of from 2 microns to 4.5 microns.

4. The homogenized population of particles of claim 1, wherein G comprises Nd.

5. The homogenized population of particles of claim 1, wherein G further comprises Dy and/or Pr, and the demagnetized magnetic material is further doped with one or more of Nd, Gd, Tb, La, Ce, Yb, Ho, or Eu.

6. A green body comprising a compressed population of the homogenized particles of claim 1, wherein the rare earth transitional elemental additive is distributed uniformly throughout the green body.

7. The green body of claim 6, wherein the demagnetized magnetic particles have been magnetized to form magnetized magnetic particles under conditions to align the magnetized magnetic particles to have a common direction of magnetization in an inert atmosphere.

8. The homogenized population of particles of claim 1, wherein Dy is present in the rare earth transitional elemental additive in a concentration range of 35-45 atom %, with respect to the total atom % of the rare earth transitional elemental additive.

9. The homogenized population of particles of claim 1, wherein Co is present in the rare earth transitional elemental additive in a concentration range of 32-41 atom %, with respect to the total atom % of the rare earth transitional elemental additive.

10. The homogenized population of particles of claim 1, wherein Cu is present in the rare earth transitional elemental additive in a concentration range of 3-6.5 atom %, with respect to the total atom % of the rare earth transitional elemental additive.

11. The homogenized population of particles of claim 1, wherein Fe is present in the rare earth transitional elemental additive in a concentration range of 1.5-5 atom %, with respect to the total atom % of the rare earth transitional elemental additive.

12. The homogenized population of particles of claim 1, wherein the rare earth transitional elemental additive is an alloy comprising the formula $Nd_{11.92}Dy_{42.32}Co_{38.39}CU_{5.34}Fe_{2.03}$, wherein the subscript values are atom percent relative to the total composition of the rare earth transitional elemental additive.

13. A sintered body comprising grains and a grain boundary composition, wherein:
   (a) the grains are of a composition substantially represented by the formula $G_2Fe_{14}B$, where G is a rare earth element, optionally doped with one or more rare earth elements; and
   (b) the grain boundary composition is an alloy composition substantially represented by the formula: $Nd_{8.5-12.5}Dy_{35-45}Co_{32-41}Cu_{3-6.5}Fe_{1.5-5}$, wherein the subscript values are atom percent relative to the total composition of the rare earth transitional elemental additive.

14. The sintered body of claim 13 having an oxygen content of less than 1.98 atom %.

15. The sintered body of claim 13 that exhibits, at 25° C.:
(a) a remanence (Br) in a range of from 1.29 T to 1.423 T;(b) a coercivity (iHc) in a range of from 1042 kA/m to 1900 kA/m;
(c) an energy product (BHmax) in a range of from 323 kJ/m$^3$ to 391 kJ/m$^3$; or
(d) a combination of two or more of (a) to (c).

16. A device comprising a sintered body of claim 13, the device being a starter motor, anti-lock braking system, fuel pump, fan, loudspeaker, microphone, telephone ringer, switch, relay, hard-disk drive, stepper motor, servo-motors, magnetic resonance imager, windmill generator, robot, electronic sensor, magnetic separator, guidance system, satellite, or cruise missile.

17. A method of preparing a sintered magnetic body of claim 13, the method comprising:
homogenizing a first population of particles of a rare earth transitional elemental additive with a second population of particles of a demagnetized magnetic material, the weight ratio of the first and second population of particles being in a range of from about 0.1:99.9 to about 19:81 wt % to form a final mixture of homogenized particles having an average particle size in a range of from 2 microns to 4.5 microns; wherein
(a) the rare earth transitional elemental additive is an alloy comprising a composition of formula: $Nd_{8.5-12.5}Dy_{35-45}Co_{32-41}Cu_{3-6.5}Fe_{1.5-5}$, wherein the subscript values are atom percent relative to the total composition of the rare earth transitional elemental additive;
(b) the demagnetized magnetic material is virgin material or material derived from recycled magnetic material and is substantially represented by the formula $G_2Fe_{14}B$, where G is a rare earth element, the demagnetized magnetic material optionally doped with one or more rare earth elements, wherein the product of the method is a sintered magnetic body of claim 13.

18. The method of claim 1, wherein the homogenizing step is preceded by treating coarse particles of either the rare earth transitional elemental additive or demagnetized magnetic material or both the rare earth transitional elemental additive and demagnetized magnetic material in the presence of hydrogen under conditions and for a time to allow absorption of the hydrogen into either the rare earth transitional elemental additive or demagnetized magnetic material or both the rare earth transitional elemental additive and demagnetized magnetic material.

19. The method of claim 1, wherein the homogenizing step comprises multiple separate mixing steps at least one of which increases the average surface area of at least one, preferably both, of the particle populations.

20. The method of claim 1, wherein the rare earth transitional elemental additive includes less than 0.12 atom %, oxygen, less than 0.0058 atom % carbon, or both.

21. The method of claim 1, wherein the demagnetized magnetic material is substantially free of dopants.

22. The method of claim 1, wherein G comprises Nd.

23. The method of claim 1, wherein G further comprises Dy and/or Pr, and the demagnetized magnetic material is further doped with one or more of Nd, Pr, Dy, Gd, Tb, La, Ce, Yb, Ho, or Eu.

24. The method of claim 1, wherein the mean particle diameter of the first population of particles of the rare earth transitional elemental additive is in a range of from 140 microns to 180 microns.

25. The method of claim 1, wherein the average particle size of the second population of particles of the demagnetized magnetic material is in a range of from 0.9 microns to 15 microns.

26. The method of claim 1, wherein the average particle size of the second population of particles of the demagnetized magnetic material is in a range of from 1 microns to 4 microns.

27. The method of claim 1, further comprising:
compressing the population of homogenized particles together to form a green body.

28. The method of claim 27, comprising:
compressing the population of homogenized particles together to form a green body, under a magnetic field of a suitable strength to align the magnetic particles with a common direction of magnetization in an inert atmosphere, wherein the rare earth transitional elemental additive is distributed uniformly throughout the green body.

29. The method of claim 27, wherein the compressing is done under a force of about 60 MPa.

30. The method of claim 27, wherein the magnetic field is in a range of from 400 kA/m to 1200 kA/m.

31. The method of claim 27, further comprising heating the green body at a temperature and for a time sufficient to sinter the green body into a sintered body, wherein the rare earth transitional elemental additive is distributed uniformly throughout the sintered body.

32. The method of claim 31, wherein the temperature is about 1070° C.

33. The method of claim 31, further comprising heat treating the sintered body in an environment of cycling vacuum and inert gas at an absolute pressure in a range of from 200 to 500 mbar.

34. The method of claim 31, further comprising magnetizing the sintered body with a magnetic field in a range of from 400 kA/m to 1200 kA/m.

35. A sintered body prepared by a method of claim 34.

36. A green body prepared by a method of claim 27.

37. The method of claim 1, wherein the rare earth transitional elemental additive is substantially represented by the formula: $Nd_{11.92}Dy_{42.32}Co_{38.39}Cu_{5.34}Fe_{2.03}$, wherein the subscript values are atom percent relative to the total composition of the rare earth transitional elemental additive.

* * * * *

UNITED STATES PATENT AND TRADEMARK OFFICE
CERTIFICATE OF CORRECTION

PATENT NO. : 10,395,823 B2
APPLICATION NO. : 15/093971
DATED : August 27, 2019
INVENTOR(S) : Zakotnik et al.

Page 1 of 1

It is certified that error appears in the above-identified patent and that said Letters Patent is hereby corrected as shown below:

In the Claims

Column 45, Line 37, in Claim 18, delete "claim 1" and insert --claim 17--

Column 45, Line 47, in Claim 19, delete "claim 1" and insert --claim 17--

Column 45, Line 51, in Claim 20, delete "claim 1" and insert --claim 17--

Column 45, Line 54, in Claim 21, delete "claim 1" and insert --claim 17--

Column 45, Line 56, in Claim 22, delete "claim 1" and insert --claim 17--

Column 46, Line 1, in Claim 23, delete "claim 1" and insert --claim 17--

Column 46, Line 5, in Claim 24, delete "claim 1" and insert --claim 17--

Column 46, Line 9, in Claim 25, delete "claim 1" and insert --claim 17--

Column 46, Line 13, in Claim 26, delete "claim 1" and insert --claim 17--

Column 46, Line 17, in Claim 27, delete "claim 1" and insert --claim 17--

Signed and Sealed this
Second Day of June, 2020

Andrei Iancu
*Director of the United States Patent and Trademark Office*